United States Patent
Irie et al.

(10) Patent No.: US 8,253,903 B2
(45) Date of Patent: Aug. 28, 2012

(54) LIQUID CRYSTAL PANEL, LIQUID CRYSTAL DISPLAY DEVICE, AND TELEVISION DEVICE

(75) Inventors: Kentaroh Irie, Osaka (JP); Toshihide Tsubata, Osaka (JP); Naoshi Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 389 days.

(21) Appl. No.: 12/519,059

(22) PCT Filed: Sep. 26, 2007

(86) PCT No.: PCT/JP2007/068691
§ 371 (c)(1),
(2), (4) Date: Jun. 12, 2009

(87) PCT Pub. No.: WO2008/078438
PCT Pub. Date: Jul. 3, 2008

(65) Prior Publication Data
US 2010/0014012 A1 Jan. 21, 2010

(30) Foreign Application Priority Data

Dec. 26, 2006 (JP) ................................ 2006-350636
Apr. 26, 2007 (JP) ................................ 2007-117769

(51) Int. Cl.
*G02F 1/1337* (2006.01)
(52) U.S. Cl. ............ 349/129; 349/39; 349/48; 349/144; 349/14
(58) Field of Classification Search .................... 349/39, 349/129, 48, 144, 14
See application file for complete search history.

(56) References Cited

U.S. PATENT DOCUMENTS
5,380,555 A 1/1995 Mine
(Continued)

FOREIGN PATENT DOCUMENTS
JP 04-223428 8/1992
(Continued)

OTHER PUBLICATIONS
International Search Report for PCT/JP2007/068691, mailed Dec. 18, 2007.
(Continued)

*Primary Examiner* — Edward Glick
*Assistant Examiner* — Sang Nguyen
(74) *Attorney, Agent, or Firm* — Nixon & Vanderhye P.C.

(57) ABSTRACT

A first sub-pixel area and a second sub-pixel area that are provided in each of pixel areas so as to sandwich a scanning signal line 2. A first sub-pixel is arranged to include the first sub-pixel area and a section of the counter substrate which section corresponds to the first sub-pixel, area and the second sub-pixel is arranged to include the second sub-pixel area and a section of the counter substrate which section corresponds to the second sub-pixel area. A first alignment control structure is provided in the first sub-pixel and a second alignment control structure is provided in the second sub-pixel. The first alignment control structure (L1 and S1 to S4) provided in one pixel (55x) of two adjacent pixels has a shape obtained by rotating by 180° the first alignment control structure (L11, S11 to S14) provided in the other one pixel (55y) of the two adjacent pixels. This makes it possible to suppress deterioration in viewing angle characteristics caused by disordered alignment along the scanning signal line (2) in a liquid crystal panel in which a plurality of alignment domains can be formed.

18 Claims, 43 Drawing Sheets

U.S. PATENT DOCUMENTS

| | | | |
|---|---|---|---|
| 6,567,144 B1 * | 5/2003 | Kim et al. | 349/128 |
| 6,661,488 B1 | 12/2003 | Takeda | |
| 6,724,452 B1 | 4/2004 | Takeda | |
| 7,079,214 B2 * | 7/2006 | Shimoshikiryo | 349/144 |
| 7,167,224 B1 | 1/2007 | Takeda | |
| 7,224,421 B1 | 5/2007 | Takeda | |
| 7,304,703 B1 | 12/2007 | Takeda | |
| 2001/0001567 A1 | 5/2001 | Lyu | |
| 2001/0028414 A1 | 10/2001 | Lyu | |
| 2001/0033353 A1 | 10/2001 | Shimoshikiryo | |
| 2003/0202144 A1 | 10/2003 | Kim | |
| 2003/0227429 A1 | 12/2003 | Shimoshikiryo | |
| 2004/0119924 A1 | 6/2004 | Takeda | |
| 2005/0030458 A1 * | 2/2005 | Sasabayashi et al. | 349/129 |
| 2005/0041186 A1 | 2/2005 | Shimoshikiryo | |
| 2005/0062923 A1 | 3/2005 | Lyu | |
| 2005/0213015 A1 | 9/2005 | Shimoshikiryo | |
| 2006/0114402 A1 | 6/2006 | Lyu | |
| 2006/0256271 A1 | 11/2006 | Shimoshikiryo | |
| 2007/0064187 A1 | 3/2007 | Takeda | |
| 2007/0064190 A1 * | 3/2007 | Kim | 349/142 |
| 2007/0126965 A1 * | 6/2007 | Huang et al. | 349/129 |
| 2007/0285605 A1 | 12/2007 | Kim | |
| 2008/0007665 A1 | 1/2008 | Lyu | |
| 2008/0049052 A1 * | 2/2008 | Akiyama | 345/694 |
| 2008/0165314 A1 | 7/2008 | Takeda | |
| 2008/0303997 A1 | 12/2008 | Takeda | |
| 2009/0153758 A1 * | 6/2009 | Tsubata et al. | 349/38 |
| 2009/0262274 A1 * | 10/2009 | Noda et al. | 349/54 |

FOREIGN PATENT DOCUMENTS

| | | |
|---|---|---|
| JP | 06-110060 | 4/1994 |
| JP | 09-222604 | 8/1997 |
| JP | 10-102003 | 4/1998 |
| JP | 2001-098224 | 4/2001 |
| JP | 2004-301879 | 10/2004 |

OTHER PUBLICATIONS

Choi et al., "Performance of TFT Passivated with Low-K Dielectrics", FMC4-4, Dow Corning Corp., 2200 W. Salzburg Road, Midland, MI, Advanced Display Research Center, Kyung Hee Univ., IDW'03, p. 617.

* cited by examiner

FIG. 8
(a)
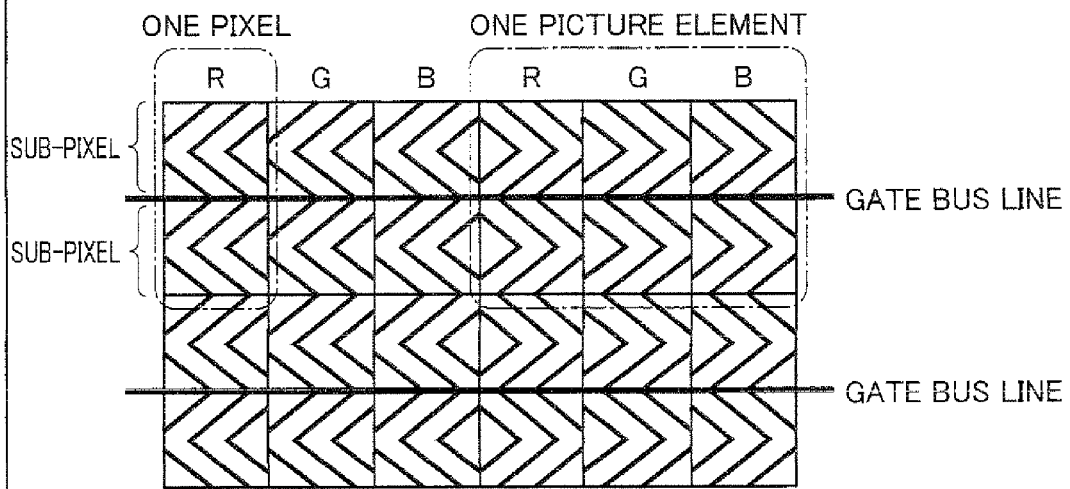
(b)
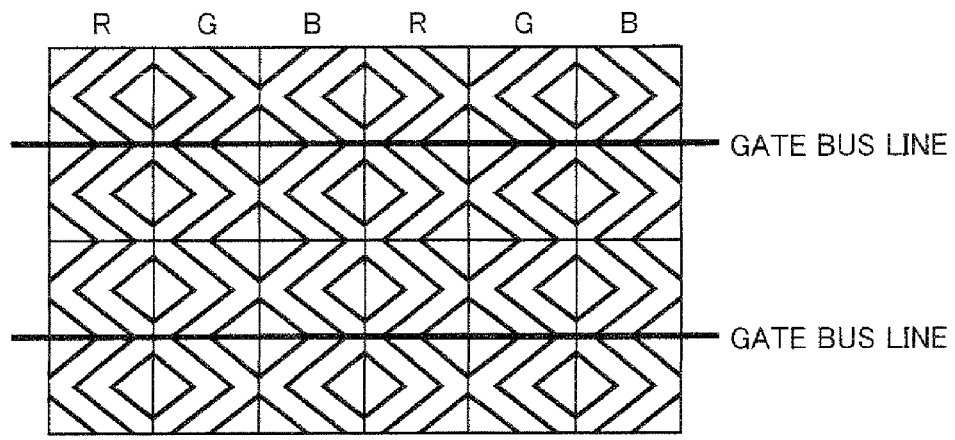

FIG. 14
(a) DOT-INVERSION DRIVE
NORMAL WIRING
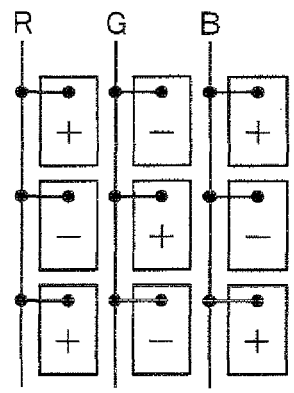
(b) SOURCE-LINE INVERSION DRIVE
NORMAL WIRING
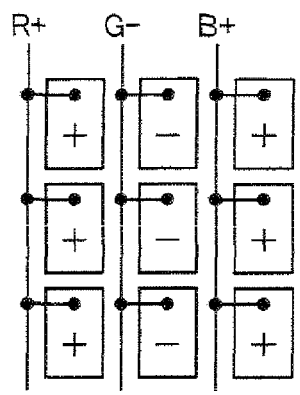
(c) SOURCE-LINE INVERSION DRIVE
STAGGERED WIRING
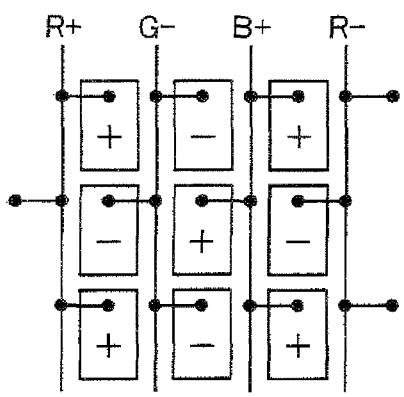

FIG. 40
(a)
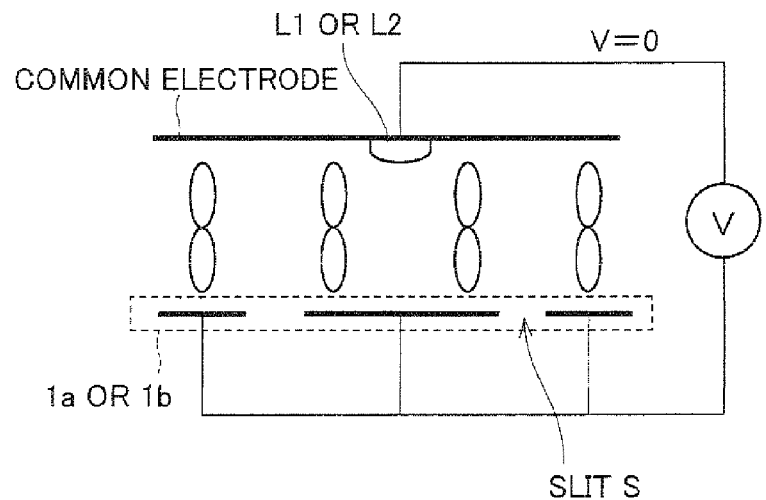
(b)
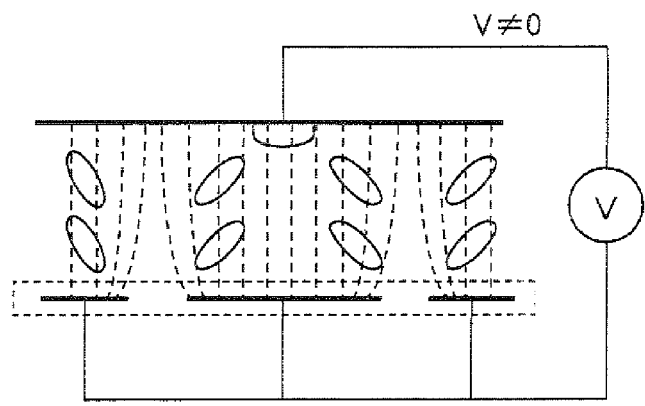

FIG. 41
(a)
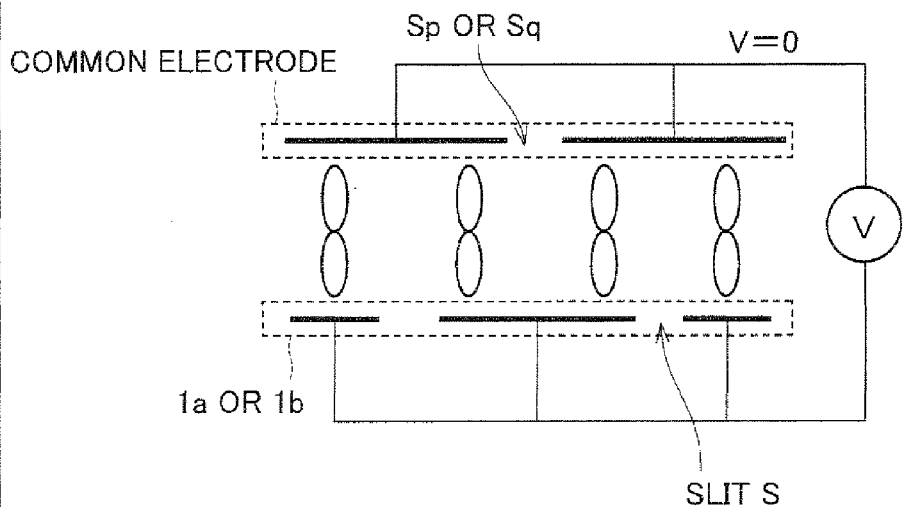
(b)
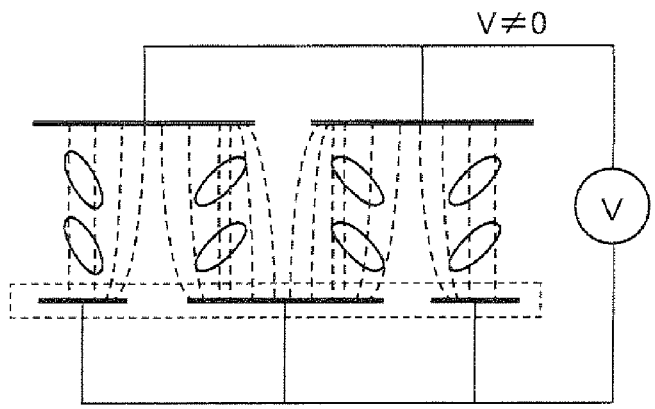

LIQUID CRYSTAL PANEL, LIQUID CRYSTAL DISPLAY DEVICE, AND TELEVISION DEVICE

This application is the U.S. national phase of International Application No. PCT/JP2007/068691, filed 26 Sep. 2007, which designated the U.S. and claims priority to Japanese Patent Application No(s). 2006-350636, filed 26 Dec. 2006 and 2007-117769, filed 26 Apr. 2007, the entire contents of each of which are hereby incorporated by reference.

TECHNICAL FIELD

The present invention relates to a liquid crystal panel in which a plurality of alignment domains can be formed within one pixel, and a liquid crystal display device or the like using the liquid crystal panel.

BACKGROUND ART

In recent years, viewing angle characteristics of a liquid crystal display device has been improved. For example, Patent Literature 1 discloses an MVA (Multi-domain Vertical Alignment) liquid crystal display device. In this liquid crystal display device, alignment structures including electrode slits 101 and ribs provided on a color filter (CF) form, for example, four domains within one pixel (See FIG. 42) so as to achieve a wider viewing angle. As a similar technique, Patent Literature 2 (See FIG. 43) discloses an arrangement in which a plurality of slits (201a and 201b) are formed on a pixel electrode of each pixel.

As a technique for improving viewing angle dependence of γ characteristics of a liquid crystal display device (difference between a γ characteristic at the time when the liquid crystal display device is observed from the front and a γ characteristic at the time when the liquid crystal display device is observed obliquely), a divided-pixel system (a multipixel structure) is proposed (e.g., see Patent Literature 3). The γ characteristic here indicates gray scale dependence of a display luminance.

In the liquid crystal display device of the divided-pixel system, as shown in FIG. 44, each of sub-pixel electrodes 301a and 301b is connected to corresponding one of drain electrodes of TFTs 302a and 302b. Moreover, each of the sub-pixel electrodes 301a and 301b is provided so as to partially overlap with corresponding one of storage capacitor lines 303. This forms each storage capacitor. In the liquid crystal display device, a storage-capacitor counter voltage supplied from a storage capacitor line 303 to a storage capacitor that belongs to one sub-pixel rises after a TFT is turned off, for example. Meanwhile, a storage-capacitor counter voltage supplied from the storage capacitor line 303 to a storage capacitor that belongs to the other sub-pixel lowers after the TFT is turned off. As a result, effective voltages applied to liquid crystal layers of the two sub-pixels become different from each other. Consequently, in response to a display signal voltage supplied from a source bus line, while one sub-pixel (hereinafter, referred to as a "bright sub-pixel") has a high luminance because a high voltage is applied to the sub-pixel electrode 301a, the other sub-pixel (hereinafter, referred to as a "dark sub-pixel") has a low luminance because a low voltage is applied to the sub-pixel electrode 301b. This makes it possible to display two different luminances and improve viewing angle dependence of γ characteristics.

Patent Literature 1
Japanese Patent Application Publication, Tokukaihei, No. 11-242225 (Publication Date: Sep. 7, 1999)
Patent Literature 2
Japanese Patent Application Publication, Tokukaihei, No. 10-333170 (Publication Date: Dec. 18, 1998)
Patent Literature 3
Japanese Patent Application Publication, Tokukai, No. 2004-62146 (Publication Date: Feb. 26, 2004)
Patent Literature 4
Japanese Patent Application Publication, Tokukaithe, No. 4-223428 (Publication Date: Aug. 13, 1992)
Patent Literature 5
Japanese Patent Application Publication, Tokukai, No. 2001-98224 (Publication Date: Apr. 10, 2001)
Patent Literature 6
Japanese Patent Application Publication, Tokukaihei, No. 6-240455 (Publication Date: Aug. 30, 1994)
Patent Literature 7
Japanese Patent Application Publication, Tokukaihei, No. 10-102003 (Publication Date: Apr. 21, 1998)
Non-Patent Literature 1
IDW (International Display Workshops) '03 (10th International Display Workshops) Proceedings, P617

SUMMARY OF INVENTION

However, in a liquid crystal display device as shown in FIG. 44, though four alignment domains (D1 to D4) are formed within each sub-pixel at the time when a gray level is displayed, alignment of liquid crystal molecules is disordered in a section along a scanning signal line due to an off voltage that is applied to the scanning signal line. This changes a substantial area balance of the alignment domains. As a result, deterioration may occur in viewing angle characteristics in up-and-down and right-and-left directions or lower-right, upper-right, upper-left, lower-left, or the like direction (i.e., a symmetric property of the viewing angle characteristics may vary). This problem becomes prominent, in particular, when fineness is improved and each pixel becomes smaller.

For example, in the liquid crystal display device as shown in FIG. 44, in a bright sub-pixel, respective areas of two alignment domains (D1 and D2) substantially decrease. A part of each of these alignment domains (D1 and D2) is positioned in a disordered alignment section $A_L$ along the scanning signal line. Meanwhile, in a dark sub-pixel, respective areas of two alignment domains (D3 and D4) substantially decrease. A part of each of these alignment domains (D3 and D4) is positioned in a disordered alignment section $A_B$ along the scanning signal line. A combination of the two alignment domains (D1 and D2) whose substantial areas decrease in the bright-pixel is different from a combination of the two alignment domains (D3 and D4) whose substantial areas decrease in the dark-pixel. However, V (voltage)-T (transmittance) characteristics of the bright sub-pixel and the dark sub-pixel are different from each other. Accordingly, the area balance of the alignment domains in each of the bright and dark sub-pixels is not compensated within one pixel.

Disorder in an alignment direction of the liquid crystal molecules occurs in the section along the scanning signal line due to a gate-off potential that is applied to the scanning signal line. This is because a potential difference between a potential Vcom of a common electrode and the gate-off potential is larger than a potential difference between the potential Vcom of the common electrode and a potential of a storage capacitor line or source bus line, in a liquid crystal display device in which a scanning signal line is provided between two sub-pixels (bright and dark sub-pixels) constituting a pixel. Potentials that are supplied to the scanning signal line, a data signal line, and the storage capacitor line, respectively, are such that, for example: a gate-off potential VgL is −6 (V); a gate-on potential VgH is 35 (V); a signal potential Vs supplied to the data signal line is 0.2 (V) to 15.2 (V); a potential supplied to the storage capacitor line is the potential Vcom (of the common electrode) ±1 (V); and the potential Vcom of the common electrode is an intermediate potential of the signal potential Vs. In a gate-off period, a potential difference between the gate-off potential VgL and the potential Vcom of the common electrode becomes the largest.

An influence of disorder in alignment in the section along the scanning signal line as described above is not limited to a liquid crystal display device of a divided-pixel system as shown in FIG. 44. For example, in a liquid crystal display device that is, as shown in FIG. 43, not of a divided-pixel system, because scanning signal lines are provided above and below a pixel electrode, disorder in alignment occurs along the scanning signal lines. This substantially decreases areas of an alignment domain in a lower right section (in FIG. 43) of a slit 201*a* and an alignment domain in an upper right section (in FIG. 43) of a slit 201*b*. In other words, because areas of only specific domains decrease, an area balance of the alignment domains in a one-pixel unit is disrupted. As a result, viewing angle characteristics may be deteriorated (a symmetric property of the viewing angle characteristics may vary).

The present invention is attained in view of the problem above. An object of the present invention is to propose an arrangement that makes it possible to prevent deterioration in viewing angle characteristics caused by disorder in alignment along a scanning signal line in a liquid crystal panel in which a plurality of alignment domains can be formed within each pixel.

A liquid crystal panel of the present invention including: an active matrix substrate including pixel areas, scanning signal lines each crossing pixel areas, and data signal lines; a counter substrate facing the active matrix substrate; and a liquid crystal layer provided between the active matrix substrate and the counter substrate, which liquid crystal panel is provided with pixels each formed to include one of the pixel areas and a section of the counter substrate which section corresponds to the one of the pixel areas, wherein: a first sub-pixel area and a second sub-pixel area are provided in each of the pixel areas, so that the first sub-pixel area and the second sub-pixel area sandwich one of the scanning signal lines; a first sub-pixel is formed to include the first sub-pixel area and a section of the counter substrate which section corresponds to the first sub-pixel area, and a second sub-pixel is formed to include the second sub-pixel area and a section of the counter substrate which section corresponds to the second sub-pixel area; a first alignment control structure is provided in the first sub-pixel and a second alignment control structure is provided in the second sub-pixel; and the first alignment control structure in one of any two adjacent pixels has a shape obtained by rotating by 180° the first alignment control structure in the other one of the two adjacent pixels.

In the liquid crystal panel, a plurality of alignment domains are formed by use of the first alignment control structure (a structure for controlling first alignment) in the first sub-pixel. Further, in the second sub-pixel, a plurality of alignment domains are formed by use of the second alignment control structure (a structure for controlling second alignment). A shape of the first alignment control structure provided in one of two pixels adjacent to each other is obtained by rotating by 180° the first alignment control structure provided in the other one of the two pixels. Accordingly, provided that the two pixels are a pixel X and a pixel Y, a type of an alignment domain formed in a section along the scanning signal line in the first sub-pixel of the pixel X is different from a type of an alignment domain formed along the scanning signal line in the second sub-pixel of the pixel Y.

Therefore, when the two pixels (X and Y) adjacent to each other are considered to be one unit, disordered alignment sections that are formed in each of two first sub-pixels (e.g., adjacent two bright sub-pixels) belonging to the two pixels X and Y is distributed to two or more types of alignment domains. This prevents disordered alignment from unevenly influencing a specific alignment domain.

In this way, according to the arrangement of the present invention, in a two-pixel unit in which two pixels are adjacent to each other, the influence of disordered alignment caused by the scanning signal line can be distributed to a plurality of alignment domains. This makes it possible to maintain a balance of viewing angle characteristics intended at the time when the liquid crystal display device is designed. As a result, it becomes possible to obtain a liquid crystal display device that is excellent in viewing angle characteristics.

The arrangement of the present invention is suitable for, for example, an MVA liquid crystal panel in which: in a case where the first alignment control structure is projected on a plane parallel to a panel surface which plane includes the scanning signal lines, a shape of the first alignment control structure on the plane is (i) asymmetric with respect to a straight line which passes through a center of the first sub-pixel area and is perpendicular to the scanning signal lines and (ii) symmetric with respect to a straight line that passes through the center of the first sub-pixel area and is parallel to the scanning signal lines; and in a case where the second alignment control structure is projected on the plane parallel to the panel surface which plane includes the scanning signal lines, a shape of the second alignment control structure on the plane is (i) asymmetric with respect to a straight line which passes through a center of the second sub-pixel area and is perpendicular to the scanning signal lines and (ii) symmetric with respect to a straight line that passes through the center of the second sub-pixel area and is parallel to the scanning signal lines.

It is preferable in the liquid crystal panel of the present invention that: in each of the pixels, the first sub-pixel corresponds to a bright pixel at a time when display is carried out and the second sub-pixel corresponds to a dark pixel at the time when display is carried out. This is because disordered alignment in a bright pixel influences a balance of viewing angle characteristics more significantly than that in a dark pixel.

In the liquid crystal panel of the present invention, it is preferable that the two adjacent pixels are the same color pixels (adjacent to each other in a direction along the data signal line). This makes it possible to distribute, to two or more types of alignment domains, disordered alignment sections in the first sub-pixels (e.g., two adjacent bright sub-pixels of the same color) that are of the same color and adjacent to each other. As a result, viewing angle characteristics can be further improved.

The liquid crystal panel of the present invention may further include: a first transistor and a second transistor that are connected to one of the data signal lines; a first pixel electrode provided in the first sub-pixel area and a second pixel electrode provided in the second sub-pixel area, wherein the first pixel electrode is connected to the first transistor and the second pixel electrode is connected to the second transistor.

The liquid crystal panel may be arranged such that: the first alignment control structure includes at least one of a rib provided on the counter substrate, a slit formed in the first pixel electrode, and a slit formed in a common electrode of the counter substrate; and the second alignment control structure includes at least one of another rib provided on the counter substrate, another slit formed in the second pixel electrode, and another slit formed in the common electrode of the counter substrate.

It is desirable in the liquid crystal panel of the present invention that: the second alignment control structure in one of the two adjacent pixels has a shape obtained by rotating by 180° the second alignment control structure provided in the other one of the two adjacent pixels. This makes it possible to distribute, to two or more types of alignment domains, disordered alignment sections in the first sub-pixels (e.g., two adjacent bright sub-pixels) that are adjacent to each other, and also to distribute, to two or more types of alignment domains, disordered alignment sections in the second sub-pixels (e.g., two adjacent dark sub-pixels) that are adjacent to each other. As a result, viewing angle characteristics can be further improved.

It is desirable in the liquid crystal panel of the present invention that, in each of the pixels, the first alignment control structure and the second alignment control structure have a substantially identical shape. This improves degrees of freedom in disposition of bright and dark pixels at the time when display is carried out.

It is preferable in the liquid crystal panel of the present invention that: in the first sub-pixel in one of the two adjacent pixels, formation of a plurality of alignments is allowed in a section along one of the scanning signal lines by use of the first alignment control structure provided in the one of the two adjacent pixels; and in the first sub-pixel in the other one of the two adjacent pixels, formation of a plurality of alignments is allowed in a section along one of the scanning signal lines by use of the first alignment control structure in the other one of the two adjacent pixels. This makes it possible to distribute, to four or more types of alignment domains, disordered alignment sections formed in the two first sub-pixels (e.g., two adjacent bright sub-pixels) in the unit (the two adjacent pixels). As a result, viewing angle characteristics can be further improved.

The liquid crystal panel of the present invention may be arranged such that: on an assumption that a direction along the scanning signal lines is a row direction, the first sub-pixel area has a shape having two edge sections along the row direction and the first alignment control structure includes at least one of (i) the rib that, when the rib is viewed in the row direction, has a letter V shape bent between the two edge sections and overlaps with each of the two edge sections of the first sub-pixel area, (ii) the slit that, when the slit is viewed in the row direction, has a letter V shape and is formed in the first pixel electrode, and (iii) the slit that, when the slit is viewed in the row direction, has a letter V shape and is formed in the common electrode. The liquid crystal panel of the present invention may also be arranged such that: on an assumption that a direction along the scanning signal lines is a row direction, the second sub-pixel area has a shape having two edge sections along the row direction and the second alignment control structure includes at least one of (i) the rib that, when the rib is viewed in the row direction, has a letter V shape bent between the two edge sections and overlaps with each of the two edge sections of the second sub-pixel area, (ii) the slit that, when the slit is viewed in the row direction, has a letter V shape and is formed in the second pixel electrode, and (iii) the slit that, when the slit is viewed in the row direction, has a letter V shape and is formed in the common electrode.

In the liquid crystal panel of the present invention, on an assumption that one pixel group is formed by three pixels that correspond to red, green, and blue, respectively, and are aligned in a row direction, in regard to two same color pixels in two pixel groups adjacent to each other in the row direction, the first alignment control structure provided in one of the two same color pixels may have a shape obtained by rotating by 180° the first alignment control structure provided in the other one of the two same color pixels. This arrangement distributes, to two or more types of alignment domains, disordered alignment sections in the two same color first sub-pixels adjacent to each other in the row direction (e.g., two same-color bright sub-pixels adjacent to each other in the row direction). As a result, viewing angle characteristics can be further improved.

The liquid crystal panel of the present invention may further includes: a first storage capacitor line forming a storage capacitor with use of the first pixel electrode or with use of a capacitor electrode that is connected to the first transistor, and a second storage capacitor line forming a storage capacitor with use of the second pixel electrode or with use of a capacitor electrode that is connected to the second transistor. In a liquid crystal display device using the liquid crystal panel, the first and second storage capacitor lines may have potentials that are controlled so that a phase of a potential waveform of one of the first and second storage capacitor lines is shifted by 180 degrees from a phase of a potential waveform of the other one of the first and second storage capacitor lines. In this case, the potential of the first storage capacitor line is controlled so that the potential rises after each of the transistors is turned off, and the potential is kept in a state in which the potential has risen until the transistor is turned off in a next frame. Simultaneously, the potential of the second storage capacitor line is controlled so that the potential falls after each of the transistors is turned off, and the potential is kept in a state in which the potential has fallen until the transistor is turned off in a next frame. Alternatively, the potential of the first storage capacitor line is controlled so that the potential falls after each of the transistors is turned off, and the potential is kept in a state in which the potential has fallen until the transistor is turned off in a next frame. Simultaneously, the potential of the second storage capacitor line is controlled so that the potential rises after each of the transistors is turned off, and the potential is kept in a state in which the potential has risen until the transistor is turned off in a next frame. Further, the potential rise of the first storage capacitor line may be sifted by one horizontal period from the potential fall of the second storage capacitor line or, alternatively, the potential fall of the first storage capacitor line may be sifted by one horizontal period from the potential rise of the second storage capacitor line.

The liquid crystal panel of the present invention may be arranged such that: a drain electrode of the first transistor is connected to the first pixel electrode via a first drain extraction line and a first contact hole, and a drain electrode of the second transistor is connected to the second pixel electrode via a second drain extraction line and a second contact hole; and at least a part of the first drain extraction line overlaps with the first alignment control structure, and at least a part of the second drain extraction line overlaps with the second alignment control structure. Further, the liquid crystal panel of the present invention may be arranged such that: at least a part of the first contact hole overlaps with the first alignment control structure, and at least a part of the second contact hole overlaps with the second alignment control structure. This makes it possible to improve an aperture ratio in a case where the alignment control structures are light-shielding.

The liquid crystal panel of the present invention may be arranged to further include: a first storage-capacitor-line extended section extending from the first storage capacitor line so as to overlap with the first pixel electrode; and a second storage-capacitor-line extended section extending from the second storage capacitor line so as to overlap with the second pixel electrode, wherein at least a part of the first storage-capacitor-line extended section overlaps with the first alignment control structure, and at least a part of the second storage-capacitor-line extended section overlaps with the second alignment control structure. This makes it possible to increase a storage capacitance by use of each storage-capacitor-line extended section, while the aperture ratio is maintained.

The liquid crystal panel of the present invention may be arranged such that: a drain electrode of the first transistor is connected to the first pixel electrode via a first drain extraction line and a first contact hole, and a drain electrode of the second transistor is connected to and the second pixel electrode via a second drain extraction line and a second contact hole; and the first drain extraction line has a first overlap section where the first drain extraction line overlaps with the first storage-capacitor-line extended section, and the second drain extraction line has a second overlap section where the second drain extraction line overlaps with the second storage-capacitor-line extended section.

In this arrangement, for example, in a case where the first transistor malfunctions, the first storage-capacitor-line extended section and the first drain extraction line can be connected by penetration through the insulation film below the first overlap section while this drain extraction line can be disconnected between the first contact hole and the first drain electrode. This makes it possible to connect the first pixel electrode present in a defective pixel and the first storage capacitor line via the first storage-capacitor-line extended section. Accordingly, a potential of the first pixel electrode can be reduced to a potential of the first storage capacitor line.

In such a case, the liquid crystal panel may be arranged such that: the first alignment control structure includes one or more slits formed in the first pixel electrode, and the second alignment control structure includes one or more slits formed in the second pixel electrode; the first contact hole is formed between the first overlap section and the first drain electrode, and the second contact hole is formed between the second overlap section and the second drain electrode; and the first drain extraction line includes a section where the first drain extraction line overlaps with a slit between the first drain electrode and the first contact hole, and the second drain extraction line includes a section where the second drain extraction line overlaps with a slit between the second drain electrode and the second contact hole. This makes it possible to produce the disconnection in a section where no pixel electrode is present. As a result, the disconnection becomes easy.

The liquid crystal panel of the present invention may be arranged such that: a drain electrode of the first transistor is connected to the first pixel electrode via a first drain extraction line and one or more contact holes, and a drain electrode of the second transistor is connected to the second pixel electrode via a second drain extraction line and another one or more contact holes; and the first drain extraction line is provided with one or more aperture sections each formed to intersect with a corresponding one of the one or more contact holes, and the second drain extraction line is provided with another one or more aperture sections each formed to intersect with a corresponding one of the another one or more contact holes. This arrangement makes it possible to improve an aperture ratio by use of the aperture section. In a case where there are a plurality of contact holes, redundancy in electrical connection between the drain extraction line and the pixel electrode can be reliably provided. As a result, bad connection can be prevented.

The liquid crystal panel of the present invention may be arranged such that: on an assumption that a direction along the data signal lines is a column direction and a direction along the scanning signal lines is a row direction, two aperture sections each having a stretching shape are formed in the first drain extraction line so that each of the two aperture sections corresponds to corresponding one of two contact holes, and an extending direction of one of the two aperture sections is in the column direction and an extending direction of the other one of the two aperture sections is in the row direction; and two aperture sections each having a stretching shape are formed in the second drain extraction line so that each of the two aperture sections corresponds to corresponding one of two contact holes, and an extending direction of one of the two aperture sections is in the column direction and an extending direction of the other one of the two aperture sections is in the row direction. This makes it possible to prevent a change in contact area even in a case where misalignment occurs.

A liquid crystal panel of the present invention includes: an active matrix substrate including pixel areas, scanning signal lines, and data signal lines; a counter substrate facing the active matrix substrate; and a liquid crystal layer provided between the active matrix substrate and the counter substrate, which liquid crystal panel is provided with pixels each formed to include (i) one of the pixel areas and a section of the counter substrate which section corresponds to the one of the pixel areas and (ii) an alignment control structure, wherein: in each of the pixels, formation of a first alignment and a second alignment is allowed in a section along one of two scanning signal lines which are provided so as to sandwich one of the pixels, and formation of a third alignment and a fourth alignment is allowed in a section along the other one of the two scanning signal lines; and the alignment control structure in one of any two adjacent pixels has a shape obtained by rotating by 180° the alignment control structure in the other one of the two adjacent pixels.

In the liquid crystal panel of the present invention, in each pixel, a plurality of alignment domains are formed by the alignment control structure. According to the arrangement, first and second alignments can be formed in a section along one of the two scanning signal lines while third and fourth alignments can be formed in a section along the other one of the two scanning signal lines. Accordingly, in a one-pixel unit, the disordered alignment sections (influence of disordered alignment) produced by two adjacent scanning signal lines above and below the one-pixel unit are distributed to four types of alignment domains (hereinafter, referred to as D1 to D4). This prevents the disordered alignment from unevenly influencing a specific alignment domain.

Further, a shape of the first alignment structure provided in one of two adjacent pixels (referred to as pixels X and Y) is obtained by rotating 180° the first alignment structure provided in the other one of the two pixels. Accordingly, in a case where the pixels X and Y in the MVA liquid crystal panel are considered, areas become close to one another in regard to (i) a disordered alignment area of the alignment domain D1 in the pixel X+a disordered alignment area of the alignment domain D1 in the pixel Y, (ii) a disordered alignment area of the alignment domain D2 in the pixel X+a disordered alignment area of the alignment domain D2 in the pixel Y, (iii) a disordered alignment area of the alignment domain D3 in the pixel X+a disordered alignment area of the alignment domain D3 in the pixel Y, and (iv) a disordered alignment area of the alignment domain D4 in the pixel X+a disordered alignment area of the alignment domain D4 in the pixel Y. In other words, the adjacent two pixels (X and Y) compensate each other in disordered alignment areas of alignment domains.

In this way, according to the arrangement of the present invention, in a one-pixel unit, an influence of disordered alignment caused by the scanning signal lines is distributed to the alignment domains (D1 to D4) and, in a two-pixel unit in which two pixels are adjacent to each other in a column direction, the influence of the disordered alignment on each of the alignment domains (D1 to D4) can be equalized. As a result, it becomes possible to maintain a balance of viewing angle characteristics intended at the time when the liquid crystal display device is designed. As a result, a liquid crystal display device excellent in viewing angle characteristics can be achieved.

The above arrangement is suitable for, for example, an MVA liquid crystal panel in which: in a case where the alignment control structure is projected on a plane parallel to a panel surface which plane includes the scanning signal lines, a projected shape of the first alignment control structure is (i) asymmetric with respect to a straight line which passes through a center of the one of the pixel areas and is perpendicular to the scanning signal lines and (ii) symmetric with respect to a straight line that passes through the center of the one of the pixel areas and is parallel to the scanning signal lines.

The liquid crystal panel of the present invention may be arranged such that: a part of the alignment control structure is present in the section along the one of the two scanning signal lines and another part of the alignment control structure is present in the section along the other one of the two scanning signal lines.

The liquid crystal panel of the present invention may be arranged such that: the two adjacent pixels are of a same color.

The liquid crystal panel of the present invention may be arranged such that: a first scanning signal line and a second scanning line that are the two scanning signal lines are provided so as to correspond to the one of the pixels sandwiched by the two scanning signal lines (an arrangement according to a divided-pixel system). In such a case, the liquid crystal panel may be arranged to further include: a first transistor connected to one of the data signal lines and the first scanning signal line; and a second transistor connected to the one of the data signal lines and the second scanning signal line, wherein: each of the pixel areas is provided with a first pixel electrode made of one transparent electrode or two or more electrically-connected transparent electrodes and a second pixel electrode made of one transparent electrode or two or more electrically-connected transparent electrodes; and the first pixel electrode is connected to the first transistor, and the second pixel electrode is connected to the second pixel electrode. Further, the liquid crystal panel may be arranged such that: the alignment control structure includes at least one of a rib provided on the counter substrate, a gap between the two or more electrically-connected transparent electrodes, a slit formed in the one transparent electrode or the two or more electrically-connected transparent electrodes, and a slit formed in a common electrode of the counter substrate. Here, the liquid crystal panel of the present invention may be arranged such that: on an assumption that a direction along the scanning signal lines is a row direction, the alignment control structure includes at least one of (i) the rib that, when the rib is viewed in the row direction, has a letter V shape, (ii) the gap which has a letter V shape when the gap is viewed in the row direction; (iii) the slit that, when the silt is viewed in the row direction, has a letter V shape and is formed in the one transparent electrode or the two or more transparent electrodes, and (iv) the slit that, when the slit is viewed in the row direction, has a letter V shape and is formed in the common electrode of the counter substrate.

The liquid crystal panel of the present invention may be arranged such that: a first scanning signal line that is one of the two scanning signal lines is provided so as to correspond to a first pixel sandwiched by the two scanning signal lines, and a second scanning signal line that is the other one of the two scanning signal lines is provided so as to correspond to a second pixel adjacent to the first pixel. In such a case, the liquid crystal panel may be arranged such that: the first pixel includes a transistor connected to the first scanning signal line, the transistor being connected to a pixel electrode provided in a pixel area of the first pixel; and the second pixel includes another transistor connected to the second scanning signal line, the another transistor being connected to another pixel electrode provided in another pixel area of the second pixel. Further, the liquid crystal panel may be arranged such that: the alignment control structure includes at least one of a rib provided on the counter substrate, a slit formed in the pixel electrode or the another pixel electrode, and a slit formed in a common electrode of the counter substrate. Here, the liquid crystal panel may be arranged such that: on an assumption that a direction along the scanning signal lines is a row direction, the alignment control structure provided in each of the pixels includes at least one of (i) the rib that, when the rib is viewed in the row direction, has a letter V shape, (ii) the slit that, when the slit is viewed in the row direction, has a letter V shape and is formed in the pixel electrode or the another pixel electrode, and (iii) the slit that, when the slit viewed in the row direction, has a letter V shape and is formed in the common electrode of the counter substrate. Note that the liquid crystal panel may be arranged such that: the second scanning signal line and the pixel electrode provided in the first pixel have a section where the second scanning signal line and the pixel electrode overlap, and the second scanning signal line serves as a first-pixel storage capacitor line.

A liquid crystal display device of the present invention includes the liquid crystal panel as described above.

In order to solve the problem described above, a liquid crystal display device of the present invention includes: an active matrix substrate where pixels are respectively provided via switching elements in positions at which scanning signal lines intersect with data signal lines, respectively; and a counter substrate, wherein: the scanning signal lines are provided through the pixels so that each of the pixels is divided into two sub-pixels and first sub-pixels and second sub-pixels are produced; the first sub-pixels and the second sub-pixels are respectively provided with alignment control structures each having a plane shape of a symbol ">" or a plane shape of a symbol "<"; and in a two-pixel unit in which two pixels are adjacent to each other, at least either a set of first sub-pixels or a set of second sub-pixels has a combination of an alignment control structure having a plane shape of a symbol ">" and another alignment control structure having another plane shape of a symbol "<" which another alignment control structure is obtained by rotating by 180 degrees the alignment control structure.

In order to solve the problem described above, a liquid crystal display device of the present invention includes: an active matrix substrate including scanning signal lines, data signal lines, storage capacitor lines, and switching elements respectively provided in positions at which the scanning signal lines intersect with the data signal lines, respectively; and a counter substrate, wherein: each one of pixels is formed in one of areas surrounded by the storage capacitor lines in a row direction and the data signal lines in a column direction; the scanning signal lines are provided through the pixels so that each of the pixels is divided into two sub-pixels and first sub-pixels and second sub-pixels are produced; the first sub-pixels and the second sub-pixels are respectively provided with alignment control structures each having a plane shape of a symbol ">" or a plane shape of a symbol "<"; and in a two-pixel unit in which two pixels are adjacent to each other, at least either a set of first sub-pixels or a set of second sub-pixels has a combination of an alignment control structure having a plane shape of a symbol ">" and another alignment control structure having another plane shape of a symbol "<" which another alignment control structure is obtained by rotating by 180 degrees the alignment control structure.

Note that the plane shape of the symbol ">" or the plane shape of the symbol "<" does not necessarily have an arrangement such that a tapered section of the shape of the symbol "<" or ">" is continuous, but may have an arrangement such that the tapered section is discontinuous.

According to the invention described above, a pixel is provided in a position where the scanning signal line and the data signal line intersect via a switching element. Note that each one pixel may be formed in an area surrounded by storage capacitor lines in the row direction and data signal lines in the column direction. In the pixel, a scanning signal line is provided so as to divide the pixel into a first sub-pixel and a second sub-pixel. Further, each of the first sub-pixel and the second sub-pixel is provided with an alignment control structure, such as a rib and a slit, having a plane shape of a symbol ">" or a plane shape of a symbol "<".

In the liquid crystal display device which has a combination of a vertical alignment mode in which liquid crystals are divided into a plurality of alignment domains and a multi-pixel structure, a disordered alignment area is produced along the scanning signal line. An alignment domain area is substantially reduced in a section where the disordered alignment area is produced. As a result, areas of the alignment domains become substantially different from one another. This may deteriorate viewing angle characteristics in up-and-down and right-and-left directions or lower-light, upper-right, upper-left, lower-left, or the like direction.

In order to solve this problem, according to the present invention, in a two-pixel unit in which two pixels are adjacent to each other, in a case where the alignment control structure has a plane shape of a symbol ">", the arrangement has a combination of the alignment control structure in the plane shape of the symbol ">" and the alignment control structure that has the shape of the symbol "<" and that is obtained by rotating by 180 degrees the alignment control structure having the shape of the symbol ">". Meanwhile, in a case where the alignment control structure has the plane shape of the symbol "<", the arrangement has a combination of the alignment control structure in the plane shape of the symbol "<" and the alignment control structure that has the shape of the symbol ">" and that is obtained by rotating by 180 degrees the alignment control structure in the shape of the symbol ">". This equalizes each ratio of the disordered alignment area along the scanning signal line in each alignment domain of at least first sub-pixels in the two-pixel unit. As a result, it becomes possible to suppress damage to viewing angle characteristics intended at the time when the liquid crystal display device is designed.

Accordingly, it becomes possible to provide a liquid crystal display device (i) which has a combination of a vertical alignment mode in which liquid crystals are divided into a plurality of alignment domains and a multi-pixel structure and (ii) which makes it possible to prevent deterioration in viewing angle characteristics caused by a disordered alignment area that occurs along the scanning signal line dividing a pixel.

The liquid crystal display device of the present invention may be arranged such that: each of the first sub-pixels includes a first sub-pixel electrode connected to a drain electrode of a first transistor that is a switching element, while each of the second sub-pixels includes a second sub-pixel electrode connected to a drain electrode of a second transistor that is another switching element; and a potential of the first sub-pixel electrode and a potential of the second sub-pixel electrode are individually controlled.

Accordingly, for example, the first sub-pixel can be arranged to be a bright sub-pixel and the second sub-pixel can be arranged to be a dark sub-pixel. Therefore, it becomes possible to achieve a divided-pixel drive for improving viewing angle dependence of γ characteristics.

The liquid crystal display device of the present invention may be arranged such that: each of the first sub-pixels includes a first sub-pixel electrode connected to a drain electrode of a first transistor that is a switching element, while each of the second sub-pixels includes a second sub-pixel electrode connected to a drain electrode of a second transistor that is another switching element; each of the first sub-pixels has a first storage capacitor formed between the first sub-pixel electrode and a first storage capacitor line, that is one of the storage capacitor lines and provided on an edge-section side of the first sub-pixel electrode, while each of the second sub-pixels has a second storage capacitor formed between the second sub-pixel electrode and a second storage capacitor line, that is another one of the storage capacitor lines and provided on an edge-section side of the second sub-pixel electrode; and a storage-capacitor-line voltage control section is provided, the storage-capacitor-line voltage control section controlling a potential of the first sub-pixel electrode and a potential of the second sub-pixel electrode, individually, by individually controlling the storage capacitor lines.

According to the invention, the storage-capacitor-line voltage control section controls potentials of the storage capacitor lines, individually. As a result, the potentials of the first sub-pixel and the second sub-pixel are separately controlled.

Accordingly, for example, the first sub-pixel can be arranged to be a bright sub-pixel and the second sub-pixel can be arranged to be a dark sub-pixel. Therefore, it becomes possible to achieve a divided-pixel drive for improving viewing angle dependence of γ characteristics.

The description "each of the first sub-pixels has a first storage capacitor formed between the first sub-pixel electrode and a first storage capacitor line, that is one of the storage capacitor lines and provided on an edge-section side of the first sub-pixel electrode, while each of the second sub-pixels has a second storage capacitor formed between the second sub-pixel electrode and a second storage capacitor line, that is another one of the storage capacitor lines and provided on an edge-section side of the second sub-pixel electrode" indicates that each of the first and second storage capacitors may be formed so as to sandwich a gate insulation film and/or an interlayer insulation film between a storage capacitor line and the first sub-pixel electrode or the second sub-pixel electrode Alternatively, according to the description, the arrangement may be such that: an on-storage-capacitor electrode is provided on the storage capacitor line; each of the first and second storage capacitors is formed by the storage capacitor line and the on-storage-capacitor electrode that sandwich the gate insulation film; and connection is made (i) between the on-storage-capacitor electrode and the first sub-pixel electrode and (ii) between the on-storage-capacitor electrode and the second sub-pixel electrode.

The liquid crystal display device of the present invention is arranged such that: in a state where a gray level is displayed, storage capacitor line signals are controlled so as to produce difference in luminance between each of the first sub-pixels and corresponding one of the second sub-pixels, so that a luminance of the each of the first sub-pixels is higher than a luminance of the corresponding one of the second sub-pixels.

According to the arrangement, a bright first sub-pixel and a dark second sub-pixel can be produced.

The description of a "gray level" indicates any gray scale level except black (the lowest gray scale level) and white (the highest gray scale level).

The liquid crystal display device of the present invention is such that: in a two-pixel unit in which two pixels are adjacent to each other, a set of first sub-pixels has a combination of an alignment control structure having a plane shape of a symbol ">" and another alignment control structure having another plane shape of a symbol "<" which another alignment control structure is obtained by rotating by 180 degrees the alignment control structure, in a state where a gray level is displayed and the first sub-pixels respectively have higher luminances than the second sub-pixels.

As a result, in the first sub-pixels each having a high luminance in the pixels, directions of the alignment control structures are opposite to each other. This equalizes each ratio of the disordered alignment area along the scanning signal line in each alignment domain of at least first sub-pixels that are bright sub-pixels. Therefore, the first sub-pixel having a high luminance barely influences viewing angle characteristics though the first sub-pixel is noticed more easily than the second sub-pixel. In a liquid crystal display device having a so-called multi-pixel structure of a vertical alignment mode, the above arrangement makes it possible, in a case where a gray level display is performed, to prevent damage to the viewing angle characteristics intended at the time when the liquid crystal display is designed.

The liquid crystal display of the present invention may be arranged such that: sets each including an alignment control structure of one of the first sub-pixels and an alignment control structure of one of the second sub-pixels in one of the pixels, out of the alignment control structures, are formed so that each of the sets has a plane shape sequentially repeating a shape of a symbol ">" twice or a plane shape sequentially repeating a shape of a symbol "<" twice; and a two-pixel unit in which two pixels are adjacent to each other has a combination of (i) a set of alignment control structures which set has a plane shape sequentially repeating a shape of a symbol ">" twice and (ii) another set of alignment control structures which set has another plane shape sequentially repeating a shape of a symbol "<" twice which another plane shape is obtained by rotating by 180 degrees the set of the alignment control structures.

As a result, one pixel as a whole is provided with (i) a set of alignment control structures having a plane shape sequentially repeating a shape of a symbol ">" twice or (ii) a set of alignment control structures having a plane shape that is obtained by rotating by 180 degrees the above alignment control structure having the plane shape sequentially repeating the shape of the symbol ">" twice and that is of a plane shape sequentially repeating a shape of a symbol "<" twice. As a result, liquid crystal molecules in one pixel can be divided into two sets of four alignment domains in one pixel. Further, another pixel adjacent to the above one pixel is provided with a set of alignment control structures of the shape that is obtained by rotating by 180 degrees the above set of alignment control structures having the plane shape sequentially repeating the shape of the symbol ">" twice and that is of the plane shape sequentially repeating the shape of the symbol "<" twice. Therefore, in this one pixel as a whole, liquid crystal molecules also can be divided into two sets of four alignment domains. As a result, in every one pixel, two sets of four alignment domains into which liquid crystal molecules are divided can be reliably provided.

A two-pixel unit in which two pixels are adjacent to each other satisfies a relation such that a set of alignment control structures of the plane shape sequentially repeating the shape of the symbol ">" twice is provided in combination with a set of alignment control structures of the shape that is of a plane shape sequentially repeating the shape of the symbol "<" twice and that is obtained by rotating by 180 degrees the set of the alignment control structures of the plane shape sequentially repeating the shape of the symbol ">" twice. Accordingly, it becomes possible to prevent deterioration in viewing angle characteristics caused by a disordered alignment area that is produced along the scanning signal line dividing the pixel. This makes it possible to prevent damage to a balance of the viewing angle characteristics intended at the time when the liquid crystal display device is designed.

In order to solve the problem mentioned above, a liquid crystal display device of the present invention includes: an active matrix substrate where pixels are respectively provided via switching elements in positions at which scanning signal lines intersect with data signal lines, respectively; and a counter substrate, wherein: the scanning signal lines are provided through the pixels so that each of the pixels is divided into two sub-pixels and first sub-pixels and second sub-pixels are produced; the first sub-pixels and the second sub-pixels are respectively provided with alignment control structures each having a plane shape of a symbol ">" or a plane shape of a symbol "<"; the pixels form picture elements each made of a group of pixels corresponding to red, green, and blue; and a set of picture elements adjacent to each other out of the picture elements has a combination of alignment control structures each having a plane shape of a symbol ">" and other alignment control structures each having a shape of a symbol "<" which other alignment control structures are respectively obtained by rotating by 180 degrees the alignment control structures.

In order to solve the problem described above, a liquid crystal display device of the present invention includes: an active matrix substrate including scanning signal lines, data signal lines, storage capacitor lines, and switching elements respectively provided in positions at which the scanning signal lines intersect with the data signal lines, respectively; and a counter substrate, wherein: each one of pixels is formed in one of areas surrounded by the storage capacitor lines in a row direction and the data signal lines in a column direction; the scanning signal lines are provided through the pixels so that each of the pixels is divided into two sub-pixels and first sub-pixels and second sub-pixels are produced; the first sub-pixels and the second sub-pixels are respectively provided with alignment control structures each having a plane shape of a symbol ">" shape or a plane shape of a symbol "<" shape; the pixels form picture elements each made of a group of pixels corresponding to red, green, and blue; and a set of picture elements adjacent to each other out of the picture elements has a combination of alignment control structures each having a plane shape of a symbol ">" and other alignment control structures each having a shape of a symbol "<" which other alignment control structures are respectively obtained by rotating by 180 degrees the alignment control structures.

According to the invention, the picture elements adjacent to each other are provided with a combination of an alignment control structure having a plane shape of a symbol ">" and an alignment control structure that has a shape of a symbol "<" and that is obtained by rotating by 180 degrees the alignment control structure having the shape of the symbol ">". This makes it possible to prevent deterioration in uniformity in viewing angle of each color in the same color pixels of the picture elements adjacent to each other. That is, it becomes possible to prevent damage to a balance of viewing angle characteristics intended at the time when the liquid crystal display device is designed in color display. This arrangement is particularly suitable for monochrome display.

In order to solve the problem described above, a liquid crystal display device of the present invention includes: an active matrix substrate where pixels are respectively provided via switching elements in positions at which scanning signal lines intersect with data signal lines, respectively; and a counter substrate, wherein: the scanning signal lines are provided through the pixels so that each of the pixels is divided into two sub-pixels and first sub-pixels and second sub-pixels are produced; the first sub-pixels and the second sub-pixels are respectively provided with alignment control structures each having a plane shape of a symbol ">" or a plane shape of a symbol "<"; the pixels form picture elements each made of a group of pixels corresponding to red, green, and blue; and a set of same color pixels in picture elements adjacent to each other out of the picture elements has a combination of an alignment control structure having a plane shape of a symbol ">" and another alignment control structure having a shape of a symbol "<" which another alignment control structure is obtained by rotating by 180 degrees the alignment control structure.

In order to solve the problem described above, a liquid crystal display device of the present invention includes: an active matrix substrate including scanning signal lines, data signal lines, storage capacitor lines, and switching elements respectively provided in positions at which the scanning signal lines intersect with the data signal lines, respectively; and a counter substrate, wherein: each one of pixels is formed in one of areas surrounded by the storage capacitor lines in a row direction and the data signal lines in a column direction; the scanning signal lines are provided through the pixels so that each of the pixels is divided into two sub-pixels and first sub-pixels and second sub-pixels are produced; the first sub-pixels and the second sub-pixels are respectively provided with alignment control structures each having a plane shape of a symbol ">" shape or a plane shape of a symbol "<" shape; the pixels form picture elements each made of a group of pixels corresponding to red, green, and blue; and a set of same color pixels in picture elements adjacent to each other out of the picture elements has a combination of alignment control structures each having a plane shape of a symbol ">" and other alignment control structures each having a shape of a symbol "<" which other alignment control structures are respectively obtained by rotating by 180 degrees the alignment control structures.

According to the invention, the same color pixels in the picture elements adjacent to each other are provided with a combination of an alignment control structure having a plane shape of a symbol ">" and an alignment control structure that has a shape of a symbol "<" and that is obtained by rotating by 180 degrees the alignment control structure having the shape of the symbol ">". This can prevent deterioration in uniformity in viewing angle of each color in the same color pixels adjacent to each other. That is, it becomes possible to prevent damage to a balance of viewing angle characteristics intended at the time when the liquid crystal display device is designed in color display. This arrangement is particularly suitable for monochrome display.

The liquid crystal display device of the present invention may be arranged such that: each of the first sub-pixels includes a first sub-pixel electrode connected to a drain electrode of a first transistor that is a switching element, while each of the second sub-pixels includes a second sub-pixel electrode connected to a drain electrode of a second transistor that is another switching element; the drain electrode provided in each of the first sub-pixels and the second sub-pixels is connected to the first sub-pixel electrode or the second sub-pixel electrode via one of drain extraction lines; and the one of the drain extraction lines of at least one of the pixels is provided so as to overlap with one of the alignment control structures.

In other words, the drain electrode and the drain extraction line are generally formed by a metal wiring that is not transparent. Accordingly, in a case where the drain extraction line overlaps with the first sub-pixel electrode or the second sub-pixel electrode, a so-called aperture area that is a display area decreases. In regard to this point, in the present invention, the drain extraction line of at least one pixel is provided so as to overlap with the alignment control structure, such as a rib and a slit. Accordingly, the drain extraction line can be provided in an area that does not contribute to the aperture area. As a result, a decrease in an aperture ratio can be prevented.

The liquid crystal display of the present invention may be arranged such that: each of the storage capacitor lines has a storage-capacitor-line extended section extending on a side provided with one of the pixels; and the storage-capacitor-line extended section is provided so as to overlap with one of the alignment control structures.

The storage capacitor line and the storage-capacitor-line extended section are generally formed by a metal wiring that is not transparent. Accordingly, in a case where the storage-capacitor-line extended section overlaps with a first sub-pixel electrode or a second sub-pixel electrode, a so-called aperture area that is a display area decreases. In regard Lo this point, in the present invention, the storage-capacitor-line extended section is provided so as to overlap with an alignment control structure, such as a rib and a slit. Accordingly, the storage-capacitor-line extended section can be provided in an area that does not contribute to the aperture area. As a result, a decrease in the aperture ratio can be prevented.

The liquid crystal display device of the present invention may be arranged such that: each of the first sub-pixels includes a first sub-pixel electrode connected to a drain electrode of a first transistor that is a switching element, while each of the second sub-pixels includes a second sub-pixel electrode connected to a drain electrode of a second transistor that is another switching element; the drain electrode provided in each of the first sub-pixels and the second sub-pixels is connected to the first sub-pixel electrode or the second sub-pixel electrode via one of drain extraction lines; the one of the drain extraction lines of at least one of the pixels is provided so as to overlap with one of the alignment control structures; each of the storage capacitor lines has a storage-capacitor-line extended section extending on a side provided with one of the pixels; and the storage-capacitor-line extended section is provided so as to overlap with one of the alignment control structures.

This makes it possible to provide the drain extraction line and the storage-capacitor-line extended section in an area that does not contribute to the aperture area. As a result, a decrease in the aperture ratio can be prevented.

The liquid crystal display device of the present invention may be arranged such that: each of the first sub-pixels includes a first sub-pixel electrode connected to a drain electrode of a first transistor that is a switching element, while each of the second sub-pixels includes a second sub-pixel electrode connected to a drain electrode of a second transistor that is another switching element; the drain electrode provided in each of the first sub-pixels and the second sub-pixels is connected to the first sub-pixel electrode or the second sub-pixel electrode via one of drain extraction lines; each of the storage capacitor lines has a storage-capacitor-line extended section extending on a side provided with one of the drain extraction lines, and the storage-capacitor-line extended section includes an overlap section where the each of the storage capacitor lines overlaps with the one of the drain extraction lines via an insulation film; and in the overlap section, connection between the one of the drain extraction lines and the storage-capacitor-line extended section is allowed by penetration through the insulation film.

According to the invention, the storage capacitor line has the storage-capacitor-line extended section extending on a side provided with the drain extraction line. Further, the storage-capacitor-line extended section includes an overlap section that overlaps with the drain extraction line via the insulation film. The overlap section makes it possible to connect the drain extraction line and the storage-capacitor-line extended section by penetration through the insulation film.

Accordingly, for example, in a case where the switching element malfunctions, the storage-capacitor-line extended section and the drain extraction line are connected through the insulation film by penetration through the insulation film. Further, this drain extraction line is disconnected, for example, between the drain electrode and the contact hole that is a connection section with the first sub-pixel electrode or the second sub-pixel electrode. As a result, a potential of the first sub-pixel electrode or the second sub-pixel electrode of a defective pixel can be reduced to a potential of the storage capacitor line.

Accordingly, for example, in a case where the present invention is applied to a normally black liquid crystal display device, a defective pixel that malfunctions is changed to a black dot and the defective pixel is prevented from being noticeable.

The liquid crystal display device of the present invention may be arranged such that: each of the drain extraction lines is connected to the first sub-pixel electrode or the second sub-pixel electrode via at least one contact hole formed between the drain electrode and the overlap section; and each of the drain extraction lines is provided so as to overlap with one of the alignment control structures between the drain electrode and the at least one contact hole.

According to the arrangement, for example, in a case where the switching element malfunctions, the drain extraction line can be disconnected at the overlap section with the alignment control structure such as a slit that is a section where there is no pixel electrode. As a result, the disconnection becomes easy.

In a case where a plurality of contact holes are provided, it becomes possible to reliably provide redundancy in electrical connection between the drain extraction line and the first sub-pixel electrode or the second sub-pixel electrode. As a result, bad connection can be prevented.

The liquid crystal display device of the present invention may be arranged such that: each of the drain extraction lines has an aperture section that is formed so that the aperture section intersects with the at least one contact hole.

The drain extraction line is generally formed by a metal wiring that is not transparent. Accordingly, in a case where the drain extraction line overlaps with the contact hole of the first sub-pixel electrode or the contact hole of the second sub-pixel electrode, a so-called aperture ratio that is a display area decreases. In regard to this point, in the present invention, the drain extraction line is provided with an aperture section intersecting with the contact hole. Accordingly, a decrease in the aperture ratio at the contact hole can be prevented.

Moreover, the aperture section of the drain extraction line is arranged to intersect with the contact hole. Accordingly, while a decrease in an aperture ratio at the contact hole is suppressed, for example, a contact between the drain extraction line and the contact hole can be sufficiently provided even in a case where misalignment occurs in a production process.

The liquid crystal display device of the present invention may be arranged such that: switching elements of pixel units adjacent to each other in a column direction, out of the switching elements, are connected to different data signal lines.

According to the arrangement, even when a source line inversion drive is carried out, each pixel is subjected to a dot inversion drive. Accordingly, a period for inversion of a polarity to be applied to the data signal line (source line) can be decreased compared with the dot inversion drive. This can prevent deterioration in image quality caused by delay in a signal in the data signal line. Further, it becomes possible to prevent a flicker or a crosstalk phenomenon caused by the source line inversion drive. In addition, it becomes possible to achieve an efficient pattern arrangement that suppresses a decrease in the aperture ratio.

Patent Literature 4 discloses a technique in which transistors in pixels adjacent to each other in a column direction is connected to respectively different data signal lines in the source line inversion drive. However, the present invention is superior to the technique disclosed in Patent Literature 4 because (a) the present invention provides a liquid crystal display (i) which has a combination of a multi-pixel structure and a vertical alignment mode in which liquid crystal molecules are divided into a plurality of alignment domains and (ii) which prevents deterioration in viewing angle characteristics in a disordered alignment area that is produced along the scanning signal line diving a pixel, and further (b) the present invention allows an efficient pattern arrangement that suppresses deterioration in an aperture ratio.

The liquid crystal display device of the present invention may be arranged such that: a potential of one of storage-capacitor-line signals rises or falls after the first transistor or the second transistor is turned off and the potential is controlled to stay at a potential having risen or fallen until the first transistor or the second transistor is turned off in a next frame.

This reduces an influence which is produced on an effective potential of a drain by distortion in a waveform of a voltage applied to the storage capacitor line. This is effective for reducing luminance unevenness.

The liquid crystal display device of the present invention may be arranged such that: a rise in the potential of the one of the storage-capacitor-line signals is shifted by one horizontal period from a fall in a potential of another one of the storage-capacitor-line signals.

This pattern of the storage-capacitor signal waveform makes it possible to share one storage capacitor line between sub-pixels adjacent to each other in a column direction, even in the case of the storage capacitor signal waveform that stay boosted or depressed.

In order to solve the problem described above, a liquid crystal display device of the present invention includes: an active matrix substrate where pixels are respectively provided via switching elements in positions at which scanning signal lines intersect with data signal lines, respectively; and a counter substrate, wherein: the scanning signal lines are provided through the pixels so that each of the pixels is divided into two sub-pixels and first sub-pixels and second sub-pixels are produced; each of (i) the active matrix substrate including the first sub-pixels and the second sub-pixels and (ii) the counter substrate is provided with alignment control structures that are formed so as to divide liquid crystal molecules into a plurality of alignment domains, and, on an assumption that, in the first sub-pixels and the second sub-pixels, each one domain set of pluralities of domain sets is formed by alignment domains whose alignment directions of the liquid crystal molecules are opposed to each other, a plurality of domain sets are formed in each of the first sub-pixels and the second sub-pixels so that directions in each of which alignment directions of the liquid crystal molecules are opposed to each other are different; and the alignment control structures are formed so that, in a two-pixel unit in which two pixels are adjacent to each other, every two domain sets in at least either the first sub-pixels or the second sub-pixels have an equal ratio of disordered alignment areas along scanning signal lines.

In order to solve the problem described above, a liquid crystal display device of the present invention includes: an active matrix substrate including scanning signal lines, data signal lines, storage capacitor lines, and switching elements respectively provided in positions at which the scanning signal lines intersect with the data signal lines, respectively; and a counter substrate, wherein: each one of pixels is formed in one of areas surrounded by the storage capacitor lines in a row direction and the data signal lines in a column direction; the scanning signal lines are provided through the pixels so that each of the pixels is divided into two sub-pixels and first sub-pixels and second sub-pixels are produced; each of (i) the active matrix substrate including the first sub-pixels and the second sub-pixels and (ii) the counter substrate is provided with alignment control structures that are formed so as to divide liquid crystal molecules into a plurality of alignment domains, and, on an assumption that, in the first sub-pixels and the second sub-pixels, each one domain set of pluralities of domain sets includes domains whose alignment directions of the liquid crystal molecules are opposed to each other, a plurality of domain sets are formed in each of the first sub-pixels and the second sub-pixels so that directions in each of which alignment directions of the liquid crystal molecules are opposed to each other are different; and the alignment control structures are formed so that, in a two-pixel unit in which two pixels are adjacent to each other, every two domain sets in at least either the first sub-pixels or the second sub-pixels have an equal ratio of disordered alignment areas along scanning signal lines.

According to the invention, on an assumption that domains whose alignment directions of liquid crystal molecules are opposed to each other form each one set in the first sub-pixel and the second sub-pixel, a plurality of sets are formed in each of the first sub-pixel and the second sub-pixel so that directions in each of which the alignment directions are opposed to each other are different. The present invention is characterized in that the alignment control structures are formed so that, in at least either the first sub-pixels or the second sub-pixels in a two-pixel unit in which two pixels are adjacent to each other, every two sets have an equal ratio of the disordered alignment areas along the scanning signal lines.

Accordingly, between at least every two sets in the first sub-pixels in the two-pixel unit in which two pixels are adjacent to each other have an equal ratio of disordered alignment areas along the scanning signal lines. This can prevent damage to viewing angle characteristics intended at the time when the liquid crystal display device is designed.

Accordingly, it becomes possible to provide a liquid crystal display device (i) which has a combination of the multi pixel structure and the vertical alignment mode in which liquid crystal molecules are divided into a plurality of alignment domains and (ii) which makes it possible to prevent deterioration in viewing angle characteristics caused by a disordered alignment area that occurs along the scanning signal line dividing a pixel.

As a case described above other than a case where each alignment control structure has a plane shape of a symbol ">" or a plane shape of a symbol "<", there may be, for example, cases where: the alignment control structure is provided as a punctiform rib; and liquid crystals are aligned in a radial pattern.

In order to solve the problem described above, a liquid crystal display device of the present invention includes: an active matrix substrate where pixels are respectively provided via switching elements in positions at which scanning signal lines intersect with data signal lines, respectively; and a counter substrate, wherein: the scanning signal lines are provided through the pixels so that each of the pixels is divided into two sub-pixels and first sub-pixels and second sub-pixels are produced; each of (i) the active matrix substrate including the first sub-pixels and the second sub-pixels and (ii) the counter substrate is provided with alignment control structures that are formed so as to divide liquid crystal molecules into a plurality of alignment domains; and the alignment control structures are formed so that, in a two-pixel unit in which two pixels are adjacent to each other, opposed lengths of every two alignment domains in at least either the first sub-pixels or the second sub-pixels with respect to a scanning signal line are different from each other.

In order to solve the problem described above, a liquid crystal display device includes: an active matrix substrate including scanning signal lines, data signal lines, storage capacitor lines, and switching elements respectively provided in positions at which the scanning signal lines intersect with the data signal lines, respectively; and a counter substrate, wherein: each one of pixels is formed in one of areas surrounded by the storage capacitor lines in a row direction and the data signal lines in a column direction; the scanning signal lines are provided through the pixels so that each of the pixels is divided into two sub-pixels and first sub-pixels and second sub-pixels are produced; each of the (i) active matrix substrate including the first sub-pixels and the second sub-pixels and (ii) the counter substrate is provided with alignment control structures that are formed so as to divide liquid crystal molecules into a plurality of alignment domains; and the alignment control structures are formed so that, in a two-pixel unit in which two pixels are adjacent to each other, opposed lengths of every two alignment domains in at least either the first sub-pixels or the second sub-pixels with respect to a scanning signal line are different from each other.

Conventionally, in at least either first sub-pixels or the second sub-pixels in a two-pixel unit in which two pixels are adjacent to each other, an opposed length of each alignment domain with respect to the scanning signal line in one of the first sub-pixels or the second sub-pixels is the same as an opposed length of each corresponding alignment domain in the other one of the first sub-pixels or the second sub-pixels. Accordingly, for example, in the first alignment domain and the second alignment domain in the vicinity of the disordered alignment area along the scanning signal line, viewing angle characteristics are always influenced by the disordered alignment area. Meanwhile, in the third alignment domain and the fourth alignment domain that are not along the scanning signal line, viewing angle characteristics are not influenced by the disordered alignment area. Consequently, symmetric properties of the viewing angle characteristics are varied and one alignment domain always has the same viewing angle characteristics. This causes difference in viewing angle characteristics in up-and-down and right-and-left directions or lower-light, upper-right, upper-left, lower-left, or the like direction.

In regard to this point, according to the present invention, the alignment control structures are formed so that opposed lengths of each alignment domain with respect to the scanning signal lines vary in at least either the first sub-pixels or the second sub-pixels.

As a result, an influence of the disordered alignment areas along the scanning signal lines is distributed to each alignment domain. As a result, the disordered alignment areas are prevented from unevenly influencing one alignment domain.

This makes it possible to suppress significant damage to a balance of viewing angle characteristics intended at the time when the liquid crystal display device is designed.

Accordingly, it becomes possible to provide a liquid crystal display device (i) which has a combination of a vertical alignment mode in which liquid crystal molecules are divided into a plurality of alignment domains and a multi-pixel structure and (ii) which makes it possible to prevent deterioration in viewing angle characteristics caused by a disordered alignment area produced along the scanning signal line dividing a pixel.

In order to solve the problem described above, a liquid crystal display device of the present invention includes: a plurality of pixels formed on a plane; first sub-pixels and second sub-pixels obtained by dividing the pixels by scanning signal lines, respectively; and sets of a plurality of domains respectively included in the first sub-pixels and the second sub-pixels; the liquid crystal display device having a multi-domain structure in which the plurality of domains are formed so as to be asymmetrical with respect to an axis of symmetry which axis is orthogonal to the scanning signal lines, wherein: in a two-pixel unit in which two pixels are adjacent to each other in an arrangement direction, a boundary between the plurality of domains in one pixel and another boundary between the plurality of domains in the other pixel are provided to be axisymmetrical with respect to the axis of symmetry in at least either the first sub-pixels or the second sub-pixels.

According to the invention, in at least either the first sub-pixels or the second sub-pixels in a two-pixel unit in which two pixels are adjacent to each other, boundaries between domains are provided so as to be axisymmetrical with respect to the axis of symmetry.

As a result, in at least either the first sub-pixels or the second sub-pixels in the two-pixel unit in which two pixels are adjacent to each other, a ratio of a disordered alignment area along the scanning signal line is distributed to each domain. As a result, it becomes possible to prevent a balance of viewing angle characteristics intended at the time when the liquid crystal display device is designed.

Accordingly, it becomes possible to provide a liquid crystal display device (i) which has a combination of a vertical alignment mode in which liquid crystal molecules are divided into a plurality of alignment domains and a multi-pixel structure and (ii) which makes it possible to prevent deterioration in viewing angle characteristics caused by a disordered alignment area produced along the scanning signal line dividing a pixel.

In order to solve the problem described above, a television device of the present invention includes the liquid crystal display device described above.

This makes it possible to provide a television device including a liquid crystal display device (i) which has a combination of a vertical alignment mode in which liquid crystal molecules are divided into a plurality of alignment domains and a multi-pixel structure and (ii) which makes it possible to prevent deterioration in viewing angle characteristics caused by a disordered alignment area produced along the scanning signal line dividing a pixel.

As described above, the liquid crystal display device of the present invention is arranged such that: the scanning signal lines are provided through the pixels so that each of the pixels is divided into two sub-pixels and first sub-pixels and second sub-pixels are produced; the first sub-pixels and the second sub-pixels are respectively provided with alignment control structures each having a plane shape of a symbol ">" or a plane shape of a symbol "<"; and in a two-pixel unit in which two pixels are adjacent to each other, at least either a set of first sub-pixels or a set of second sub-pixels has a combination of an alignment control structure having a plane shape of a symbol ">" and another alignment control structure having another plane shape of a symbol "<" which another alignment control structure is obtained by rotating by 180 degrees the alignment control structure.

As described above, the liquid crystal display device of the present invention is arranged such that: the scanning signal lines are provided through the pixels so that each of the pixels is divided into two sub-pixels and first sub-pixels and second sub-pixels are produced; the first sub-pixels and the second sub-pixels are respectively provided with alignment control structures each having a plane shape of a symbol ">" or a plane shape of a symbol "<"; the pixels form picture elements each made of a group of pixels corresponding to red, green, and blue; and a set of picture elements adjacent to each other out of the picture elements has a combination of alignment control structures each having a plane shape of a symbol ">" and other alignment control structures each having a shape of a symbol "<" which other alignment control structures are respectively obtained by rotating by 180 degrees the alignment control structures.

As described above, the liquid crystal display device of the present invention is arranged such that: the scanning signal lines are provided through the pixels so that each of the pixels is divided into two sub-pixels and first sub-pixels and second sub-pixels are produced; the first sub-pixels and the second sub-pixels are respectively provided with alignment control structures each having a plane shape of a symbol ">" or a plane shape of a symbol "<"; the pixels form picture elements each made of a group of pixels corresponding to red, green, and blue; and a set of same color pixels in picture elements adjacent to each other out of the picture elements has a combination of an alignment control structure having a plane shape of a symbol ">" and another alignment structure having a shape of a symbol "<" which another alignment control structure is obtained by rotating by 180 degrees the alignment control structure.

As described above, the liquid crystal display device of the present invention is arranged such that: the scanning signal lines are provided through the pixels so that each of the pixels is divided into two sub-pixels and first sub-pixels and second sub-pixels are produced; each of (i) the active matrix substrate including the first sub-pixels and the second sub-pixels and (ii) the counter substrate is provided with alignment control structures that are formed so as to divide liquid crystal molecules into a plurality of alignment domains, and, on an assumption that, in the first sub-pixels and the second sub-pixels, each one domain set of pluralities of domain sets is formed by alignment domains whose alignment directions of the liquid crystal molecules are opposed to each other, a plurality of domain sets are formed in each of the first sub-pixels and the second sub-pixels so that directions in each of which alignment directions of the liquid crystal molecules are opposed to each other are different; and the alignment control structures are formed so that, in a two-pixel unit in which two pixels are adjacent to each other, every two domain sets in at least the first sub-pixels have an equal ratio of disordered alignment areas along scanning signal lines.

As described above, the liquid crystal display device of the present invention is arranged such that: the scanning signal lines are provided through the pixels so that each of the pixels is divided into two sub-pixels and first sub-pixels and second sub-pixels are produced; each of (i) the active matrix substrate including the first sub-pixels and the second sub-pixels and (ii) the counter substrate is provided with alignment control structures that are formed so as to divide liquid crystal molecules into a plurality of alignment domains; and the alignment control structures are formed so that, in a two-pixel unit in which two pixels are adjacent to each other, opposed lengths of every two alignment domains in at least either the first sub-pixels or the second sub-pixels with respect to a scanning signal line are different from each other.

In addition, the television device of the present invention, as described above, includes the above described liquid crystal display device.

Therefore, the present invention makes it possible to provide a liquid crystal display device and a television device (i) each of which has a combination of a vertical alignment mode in which liquid crystal molecules are divided into a plurality of alignment domains and a multi-pixel structure and (ii) each of which makes it possible to prevent deterioration in viewing angle characteristics caused by a disordered alignment area produced along the scanning signal line dividing a pixel.

BRIEF DESCRIPTION OF DRAWINGS

FIG. 8 is a plan view illustrating an example of an arrangement of slits and ribs that are formed in each pixel of the liquid crystal display device of the present invention.

FIG. 14 illustrates a drive method of the liquid crystal display device of the present invention. (a) of FIG. 14 is a plan view illustrating a normal wiring that carries out a dot-inversion drive. (b) of FIG. 14 is a plan view illustrating a normal wiring that carries out a source-line inversion drive. (c) of FIG. 14 is a plan view illustrating a staggered wiring that carries out a source-line inversion drive.

FIG. 40 is a cross sectional view explaining alignment in the liquid crystal display device (an arrangement including ribs and slits as alignment control structures) of the present invention.

FIG. 41 is a cross sectional view explaining alignment in the liquid crystal display device (an arrangement including only a slit as an alignment control structure) of the present invention.

REFERENCE SIGNS LIST

1 Pixel Electrode
1a First Sub-pixel Electrode
1b Second Sub-pixel Electrode
2 Scanning Signal Line
3 Data Signal Line
4a First TFT (Switching Element, First Transistor)
4b Second TFT (Switching Element, Second Transistor)
5a First Source Electrode
5b Second Source Electrode
6a First Drain Electrode (Drain Electrode)
6b Second Drain Electrode (Drain Electrode)
7a First Drain extraction Line (Drain extraction Line)
7b Second Drain extraction Line (Drain extraction Line)
8a First Contact Hole (Contact Hole)
8b Second Contact Hole (Contact Hole)
10 Active Matrix Substrate
11 First Storage Capacitor Line (Storage Capacitor Line)
11a Storage-Capacitor-Line Extended Section
12 Second Storage Capacitor Line (Storage Capacitor Line)
12a Storage-Capacitor-Line Extended Section
13 Overlap Section
14 Aperture Section
20 Color Filter Substrate (Counter Substrate)
30 Liquid Crystal Display Device
31 Display Section
32 Gate Driver
33 Source Driver
34 CS Control Circuit (Storage Capacitor Line Voltage Control Section)
35 Display Control Circuit
40 Liquid Crystal Display Device
50 Liquid Crystal Display Device
70 Liquid Crystal Display Device
80 Television Receiver (Television Device)
$A_B$, $A_L$ Disordered Alignment Area
Ccs1 First Storage Capacitor
Ccs2 Second Storage Capacitor
D1, D2, D3, D4 Domain (Alignment Domain)
LB Rib (Alignment Control Structure)
SL Slit (Alignment Control Structure)
P Pixel
P1 First Sub-pixel
P2 Second Sub-pixel

DESCRIPTION OF EMBODIMENTS

Embodiment 1

One embodiment of the present invention is explained as follows, with reference to FIGS. 1 through 8.

<Structure>

Figure 1:
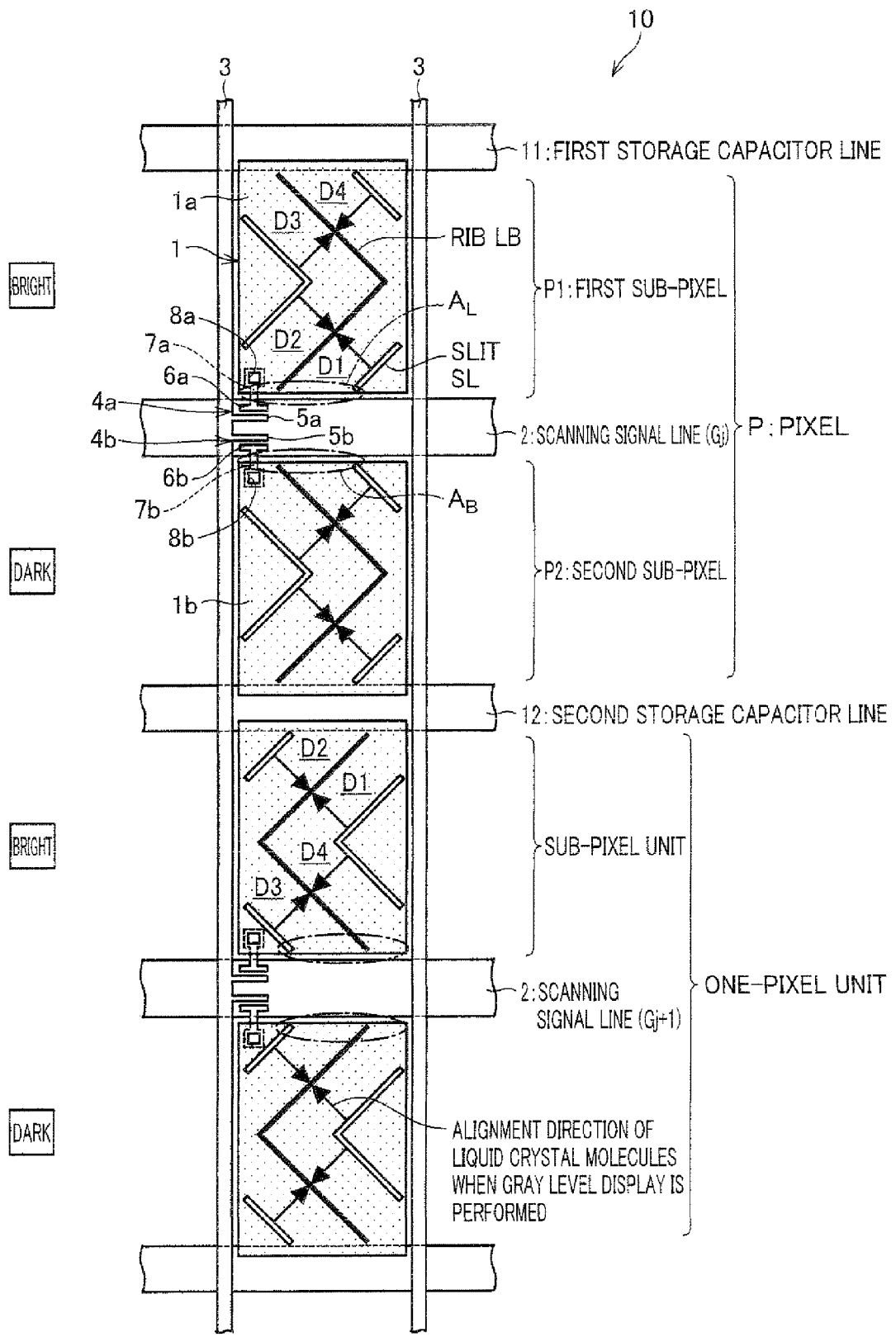
FIG. 1 illustrates one embodiment of a liquid crystal display device of the present invention and is a see-through plan view showing an active matrix substrate on which ribs as alignment control structures for liquid crystal molecules are provided on a color filter substrate.

FIG. 1 illustrates one embodiment of a liquid crystal display device of the present embodiment and is a see-through plan view showing an active matrix substrate 10 on which ribs LB as alignment control structures for liquid crystal molecules are provided on a color filter substrate that is a counter substrate. FIG. 1 illustrates a two-pixel unit in which two pixels are adjacent and parallel to each other in a column direction.

As shown in FIG. 1, the active matrix substrate 10 includes scanning signal lines 2 (in a row direction or a right-to-left direction in FIG. 1), data signal lines 3 (in a column direction or an up-and-down direction in FIG. 1), first storage capacitor lines 11, and second storage capacitor lines 12. Each of the scanning signal lines 2 and each of the data signal lines 3 are orthogonal to each other. In the present embodiment, one pixel P is formed by using an area surrounded by a first storage capacitor line 11 and a second storage capacitor line 12 that extend in the row direction, and data signal lines 3 that extend in the column direction. A plurality of pixels P are provided in a matrix in a liquid crystal panel.

The liquid crystal display device of the present embodiment has a so-called multi-pixel structure in which each pixel P is divided into a first sub-pixel P1 and a second sub-pixel P2 that are two sub-pixels provided in the up-and-down direction in FIG. 1. Each of the scanning signal lines 2 is provided in the center of the pixel P so as to divide the pixel P into two sub-pixels including the first sub-pixel P1 and the second sub-pixel P2.

The first sub-pixel P1 is provided with a first TFT (Thin Film Transistor) 4a and the second sub-pixel P2 is provided with a second TFT 4b, at each intersection of the scanning signal lines 2 and the data signal lines 3. Each of the first TFT 4a and the second TFT 4b functions as a switching transistor that is an active element. The first TFT 4a includes a scanning signal line 2 that serves as a gate electrode, a first source electrode 5a, and a first drain electrode 6a, and the second TFT 4b includes the scanning signal line 2 that serves as a gate electrode, a second source electrode 5b, and a second drain electrode 6b.

The first drain electrode 6a is connected to a first drain extraction line 7a and the second drain electrode 6b is connected to a second drain extraction line 7b. Each of the first drain extraction line 7a and the second drain extraction line 7b is made of a conductive layer constituting a wiring section. The first drain extraction line 7a is connected to a first sub-pixel electrode 1a via a first contact hole 8a, and the second drain extraction line 7b is connected to a second sub-pixel electrode 1b via a second contact hole 8b. Each of the first contact hole 8a and the second contact hole 8b penetrates an interlayer insulation film.

That is, the first sub-pixel 1a is connected to a data signal line 3 via the first TFT 4a, and the second sub-pixel electrode 1b is connected to the data signal line 3 via the second TFT 4b.

Both gates of the first TFT 4a and the second TFT 4b are connected to the scanning signal line 2. As explained later, a first storage capacitor (storage capacitor) Ccs1 is formed between the first sub-pixel electrode 1a and the first storage capacitor line 11, and a second storage capacitor Ccs2 is formed between the second sub-pixel electrode 1b and the second storage capacitor line 12. The first storage capacitor line 11 and the second storage capacitor line 12 are provided with different storage capacitor signals (auxiliary capacitor counter voltages), respectively. As in the present embodiment, the first storage capacitor Ccs1 may be formed between the first sub-pixel electrode 1a and the first storage capacitor line 11 in a manner such that a gate insulation film or interlayer insulation film is sandwiched between the first sub-pixel electrode 1a and the first storage capacitor line 11, and the second storage capacitor Ccs2 may be formed between the second sub-pixel electrode 1b and the second storage capacitor line 12 in a manner such that a gate insulation film or interlayer insulation film is sandwiched between the second sub-pixel electrode 1b and the second storage capacitor line 12. Alternatively, by providing on-storage-capacitor electrodes on the first storage capacitor line 11 and the second storage capacitor line 12, respectively, the first storage capacitor Ccs1 may be formed in a manner such that the first storage capacitor line 11 and one on-storage-capacitor electrode sandwich the gate insulation film and the second storage capacitor Ccs2 may be formed in a manner such that the second storage capacitor line 12 and another on-storage-capacitor electrode sandwich the gate insulation film. Further, in this case, the one on-storage-capacitor electrode and the first sub-pixel electrode 1a may be connected via a contact hole provided through the interlayer insulation film and the other on-storage-capacitor electrode and the second sub-pixel electrode 1b may be connected via another contact hole provided through the interlayer insulation film.

As explained later, a first sub-pixel capacitor Clc1 is formed by the first sub-pixel electrode 1a, a common counter electrode Ec, and a liquid crystal layer between the first sub-pixel electrode 1a and the common counter electrode Ec. Meanwhile, a second sub-pixel capacitor Clc2 is formed by the second sub-pixel electrode 1b, the common counter electrode Ec, and a liquid crystal layer between the second sub-pixel electrode 1b and the common counter electrode Ec In a case where the multi-pixel structure is applied, it is preferable that at least two of sub-pixels have different luminances, respectively. In this embodiment, because both of a bright first sub-pixel P1 and a dark second sub-pixel P2 are present in one pixel, gray levels can be displayed by area ratio gray scale. This is suitable to improve a whitish appearance at the time when a liquid crystal display screen is viewed obliquely.

As explained later, the active matrix substrate 10 of the present embodiment that employs the multi-pixel structure is provided with two storage capacitor lines including the first storage capacitor line 11 and the second storage capacitor line 12 to which signal voltages whose phases are opposite to each other are applied, respectively. The first storage capacitor line 11 is arranged to overlap with the first sub-pixel electrode 1a corresponding to the first sub-pixel P1 via an insulation layer (not shown), and the second storage capacitor line 12 is arranged to overlap with the second sub-pixel electrode 1b corresponding to the second sub-pixel P2 via the insulation layer. This embodiment is suitable to form the bright first sub-pixel P1 and the dark second sub-pixel P2. It is also possible to form a bright second sub-pixel P2 and a dark first sub-pixel P1.

The signal voltages, that have phases opposite to each other and are to be applied to two or more storage capacitor lines, indicate storage capacitance Cs waveform voltages that are used for handling the area ratio gray scale in a pixel having the divided-pixel structure. There are two kinds of signal voltages including (i) a storage capacitance Cs waveform voltage (storage capacitance Cs polarity is positive) that contributes to boosting a drain signal voltage (Vs) supplied from a source, at the timing for carrying out capacitive coupling after the gate signal is turned off, and (ii) a storage capacitance Cs waveform voltage (storage capacitance Cs polarity is negative) that contributes to depressing the drain signal voltage (Vs) at the timing for carrying out capacitive coupling after the gate signal is turned off.

In this divided-pixel method (area ratio gray scale technique), an effective voltage to each pixel is varied for every sub-pixel by the storage capacitance Cs waveform voltage and capacitive coupling of the storage capacitance Cs and a liquid crystal capacitor. This forms dark and bright sub-pixels and makes it possible to achieve a multi-pixel drive of these sub-pixels. Patent Literature 3, for example, discloses such a divided-pixel method (area ratio gray scale technique).

Meanwhile, the liquid crystal display device of the present embodiment employs an MVA (Multi-domain Vertical Alignment) system of a vertical alignment mode in which liquid crystal molecules are divided into a plurality of alignment domains. Namely, as shown in FIG. 1, the active matrix substrate 10 is provided with slits SL and ribs LB. A slit SL is provided to each of the first sub-pixel electrode 1a and the second sub-pixel electrode 1b, as an alignment control structure that is a pattern cutting off each of the first sub-pixel electrode 1a and the second sub-pixel electrode 1b, and has a plane shape of a symbol ">" or "<" (a shape of a symbol ">" or "<" when the shape is viewed on a plane). A rib LB is provided to the counter electrode (common electrode) of the color filter substrate, as an alignment control structure, and has a plane shape of a symbol ">" or "<".

Domains between the rib LB and the slit SL has a difference of an angle of 90 degrees in directions in which inclined liquid crystal molecules are oriented at the time when a pixel P of the liquid crystal display device using the active matrix substrate 10 of the present embodiment displays a gray level Arrows in FIG. 1 conceptually show alignment directions of the liquid crystal molecules in, for example, domains D1, D2, D3, and D4 that are alignment domains corresponding to domains between the rib LB and the slit SL.

More specifically, on an assumption that, as shown in FIG. 1, each of (i) the domains D1 and D2 and (ii) the domains D3 and D4 in each of the first sub-pixel P1 and the second sub-pixel P2 forms one domain set, two domain sets are formed in each of the first sub-pixel P1 and the second sub-pixel P2. One domain set of the two domain sets includes the domains D1 and D2 and the other one domain set includes the domains D3 and D4. Alignment directions of the liquid crystal molecules in the domains of each domain set are opposed to each other. In each of the first sub-pixel and the second sub-pixel, a direction in which the liquid crystal molecules are opposed to each other in one domain set is different by 90 degrees from a direction in which the liquid crystal molecules are opposed to each other in the other domain set.

Between the domains D1 and D2 in which the alignment directions of the liquid crystal molecules are opposed to each other and between the domains D3 and D4 in which the alignment directions of the liquid crystal molecules are opposed to each other, a rib LB is formed on the color filter substrate that is a counter substrate and a slit SL is formed on the active matrix substrate 10. Accordingly, the rib LB and the slit SL serve as boundaries between the domains D1 and D2 and between the domains D3 and D4.

These four different domains D1, D2, D3, and D4 makes it possible to provide an MVA type liquid crystal display device whose viewing angle characteristics are excellent.

In a liquid crystal display device which has a combination of a vertical alignment mode in which liquid crystal molecules are divided into a plurality of alignment domains and a multi-pixel structure, disordered alignment areas $A_L$ and $A_B$ are produced along a scanning signal line 2. In the sections where the disordered alignment areas $A_L$ and $A_B$ are produced, alignment domain areas substantially decrease and vary. This may deteriorate the viewing angle characteristics in up-and-down and right-and-left directions or lower-right, upper-right, upper-left, lower-left, or the like direction.

In other words, conventionally, for example, as to the first sub-pixels P1, that is at least either the first sub-pixels P1 or the second sub-pixels P2 in a two-pixel unit in which two pixels are adjacent to each other, opposed lengths for which the domains D1, D2, D3, and D4 in one of the first sub-pixels P1 are opposed with respect to a scanning signal line are respectively the same as opposed lengths for which domains D1, D2, D3, and D4 in the other one of the first sub-pixels P1 are opposed with respect to a scanning signal line. More specifically, as shown in FIG. 1, in the two-pixel P unit in which two pixels are adjacent to each other, for example, an opposed length of the domain D1 in each of the first sub-pixels P1 with respect to the scanning signal line is always, for example, 0.4L (L is an opposed length for which the first sub-pixel P1 is opposed with respect to the scanning signal line, or an opposed length of the first sub-pixel P1 with respect to the scanning signal line). The opposed length of the domain D2 of each of the first sub-pixels P1 with respect to the scanning signal line is always the same, for example, 0.3L.

Consequently, in regard to the first sub-pixels P1 in the two pixel-unit in which two pixels are adjacent to each other, a total opposed length of the domains D1 with respect to the scanning signal lines is 0.4L+0.4L=0.8L. A total opposed length of the domains D2 with respect to the scanning signal lines 2 is 0.3L+0.3L=0.6L. A total opposed length of the domains D3 with respect to the scanning signal lines 2 is 0+0=0. A total opposed length of the domains D4 with respect to the scanning signal lines 2 is 0+0=0L.

As a result, a significant influence to viewing angle characteristics always occurs in the domains D1 and D2 in the vicinity of the disordered alignment area $A_L$ along a scanning signal line. Meanwhile, an influence to viewing angle characteristics does not occur in the domains D3 and D4 that are not positioned along the scanning signal line. As a result, a symmetric property of the viewing angle characteristics varies in the domains D1, D2, D3, and D4. This causes difference in the viewing angle characteristics in up-and-down and right-and-left directions, or lower-right, upper-right, upper-left, lower-left, or the like direction.

In order to solve this problem, in the present embodiment, as shown in FIG. 1, in at least either first sub-pixels P1 or second sub-pixels P2 in a two-pixel unit in which two pixels are adjacent to each other, the rib LB and the slit SL are formed so as to vary, between at least either the first sub-pixels P1 or the second sub-pixels P2, the opposed length of each of the domains D1, D2, D3, and D4 with respect to the scanning signal line 2.

Specifically, in the liquid crystal display device of the present embodiment, a set of two pixels P that are adjacent to each other employs a combination of (i) a slit SL and a rib LB having a plane shape of a symbol ">" and (ii) a slit SL and a rib LB that are respectively obtained by rotating the ">" shaped slit SL and rib LB and have a plane shape of a symbol "<".

As a result, in the pixels P, for example, the first sub-pixels P1 each having a high luminance are provided with slits SL and ribs LB so that a direction of a slit SL and a rib LB in one pixel P becomes opposite to that in the other pixel P.

According to the arrangement, each of the domains D3 and D4 in the first sub-pixel P1 connected to a gate line Gj that is a scanning signal line 2 has an opposed length of 0 with respect to the scanning signal line, on the assumption that the domain D1 in the first sub-pixel P1 connected to the gate line Gj has an opposed length of, for example, 0.4L with respect to the scanning line (L is an opposed length of the first sub-pixel P1 with respect to the scanning signal line 2) and the domain D2 in the first sub-pixel P1 connected to the gate line Gj has an opposed length of, for example, 0.3L with respect to the scanning line.

Meanwhile, each of the domains D1 and D2 in the other first sub-pixel P1 connected to a gate line Gj+1 that is a scanning signal line 2 has an opposed length of 0 with respect to the scanning signal line, on the assumption that the domain D3 in this first sub-pixel P1 connected to the gate line Gj+1 has an opposed length of, for example, 0.4L with respect to the scanning line and the domain D4 in the first sub-pixel P1 connected to the gate line Gj+1 has an opposed length of, for example, 0.3L with respect to the scanning line.

As a result, for example, in the first sub-pixels P1 in the two-pixel unit in which two pixels are adjacent to each other, a total opposed length of the domains D1 with respect to the scanning signal lines is 0.4L+0L=0.4L. A total opposed length of the domains D2 with respect to the scanning signal lines 2 is 0.3L+0L=0.3L. A total opposed length of the domains D3 with respect to the scanning signal lines 2 is 0+0.4=0.4L. A total opposed length of the domains D4 with respect to the scanning signal lines 2 is 0+0.3L=0.3L.

Consequently, an influence of the disordered alignment area $A_L$ is distributed to the domains D1, D2, D3, and D4. This can prevent that the influence is localized in the same domain out of the domains D1, D2, D3, and D4.

As a result, it becomes possible to prevent a significant damage to a balance of viewing angle characteristics intended at the time when a liquid crystal display device is designed. This makes it possible to provide a liquid crystal display device (i) which has a combination of a vertical alignment mode in which liquid crystal molecules are divided into a plurality of alignment domains and a multi-pixel structure and (ii) which makes it possible to prevent deterioration in viewing angle characteristics caused by the disordered alignment area $A_L$ that is produced along the scanning signal line dividing pixels.

In other words, an arrangement providing the above effect is explained as follows. In the liquid crystal display device of the present embodiment, many pixels P are arranged on a plane. Each pixel P has a first sub-pixel P1 and a second sub-pixel P2 that are obtained by dividing the each pixel P by a scanning signal line 2. Each of the first sub-pixel P1 and the second sub-pixel P2 includes a plurality of domains D1, D2, D3, and D4. Simultaneously, the liquid crystal display device of the present embodiment has a multi-domain structure in which the domains D1, D2, D3, and D4 are provided so as to be asymmetrical with respect to an axis of symmetry that is orthogonal to the scanning signal line 2. In at least either the first sub-pixels P1 or the second sub-pixels P2 in a two-pixel unit in which two pixels are adjacent to each other in a direction in which the pixels P1 are aligned, boundaries between the domains D1 and D2 may be provided to be axisymmetrical with respect to the axis of symmetry and boundaries between the domains D3 and D4 may be provided to be axisymmetrical with respect to the axis of symmetry.

The arrangement can be further rephrased as follows. In the liquid crystal display device of the present embodiment, in two pixels P that are adjacent to each other, ribs LB and slits SL are formed so that a ratio of the disordered alignment area $A_L$ that occurs along the scanning signal line 2 in a domain set of the domain D1 and D2 becomes equal to that in a domain set of the domain D3 and D4.

For example, in one first sub-pixel P1 connected to the gate line Gj that is the scanning signal line 2, the ratio of the disordered alignment area $A_L$ in the domains D1 and D2 is, for example, 0.2, and a ratio of the disordered alignment area $A_L$ in the domains D3 and D4 is, for example, 0. Moreover, in the other first sub-pixel P1 connected to the gate line Gj+1, the ratio of the disordered alignment area $A_L$ in the domains D1 and D2 is, for example, 0, and the ratio of the disordered alignment area $A_L$ in the domains D3 and D4 is, for example, 0.2.

Accordingly, in regard to the first sub-pixels P1, when adjacent two pixels P are considered in combination, the ratio of the disordered alignment area $A_L$ in the domains D1 and D2 is 0.2, and the ratio of the disordered alignment area $A_L$ in the domains D3 and D4 is also 0.2.

Accordingly, in the two-pixel P unit in which two pixels are adjacent to each other, a ratio of the disordered alignment area $A_L$ along the scanning signal line in the domains D1 and D2 of at least the first sub-pixels P1 is equal to that in the domains D3 and D4 of at least the first sub-pixels. This can prevent damage to a balance of viewing angle characteristics intended at the time when the liquid crystal display device is designed.

In the liquid crystal display device of the present embodiment, a set of the first sub-pixel P1 and the second sub-pixel P2 are provided with a set of slits SL and a set of ribs LB each set having a plane shape sequentially repeating a plane shape of a symbol ">" twice or a set of slits SL and a set of ribs LB each set having a plane shape sequentially repeating a plane shape of a symbol "<" twice). Accordingly, a pixel P as a whole is provided with the set of slits SL and the set of ribs LB each set having a plane shape sequentially repeating a shape of a symbol ">" twice or the set of slits SL and the set of ribs LB each of which sets has a plane shape sequentially repeating a shape of a symbol "<" twice and which sets are obtained by rotating by 180 degrees the aforesaid alignment control structure. As a result, in one pixel P, liquid crystal molecules can be divided into two sets of four domains D1, D2, D3, and D4. Further, another pixel P adjacent to the aforesaid one pixel P is provided with a set of slits SL and a set of ribs LB each set having a plane shape obtained by rotating by 180 degrees the aforesaid set of slits SL and the set of ribs LB which plane shape is a plane shape sequentially repeating a shape of a symbol ">" twice or a plane shape sequentially repeating a shape of a symbol "<" twice. Accordingly, in the another pixel P as a whole, liquid crystal molecules are divided into two sets of four domains D1, D2, D3, and D4. Consequently, in each of all pixels P, two sets of four domains D1, D2, D3, and D4 of liquid crystal molecules are reliably obtained.

The pixels adjacent to each other satisfy a condition such that alignment control structures having a plane shape repeating a shape of a symbol ">" twice and alignment control structures that have a plane shape repeating a shape of a symbol "<" twice and that are obtained by rotating the aforesaid alignment control structures by 180 degrees are provided in combination. Accordingly, it becomes possible to prevent deterioration in viewing angle characteristics due to the disordered alignment areas $A_L$ and $A_B$ that occur along the scanning signal line 2 dividing a pixel P. This makes it possible to prevent damage to a balance of viewing angle characteristics intended at the time when the liquid crystal display device is designed.

Consequently, it becomes possible to provide a liquid crystal display device that makes it possible to prevent deterioration in viewing angle characteristics caused by the disordered alignment areas $A_L$ and $A_B$ that occur along the scanning signal line 2 dividing a pixel, at the time when a gray level display is performed by the liquid crystal display device having a combination of a vertical alignment mode in which liquid crystal molecules are divided into a plurality of alignment domains and a multi-pixel structure.

Further, in an arrangement in which the slits SL and the ribs LB are provided in a symmetric manner in both of a set of bright sub-pixels and a set of dark sub-pixels, deterioration in viewing angle characteristics can be prevented over all gray level regions. In the present embodiment, as described above, the slits SL and the ribs LB may be provided in a symmetric manner only in the first sub-pixels P1 that are bright sub-pixels.

<Production Method>

Figure 2:
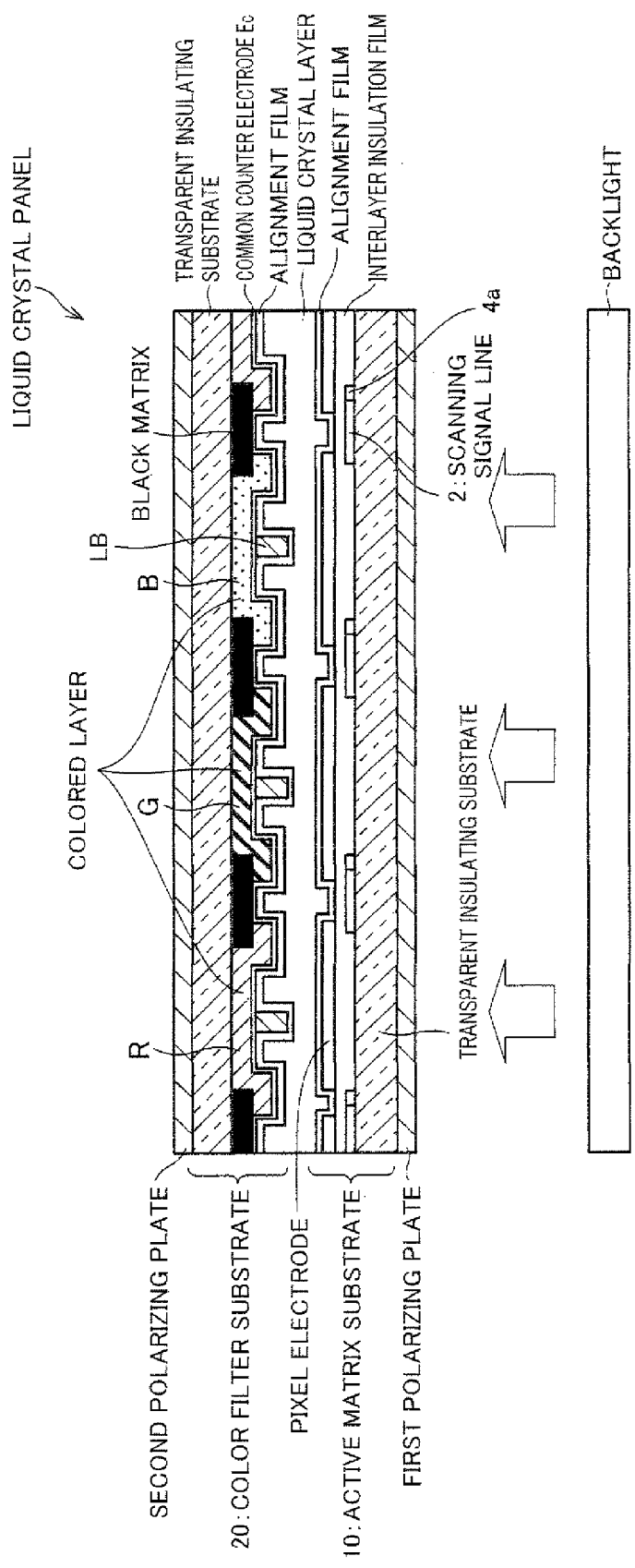
FIG. 2 is a cross sectional view illustrating an arrangement of the liquid crystal display device.

Next, the following explains a basic part of a production method of the liquid crystal display device including the active matrix substrate 10 arranged as explained above, with reference to FIGS. 1 and 2. FIG. 2 is a cross sectional view illustrating an arrangement of the liquid crystal display device.

In the present embodiment, as shown in FIGS. 1 and 2, the scanning signal line 2 that also serves as gate electrodes of the first TFT 4a and the second TFT 4b is provided on a transparent insulating substrate made of, for example, glass or plastic. The scanning signal line 2 and the gate electrode are formed by (i) formation of a metal film or an alloy film made of one or a combination of, for example, titanium, chromium, aluminum, molybdenum, tantalum, tungsten, and copper, or a multilayer film made of the metal/alloy films, at a film thickness of 1000 Å to 3000 Å according to a method such as a sputtering method, and (ii) pattern formation into a required shape according to, for example, a photo-etching method.

Subsequently, a silicon nitride film (SiNx) that becomes a gate insulation film, a high-resistance semiconductor layer made of, for example, amorphous silicon or polysilicon, and a low-resistance semiconductor layer made of, for example, n+amorphous silicon are successively formed according to, for example, a plasma CVD (Chemical Vapor Deposition) method and subjected to pattern formation according to, for example, a photo-etching method. A film thickness of the silicon nitride film as a gate insulation film is, for example, 3000 Å to 5000 Å. A film thickness of an amorphous silicon film as the high resistance semiconductor layer is, for example, approximately 1000 Å to 3000 Å. A film thickness of n+amorphous silicon film as the low resistance semiconductor layer is, for example, approximately 400 Å to 700 Å.

Next, formed in the same process are the data signal line 3, the first source electrode 5a, the second source electrode 5b, the first drain electrode 6a, the second drain electrode 6b, the first drain extraction line 7a, and the second drain extraction line 7b. The data signal line 3, the first source electrode 5a, the second source electrode 5b, the first drain electrode 6a, the second drain electrode 6b, the first drain extraction line 7a, and the second drain extraction line 7b are formed by (i) formation of a metal film or an alloy film made of one or a combination of, for example, titanium, chromium, aluminum, molybdenum, tantalum, tungsten, and copper, or a multilayer film made of the metal/alloy films, at a film thickness of 1000 Å to 3000 Å according to a method such as a sputtering method, and (ii) pattern formation into a required shape according to, for example, a photo-etching method.

The first TFT 4a and the second TFT 4b are formed by channel etching in dry etching. The channel etching is performed with respect to the high-resistance semiconductor layer made of, for example, an amorphous silicon film and the low-resistance semiconductor layer made of, for example, an n+amorphous silicon film by using, as a mask, patterns of the data signal line 3, the first source electrode 5a, the second source electrode 5b, the first drain electrode 6a, the second drain electrode 6b, the first drain extraction line 7a, and the second drain extraction line 7b.

Further, for example, a resin film, an inorganic film, or a multilayer film made of the resin film and the inorganic film is provided. The resin film is made of, for example, a photosensitive acrylic resin and provided as an interlayer insulation film. The inorganic insulation film is made of, for example, silicon oxide. The multilayer film may be, for example, a multilayer film made of (i) a silicon nitride film that is formed by, for example, a plasma CVD method and has a film thickness of approximately 2000 Å to 5000 Å and (ii) a photosensitive acrylic resin film that is formed by a spin coat method on the silicon nitride film and has a film thickness of 20000 Å to 40000 Å.

The first contact hole 8a and the second contact hole 8b are formed so as to penetrate the interlayer insulation film that is formed to cover an upper side of the first TFT 4a and the second TFT 4b, the scanning signal line 2, the data signal line 3, the first source electrode 5a, the second source electrode 5b, the first drain electrode 6a, the second drain electrode 6b, the first drain extraction line 7a, and the second drain extraction line 7b. The first contact hole 8a and the second contact hole 8b are formed by patterning according to a photo-etching method.

The first sub-pixel electrode 1a and the second sub-pixel electrode 1b are formed on a layer above the interlayer insulation film. The first sub-pixel electrode 1a and the second sub-pixel electrode 1b are formed by (i) film formation of a conductive film that has transparency and is made of, for example, ITO (Indium Tin Oxide), IZO, zinc oxide, tin oxide according to, for example, a sputtering method so that the conductive film has a film thickness of approximately 1000 Å to 2000 Å and (ii) pattern formation of the conductive film by, for example, a photo-etching method, into a required shape, such as a shape including the slit SL or the like for a liquid crystal in a case where the first sub-pixel electrode 1a and the second sub-pixel electrode 1b are used in, for example, an MVA liquid crystal display device.

In the present embodiment, a silicon nitride insulation film is used as the interlayer insulation film. However, the interlayer insulation film is not limited to this. The interlayer insulation film may be formed by photo-etching a photosensitive acrylic resin, other resin film made of, for example, polyimide, or a resin film that does not have photosensitivity. Alternatively, the interlayer insulation film may be a spin-on-glass (SOG) film. The following explains a production method in a case where spin-on-glass (SOG) is used for the interlayer insulation film.

First, a planarization film made of, for example, a spin-on-glass (SOG) material is applied according to a spin coat method.

A suitable spin-on-glass material is, for example, a spin-on-glass material including an organic component (so-called an organic spin-on-glass (SOG) material). A particularly suitable spin-on-glass material is a spin-on-glass (SOG) material whose bone structure is an Si—O—C bond or a spin-on-glass (SOG) material whose bone structure is an Si—C bond. The spin-on-glass (SOG) material is a material from which a glass film (silica film) can be formed according to an application method such as a spin-coat method. The organic spin-on-glass (SOG) material has a low dielectric constant and can be easily formed into a thick film. Accordingly, the use of the organic spin-on-glass (SOG) material makes it easy to form of an interlayer insulation film having a low dielectric constant and a large thickness and obtain a low parasitic capacitance between (sub-)pixel electrode data signal lines. Examples of the spin-on-glass (SOG) material whose bone structure is an Si—O—C bond is a material disclosed in, for example, Patent Literature 5 or Patent Literature 6, or a product, disclosed in Non-Patent Literature 1, that has a product name of DD1100 and is manufactured by Dow Corning Toray Co., Ltd.

More specifically, the organic spin-on-glass (SOG) material is applied so that a thickness of the organic spin-on-glass (SOG) material becomes 1.5 μm to 3.5 μm. Subsequently, a desired pattern is formed according to a photo-etching method. As the etching, dry etching is carried out by use of a mixed gas of carbon tetrafluoride ($CF_4$) and oxygen ($O_2$) so that the organic SOG is removed.

(Panel Formation Method)

Next, the following explains a method and the like of filling, for forming a panel, a liquid crystal between the active matrix substrate 10 and the color filter substrate 20 that is a counter substrate.

The method of filling the liquid crystal may be, for example, a method, like a vacuum filling method, in which: (i) a thermosetting sealing resin is provided with a filling opening at a part of a periphery of a substrate, for filling of a liquid crystal, and the filling opening of the thermosetting sealing resin is immersed in the liquid crystal in a vacuum atmosphere; (ii) the substrate including the thermosetting resin immersed in the liquid crystal is exposed to an atmospheric air so that the liquid crystal is filled; and (iii) subsequently, the filling opening is sealed with the use of, for example, a UV curable resin. However, this method has a problem such that a time for filling becomes much longer in the case of a liquid crystal panel of a vertical alignment, compared with the case of a liquid crystal panel of a horizontal alignment. In this embodiment, an explanation in the case of a one-drop filling method is given.

First, a UV curable sealing resin is applied to a periphery of the active matrix substrate 10. On the color filter substrate 20, a liquid crystal is dropped according to the one-drop filling method so that the liquid crystal is regularly dropped within a section inside the sealing resin at an optimum liquid crystal amount that provides a desired cell gap with the use of the liquid crystal.

Further, a pressure of an atmosphere in a bonding apparatus is decreased to 1 Pa for bonding the color filter substrate on which the liquid crystal is dropped as described above and the active matrix substrate 10 on which the seal is applied as described above. Under the decreased pressure, the substrates are bonded. Then, the pressure of the atmosphere is changed to an atmospheric pressure so that the seal section is squashed. As a result, a desired gap of the seal section is obtained.

Next, a structure that has obtained a desired cell gap of the seal section is subjected to UV irradiation in a UV curing apparatus so that the sealing resin is preliminary cured. Further, the structure is subjected to baking so that the sealing resin is ultimately cured. At this point, the liquid crystal spreads throughout the inner section surrounded by the sealing resin and the cell is filled with the liquid crystal. After the baking is completed, the structure is divided into each liquid crystal panel unit and a polarizing plate is adhered to thus divided structure. As a result, a liquid crystal panel is completed.

As explained above, the liquid crystal display panel is formed by (i) bonding the active matrix substrate 10 and the color filter substrate 20 that is formed by (a) any one of colored layers of Red (R), Green (G), and Blue (B) that are provided in a matrix so as to correspond to each pixel P on the active matrix substrate 10 and (b) a light-shielding black matrix provided between the colored layers and (ii) filling and sealing in the liquid crystal.

This liquid crystal panel is connected with a driver (an LSI for driving the liquid crystal) and the like and provided with a first polarizing plate, a second polarizing plate, and a backlight. As a result, a liquid crystal display device of the present embodiment is formed.

Figure 3:
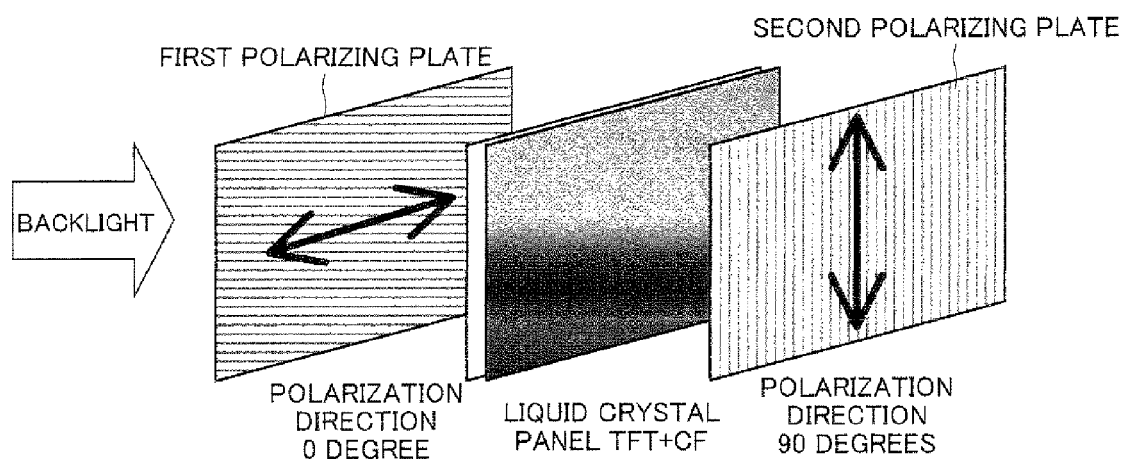
FIG. 3 is a perspective view illustrating an arrangement of a polarizing plate of the liquid crystal display device.

As shown in FIG. 3, polarization axes of the first polarizing plate and the second polarizing plate are orthogonal to each other. A direction in which the inclined liquid crystal is oriented at the time when a threshold voltage is applied to a pixel electrode 1 is set at an azimuth of 45 degrees with respect to the polarization axes of the first polarizing plate and the second polarizing plate. In this case, when an incident polarized light having passed through the first polarizing plate passes through a liquid crystal layer, the polarization axis rotates. Accordingly, light exits from the second polarizing plate. In a case where only a voltage not more than the threshold voltage is applied to the pixel electrode 1, the liquid crystal is oriented in perpendicular to the active matrix substrate 10. Accordingly, a black display is performed because a polarization angle of the incident polarized light does not change in such a case.

<Operation>

Figure 4:
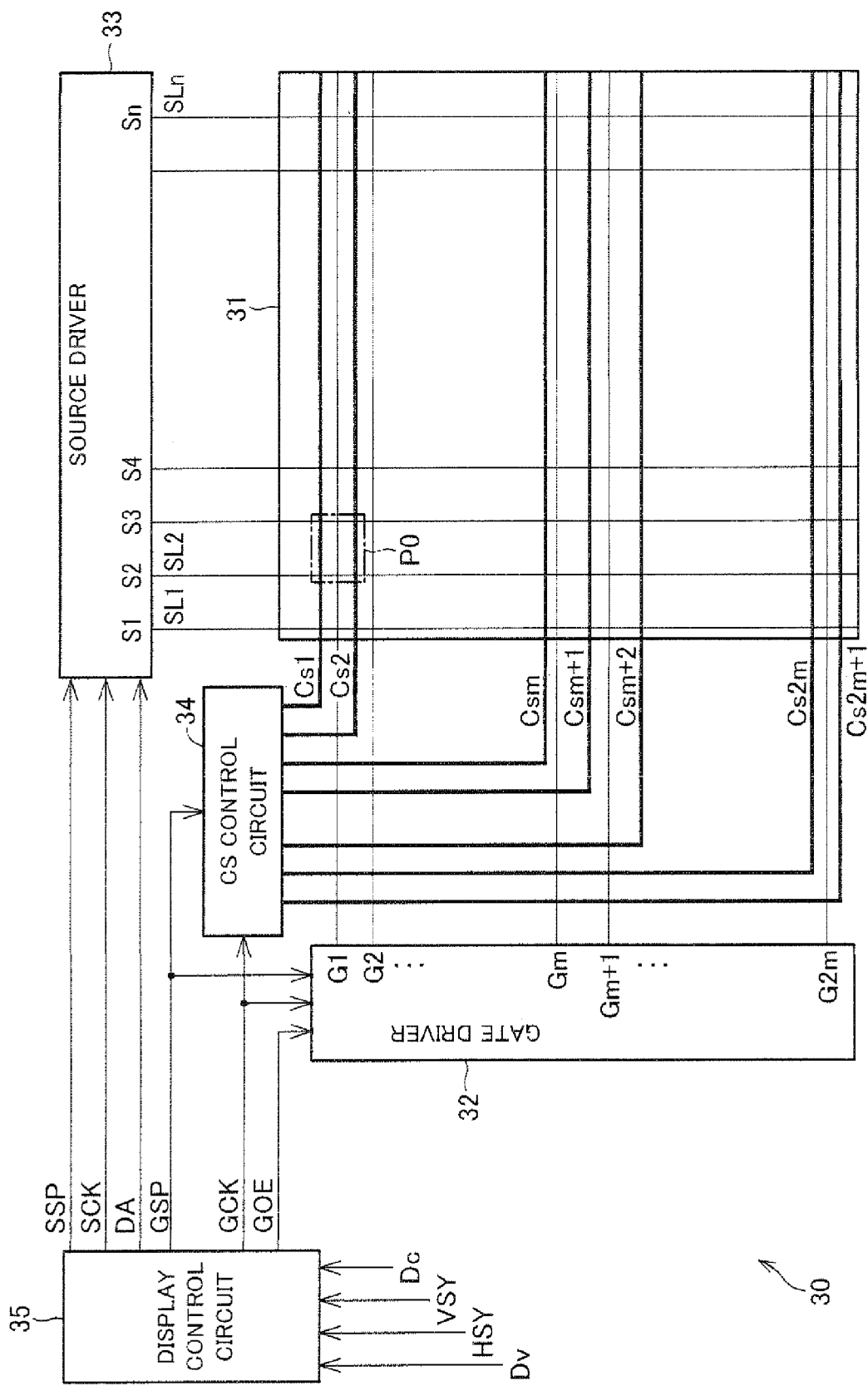
FIG. 4 is a block diagram illustrating a whole arrangement of the liquid crystal display device.
Figure 5:
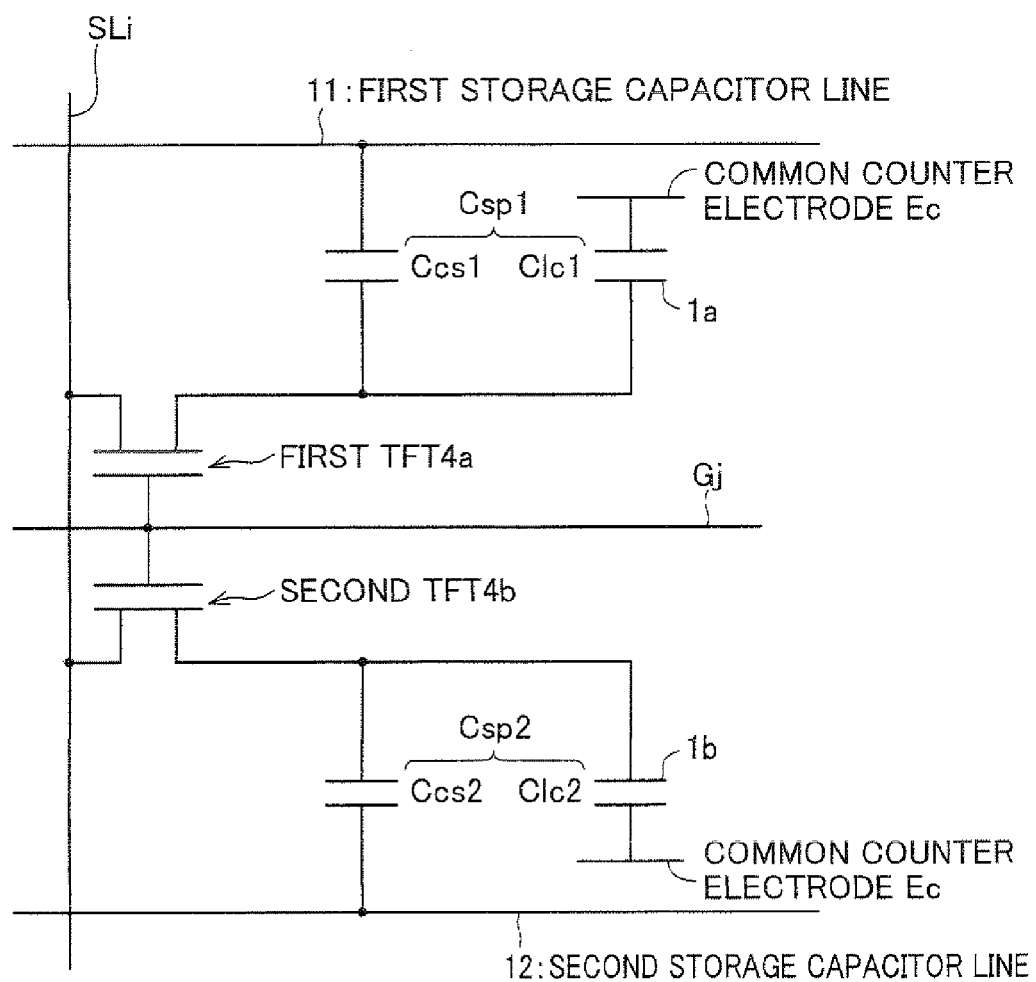
FIG. 5 is an equivalent circuit diagram illustrating a configuration of a pixel of the liquid crystal display device.

The following explains a multi-pixel drive method of a liquid crystal display device 30 of the present embodiment, with reference to FIGS. 4 and 5. FIG. 4 is a block diagram illustrating an arrangement and a display section of the liquid crystal display device 30. FIG. 5 is an equivalent circuit diagram of a one-pixel unit of the liquid crystal display device 30.

The liquid crystal display device 30 includes an active matrix type display section 31, a gate driver 32 that is a scanning signal line driving circuit, a source driver 33 that is a data signal line driving circuit, a CS (storage capacitor line) control circuit 34 (control circuit for a CS) as a storage capacitor line voltage control section, and a display control circuit 35 for controlling the gate driver 32, the source driver 33, and the CS (storage capacitor line) control circuit 34.

The display section 31 includes gate lines G1 through G2$m$ that are a plurality of (i.e., 2$m$ ($m$ is an integer not less than 1)) scanning signal lines 2, storage capacitor lines CS1 through CS 2m+1 that are a plurality of (i.e., 2m+1) first storage capacitor lines 11 and second storage capacitor lines 12, source lines SL1 through SLn that are a plurality of (i.e., n) data signal lines 3 intersecting with the gate lines G1 through G2$m$ and the storage capacitor lines CS1 through CS 2m+1, and a plurality of (i.e., 2m×n) pixels P that are provided so as to correspond to respective intersections of the gate lines G1 through G2$m$ and the source lines SL1 through SLn, and the first sub-pixels P1 and the second sub-pixels P2 that are in total (2×2m×n) sub-pixels obtained by diving each one-pixel unit into two.

These pixel formation sections are arranged in a matrix and constitute a pixel array. Each of the pixel formation sections, as illustrated in FIG. 5, includes the first TFT 4$a$ and the second TFT 4$b$, the first sub-pixel electrode 1$a$ and the second sub-pixel electrode 1$b$, the common counter electrode Ec, and a liquid crystal layer. The first TFT 4$a$ and the second TFT 4$b$ are switching elements whose gate electrodes are connected to the gate line Gj passing through a corresponding intersection and whose source electrodes are connected to the source line SLi passing through the intersection. The first sub-pixel electrode 1$a$ and the second sub-pixel electrode 1$b$ are connected to drain electrodes of the first TFT 4$a$ and the second TFT 4$b$, respectively. The common counter electrode Ec is a counter electrode (common electrode) commonly provided to the plurality of pixel formation sections. The liquid crystal layer is sandwiched by the first sub-pixel electrode 1$a$ or the second sub-pixel electrode 1$b$ and the common counter electrode Ec that are commonly provided to the plurality of the pixel formation sections. Consequently, pixel capacitors Csp (a first sub-pixel capacitor Csp1 and a second sub-pixel capacitor Csp2) are formed by (i) liquid crystal capacitors Clc (the first liquid crystal capacitor Clc1 and the second liquid crystal capacitor Clc2) formed by (a) the common counter electrode and (b) the first sub-pixel electrode 1$a$ and the second sub-pixel electrode 1$b$ and (ii) storage capacitors Ccs (the first storage capacitor Ccs1 and the second storage capacitor Ccs2).

Each of the first sub-pixel electrode 1$a$ and the second sub-pixel electrode 1$b$ in each pixel formation section is provided, by the source driver 33 and the gate driver 32, with a potential corresponding to an image to be displayed. The common counter electrode Ec is provided with a predetermined counter voltage Vcom from a power source circuit not shown. Accordingly, a voltage corresponding to a potential difference between the first sub-pixel electrode 1$a$ or the second sub-pixel electrode 1$b$ and a common counter electrode Ec is applied to the liquid crystal. This voltage application controls an amount of light to be transmitted through the liquid crystal layer. As a result, an image is displayed. Note that a polarizing plate is used for controlling, by voltage application to the liquid crystal layer, an amount of light to be transmitted, and the polarizing plate is arranged so that a liquid crystal display device having a basic arrangement of the present embodiment becomes a normally black type.

Next, the display control circuit 35 as shown in FIG. 4 receives, from an outside signal source, a digital video signal Dv indicative of an image to be displayed, a horizontal sync signal HSY and a vertical sync signal VSY each corresponding to the digital video signal Dv, and a control signal Dc for controlling a display operation. Then, based on the digital video signal Dv, the horizontal sync signal HSY, the vertical sync signal VSY, and the control signal Dc, the display control circuit 35 generates and outputs a data start pulse signal SSP, a data clock signal SCK, a digital image signal DA (a signal corresponding to the digital video signal Dv) indicative of the image to be displayed, a gate start pulse signal GSP, a gate clock signal GCK, and a gate driver output control signal GOE, as signals for displaying an image indicated by the digital video signal Dv on the display section 31.

More specifically, after timing of the digital video signal Dv is adjusted according to need in an internal memory, the digital video signal Dv is outputted as a digital image signal DA from the display control circuit 35. Then, a data clock signal SCK, a data start pulse signal SSP, a gate start pulse signal GSP, a gate clock signal GCK, and a gate driver output control signal GOE are generated. The data clock signal SCK is a signal that is made of a pulse corresponding to each pixel and that is of an image indicated by the digital image signal DA. The data start pulse signal SSP is a signal that becomes a high level (H level) based on the horizontal sync signal HSY only in a predetermined period in each one horizontal scanning period. The data start pulse signal GSP is a signal that becomes a high level (H level) based on the vertical sync signal VSY only in a predetermined period in each one frame period (one vertical scanning period). The gate clock signal GCK is generated based on the horizontal sync signal HSY. The gate driver output control signal GOE is generated based on the horizontal sync signal HSY and the control signal Dc.

As described above, among signals generated in the display control circuit 35, the digital image signal DA, the data start pulse signal SSP, and the data clock signal SCK are inputted into the source diver 33. The gate pulse signal GSP, the gate clock signal GCK, and the gate driver output control signal GOE are inputted into the gate driver 32.

The source driver 33 sequentially generates data signals S1 through Sn as analog voltages based on the data start pulse SSP and the data clock signal SCK, in every one horizontal scanning period. The analog voltages correspond to pixel values that are of an image indicated by the digital image signal DA and of each scanning signal line. The source driver 33 applies these data signals S1 through Sn to the source lines SL1 through SLn.

Further, the gate clock signal GCK is inputted into the CS control circuit for driving the storage capacitor lines CS1 through CS 2m+1. This CS control circuit 34 that receives the gate start pulse signal GSP controls a phase and a width of a storage capacitor signal waveform.

Figure 6:
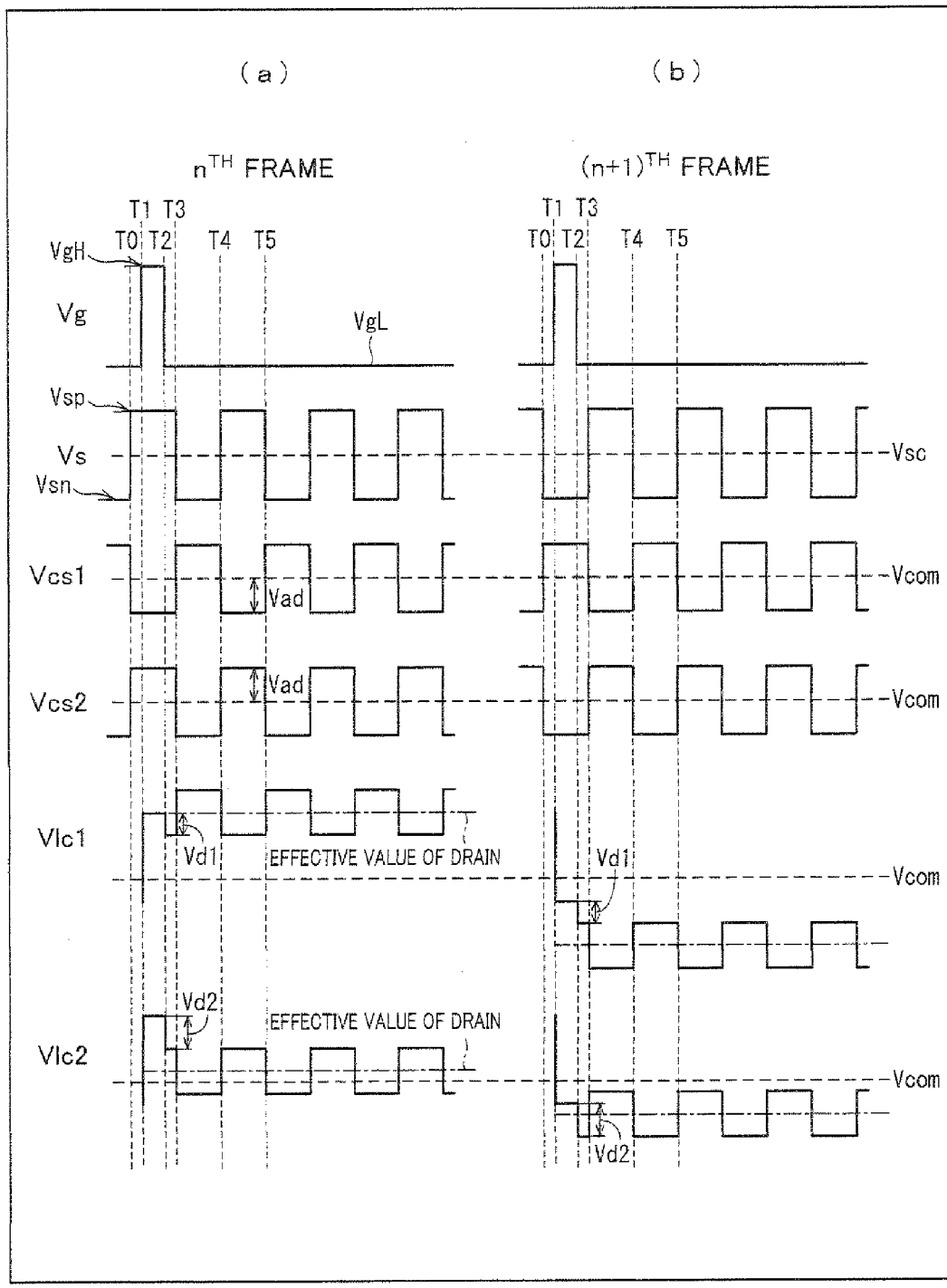
FIG. 6 is a timing chart illustrating a drive method of the liquid crystal display device.

Next, one example of a drive method using this storage capacitor signal is explained with reference to (a) and (b) of FIG. 6. (a) of FIG. 6 illustrates a driving voltage waveform (timing) of each signal in an $n^{th}$ frame. (b) of FIG. 6 illustrates a driving voltage waveform of each signal in an $(n+1)^{th}$ frame. (b) of FIG. 6 has a waveform whose polarity is inverted from the waveform of (a) of FIG. 6.

According to the voltage waveform as shown in (a) and (b) of FIG. 6, the first sub-pixel P1 becomes a bright sub-pixel and the second sub-pixel P2 becomes a dark sub-pixel. Vg indicates a gate voltage. Vs indicates a source voltage. Vcs1 indicates a voltage of the storage capacitor line Cs1 of the first sub-pixel P1 and Vcs2 indicates a voltage of the storage capacitor line Cs2 of the second sub-pixel P2. Vlc1 is a voltage of a pixel electrode of the first sub-pixel P1 and Vlc2 indicates a voltage of a pixel electrode of the second sub-pixel P2.

In the present embodiment, as shown in (a) of FIG. 6, a source voltage Vsp is provided in the $n^{th}$ frame. The source voltage Vsp has a positive polarity with respect to a center value Vsc of the source voltage. As shown in (b) of FIG. 6, a source voltage Vsn is provided in a subsequent $(n+1)^{th}$ frame. The source voltage Vsn has a negative polarity with respect to the center value Vsc. In addition, dot inversion is performed in every frame. The storage capacitor lines CS1 and CS2 receive signals that are obtained by (i) oscillating, at an amplitude voltage Vad, the first storage capacitor voltage Vcs1 and the second storage capacitor voltage Vcs 2 and (ii) shifting a phase so that a phase of the storage capacitor line CS1 is shifted by 180 degrees from a phase of the storage capacitor line CS2.

With reference to (a) of FIG. 6, the following explains a change with time in a voltage of each signal in the $n^{th}$ frame.

At the time T1, the gate voltage Vg changes from a gate-off voltage VgL to a gate-on voltage VgH. This turns on the first TFT 4a of the first sub-pixel P1 and the second TFT 4b of the second sub-pixel P2. As a result, a voltage of a source voltage Vsp is applied to the first liquid crystal capacitor Clc1, the second liquid crystal capacitor Clc2, the first storage capacitor Ccs1, and the second storage capacitor Ccs2.

At the time T2, the gate voltage Vg changes from the gate-on voltage VgH to the gate-off voltage VgL. This turns off the first TFT 4a of the first sub-pixel P1 and the second TFT 4b of the second sub-pixel P2. As a result, each of the first liquid crystal capacitor Clc1, the second liquid crystal capacitor Clc2, the first storage capacitor Ccs1, and the second storage capacitor Ccs2 is electrically isolated from the source line 3. Immediately after this, feed-through voltages Vd1 and Vd2 are produced in the first sub-pixel P1 and the second sub-pixel P2 due to a feed-through effect caused by an influence of a parasitic capacitor or the like. Consequently, the first sub-pixel voltage Vlc1 of the first sub-pixel P1 becomes:

$$Vlc1 = Vsp - Vd1, \text{ and}$$

the second sub-pixel voltage Vlc2 of the second sub-pixel P2 becomes:

$$Vlc2 = Vsp - Vd2.$$

Moreover, at this time, the first storage capacitor voltage Vcs1 is:

$$Vcs1 = Vcom - Vad, \text{ and}$$

the second storage capacitor voltage Vcs2 is:

$$Vcs2 = Vcom + Vad.$$

Note that the first feed-through voltage Vd1 and the second feed-through voltage Vd2 are expressed in the following formula.

$$Vd1, Vd2 = (VgH - VgL) \times Cgd / (Clc(V) + Cgd + Ccs)$$

In the formula, the gate-on voltage VgH indicates a voltage at the time when a gate of each of the first TFT 4a and the second TFT 4b is on, and the gate-off voltage VgL indicates a voltage at the time when the gate of each of the first TFT 4a and the second TFT 4b is turned off. Cgd indicates a parasitic capacitor that occurs between the gate and a drain of each of the first TFT 4a and the second TFT 4b. Clc (V) indicates an electrostatic capacitance (capacitance value) of a liquid crystal capacitor. Ccs indicates an electrostatic capacitance (capacitance value) of a storage capacitor.

Subsequently, at the time T3, the first storage capacitor voltage Vcs1 of the storage capacitor line CS1 varies from Vcom−Vad to Vcom+Vad, and the second storage capacitor voltage Vcs2 of the storage capacitor line CS2 varies from Vcom+Vad to Vcom−Vad. At this time, the first sub-pixel voltage Vlc1 of the first sub-pixel P1 becomes:

$$Vlc1 = Vsp - Vd1 + 2 \times K \times Vad, \text{ and}$$

the second sub-pixel voltage Vlc2 of the second sub-pixel P2 becomes:

$$Vlc2 = Vsp - Vd2 - 2 \times K \times Vad.$$

Note that K=Ccs/(Clc(V)+Ccs).

At the time T4, the first storage capacitor voltage Vcs1 varies from Vcom+Vad to Vcom−Vad, and the second storage capacitor voltage Vcs2 varies from Vcom−Vad to Vcom+Vad. At this time, the first sub-pixel voltage Vlc1 becomes:

$$Vlc1 = Vsp - Vd1, \text{ and}$$

the second sub-pixel voltage Vlc2 becomes:

$$Vlc2 = Vsp - Vd2.$$

At the time T5, the first storage capacitor voltage Vcs1 varies from Vcom−Vad to Vcom+Vad and the second storage capacitor voltage Vcs2 varies from Vcom+Vad to Vcom−Vad. At this time, the first sub-pixel voltage Vlc1 becomes:

$$Vlc1 = Vsp - Vd1 + 2 \times K \times Vad, \text{ and}$$

the second sub-pixel voltage Vlc2 becomes:

$$Vlc2=Vsp-Vd2-2\times K\times Vad.$$

Subsequently, each of the first storage capacitor voltage Vcs1, the second storage capacitor voltage Vcs2, the first sub-pixel voltage Vlc1, and the second sub-pixel voltage Vlc2 repeats alternately the operations of the time T4 and the time T5 for every integral multiple of the horizontal scanning period 1H, until Vg becomes equal to VgH next and writing is carried out. Accordingly, an effective value of the first sub-pixel voltage Vlc1 becomes:

$$Vlc1=Vsp-Vd1+K\times Vad, \text{ and}$$

an effective value of the second sub-pixel voltage Vlc2 becomes:

$$Vlc2=Vsp-Vd2-K\times Vad.$$

Effective voltages each applied to the liquid crystal layer of each sub-pixel in the $n^{th}$ frame becomes:

$$V1=Vsp-Vd1+K\times Vad-Vcom, \text{ and}$$

$$V2=Vsp-Vd2-K\times Vad-Vcom.$$

Accordingly, the first sub-pixel P1 becomes a bright sub-pixel, and the second sub-pixel P2 becomes a dark sub-pixel. As a result, the multi-pixel drive is carried out. Here, explanation of parasitic capacitors, that is, a parasitic capacitor between the data signal line 3 and the first sub-pixel electrode 1a, a parasitic capacitor between the data signal line 3 and the second sub-pixel electrode 1b, and the like is omitted. Moreover, for simplification, a phase of the first storage capacitor voltage Vcs1 is shifted by 180 degrees from a phase of the second storage capacitor voltage Vcs2 in the present embodiment. However, as long as the sub-pixels that constitute one pixel become a bright sub-pixel and a dark sub-pixel, respectively, the phase difference does not necessarily have to be 180°. Further, in the present embodiment, pulse widths of the first storage capacitor voltage Vcs1 and the second storage capacitor voltage Vcs2 are arranged to be equal at a pulse width of Vs. However, an arrangement of the present embodiment is not limited to this. For example, the pulse width may be changed in consideration of charge shortage in a storage capacitor due to a delay in a storage capacitor signal in a case where a large-sized and highly-fine liquid crystal display device is driven.

These pulse widths can be controlled by the CS control circuit into which the gate start pulse signal GSP and the gate clock signal GCK are inputted.

As explained above, in the first sub-pixel P1, the first storage capacitor Ccs1 is formed by the first sub-pixel electrode 1a and the first storage capacitor line 11 that is provided on an edge section side of the first sub-pixel electrode 1a. Meanwhile, in the second sub-pixel P2, the first storage capacitor Ccs2 is formed by the second storage capacitor line 12 provided on an edge section side of the second sub-pixel electrode 1b. The CS control circuit 34 individually controls the first storage capacitor line 11 and the second storage capacitor line 12 in regard to potential, so as to separately control a potential of the first sub-pixel electrode 1a and a potential of the second sub-pixel electrode 1b.

This makes it possible to have an arrangement in which, for example, the first sub-pixel P1 is bright and the second sub-pixel P2 is dark. As a result, it becomes possible to carry out a divided-pixel drive for improving viewing angle dependence of γ characteristics.

In the liquid crystal device 30 of the present embodiment, the CS control circuit 34 controls the first sub-pixel P1 so that the first sub-pixel P1 has a luminance in a state of gray level display. At the same time, the CS control circuit 34 controls the second sub-pixel P2 so that a luminance of the second sub-pixel P2 becomes lower than that of the first sub-pixel P1. As a result, specifically, the CS control circuit 34 produces the bright first sub-pixel P1 and the dark second sub-pixel P2.

Figure 7:
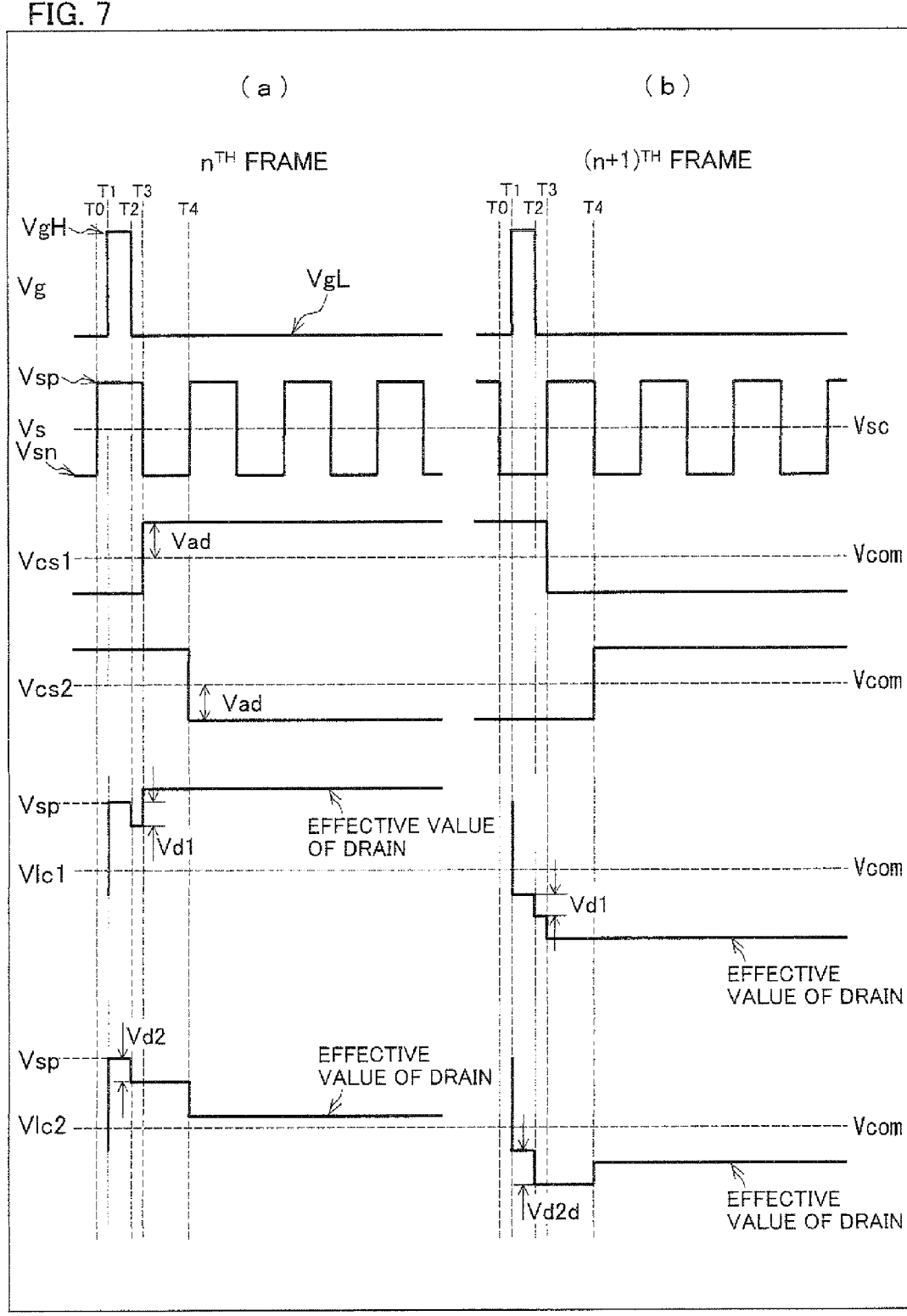
FIG. 7 is a timing chart illustrating another drive method of the liquid crystal display device.

As shown in FIG. 7, each of the first storage capacitor voltage Vcs1 and the second storage capacitor voltage Vcs 2 may have a waveform arranged to stay "High" or "Low" from the time T3 or T4. In other words, the first storage capacitor voltage Vcs1 and the second storage capacitor voltage Vcs2 may be boosted or depressed after each transistor is turned off. Simultaneously, a potential can be controlled so that a boosted state or a depressed state is kept in the frame. Note that the time T3 and the time T4 here are shifted from each other by one horizontal period (1H) in terms of time.

Next, the following explains a change with time in each voltage waveform in the $n^{th}$ frame.

At the time T0, it is assumed that Vcs1=Vcom−Vad and Vcs2=Vcom+Vad. Note that Vcom is a voltage of the common electrode (counter electrode).

At the time T1, the gate voltage Vg changes from a gate-off voltage VgL to a gate-on voltage VgH. This turns on both of the first TFT 4a and the second TFT 4b. As a result, each of the first sub-pixel voltage Vlc 1 and the second sub-pixel voltage Vlc 2 rises to the source voltage Vsp. As a result, the first storage capacitor Ccs1, the second storage capacitor Ccs2, the first sub-pixel capacitor Csp1, and the second sub-pixel capacitor Csp2 are charged.

At the time T2, the gate voltage Vg changes from the gate-on voltage VgH to the gate-off voltage VgL. This turns off the first TFT 4a and the second TFT 4b. As a result, each of the first storage capacitor Ccs1, the second storage capacitor Ccs2, the first sub-pixel capacitor Csp1, and the second sub-pixel capacitor Csp2 is electrically isolated from the source line 3. Immediately after this, a feed-through effect is caused by an influence of a parasitic capacitor or the like. Consequently, Vlc1=Vsp−Vd1 and Vlc2=Vsp−Vd2.

At the time T3, the first storage capacitor voltage Vcs1 varies from Vcom−Vad to Vcom+Vad. At the time T4 (1H after T3), the second storage capacitor voltage Vcs2 varies from Vcom+Vad to Vcom−Vad. As a result, Vlc1 and Vlc2 below are obtained:

$$Vlc1=Vsp-Vd1+2\times K\times Vad; \text{ and}$$

$$Vlc2=Vsp-Vd2-2\times K\times Vad,$$

where: K=Ccs/(Clc+Ccs); Ccs is a capacitance value of each storage capacitor (the first storage capacitor Ccs1 and the second storage capacitor Ccs2); and Clc is a capacitance value of each liquid crystal capacitor (the first liquid crystal capacitor Clc1 and the second liquid crystal capacitor Clc2).

From the description above, the effective voltages (V1 and V2) applied to the sub-pixel capacitors (the first sub-pixel capacitor Csp1 and the second sub-pixel capacitor Csp2) in the $n^{th}$ frame are as follows:

$$V1=Vsp-Vd1+2\times K\times Vad-Vcom, \text{ and}$$

$$V2=Vsp-Vd2-2\times K\times Vad-Vcom.$$

Accordingly, in one pixel P, the bright first sub-pixel P1 is formed by the first sub-pixel capacitor Csp1 and the dark second sub-pixel P2 is formed by the second sub-pixel capacitor Csp2.

As described above, in the liquid crystal display device 30 of the present embodiment, it is preferable that the CS control circuit 34 controls the first storage capacitor line 11 and the second storage capacitor line 12 in terms of potential, so that (i) the potential rises or lowers after the first TFT4*a* or the second TFT 4*b* is turned off and (ii) the state having the potential that has risen or lowered continues until the first TFT4*a* or the second TFT4*b* are turned off in the next frame.

This arrangement reduces an influence of distortion in waveforms of the first storage capacitor voltage Vcs1 and the second storage capacitor voltage Vcs2 on the effective potentials of the drain. This is effective in reduction of luminance unevenness.

In the present embodiment, as shown in FIG. 1, in each of the first sub-pixel P1 and the second sub-pixel P2, a slit SL and a rib LB each having a plane shape of a symbol ">" are formed. That is, in one pixel P, a set of the slits SL and a set of the ribs LB are provided so as to have a plane shape sequentially repeating a shape of a symbol ">" twice. Simultaneously, in pixels P adjacent to each other, the other pixel P1 adjacent to the pixel P has a set of slits SL and a set of ribs LB that are obtained by rotating by 180 degrees the set of the slits SL and the set of the ribs LB in the pixel P and that have a plane shape sequentially repeating a shape of a symbol "<" twice. However, the present invention is not limited to this.

For example, the present invention may be arranged, as shown in (a) of FIG. 8, as follows. That is, the pixels P1 form each one picture element made of a group of pixels corresponding to Red (R), Green (G), and Blue (B). Then, a set of picture elements adjacent to each other can have a combination of (i) a set of slits SL and a set of rib LB each set having a plane shape sequentially repeating a shape of a symbol ">" twice and (ii) a set of slits SL and a set of ribs LB which sets is obtained by rotating the set of the slits SL and the set of the ribs LB above by 180 degrees and each of which sets has a plane shape sequentially repeating a shape of a symbol "<" twice. This makes it possible to reduce deterioration in viewing angle uniformity of each color in pixels of the same color in the adjacent picture elements. In other words, it becomes possible in color display to prevent damage to a balance of viewing angle characteristics intended at the time when the liquid crystal display device is designed. In particular, this arrangement is suitable at the time when a monochrome color is displayed.

Alternatively, for example, the present invention may be arranged, as shown in (b) of FIG. 8, as follows. That is, the pixels P1 form each one picture element made of a group of pixels corresponding to Red (R), Green (G), and Blue (B). Then, a set of pixels of the same color in picture elements adjacent to each other can have a combination of (i) a set of slits SL and a set of ribs LB each set having a plane shape sequentially repeating a shape of a symbol ">" twice and (ii) a set of slits SL and a set of ribs LB which sets are obtained by rotating the set of the slits SL and the set of the ribs LB above by 180 degrees and each of which sets has a plane shape sequentially repeating a shape of a symbol "<" twice. This makes it possible to reduce deterioration in viewing angle uniformity of each color in pixels P of the same color in the adjacent picture elements. In other words, it becomes possible in color display to prevent damage to a balance of viewing angle characteristics intended at the time when the liquid crystal display device is designed. In particular, this arrangement is suitable at the time when a monochrome color is displayed.

Embodiment 2

The following explains another embodiment of the present invention, with reference to FIGS. 9 through 12. An arrangement other than an arrangement explained in the present embodiment is the same as an arrangement in Embodiment 1. For convenience of an explanation, members given the same reference numerals as the members shown in drawings of Embodiment 1 respectively have identical functions and the explanations thereof are omitted.

Figure 9:
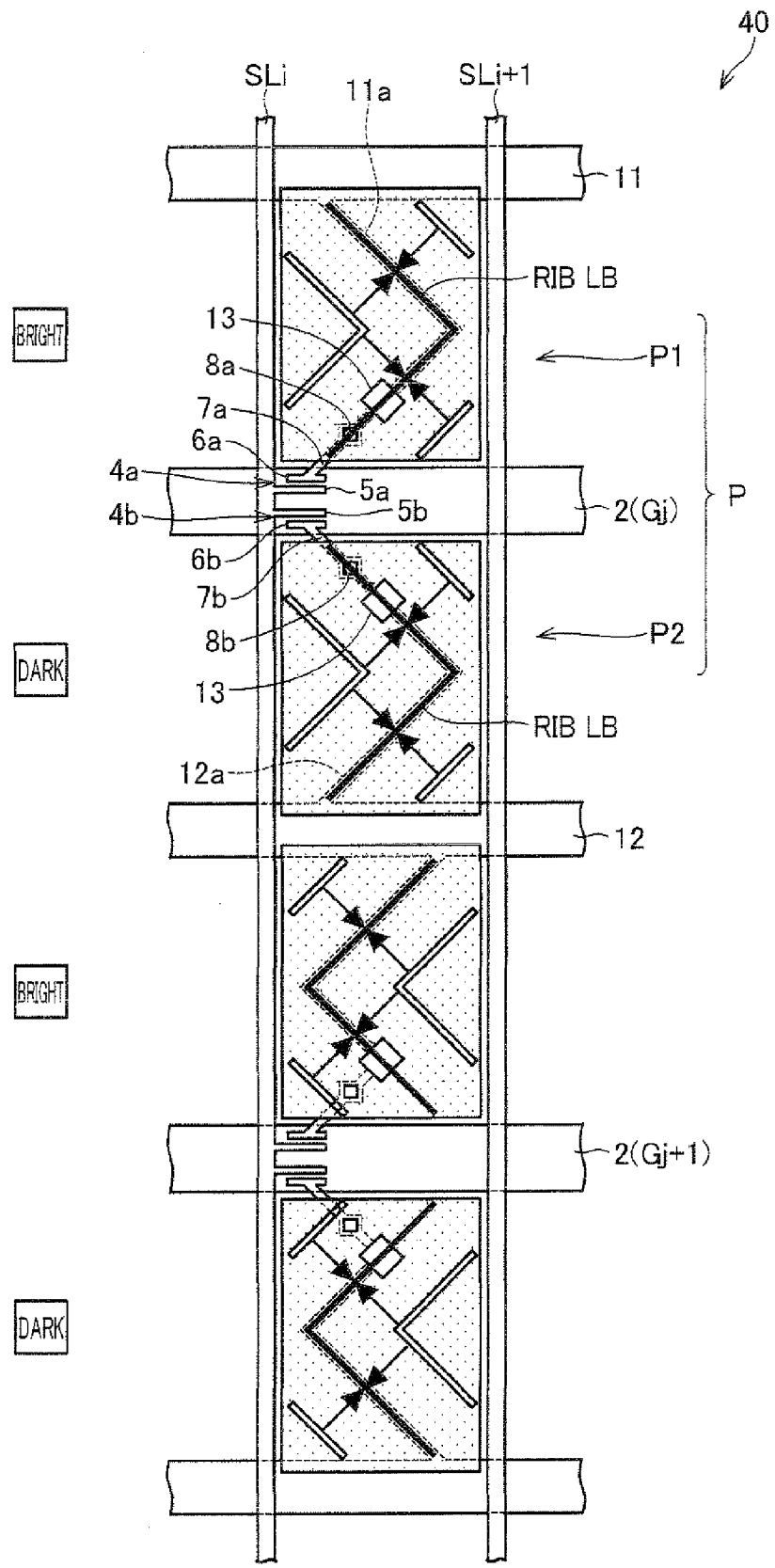
FIG. 9 illustrates another embodiment of a liquid crystal display device of the present invention and a see-through plan view showing an active matrix substrate on which ribs as alignment control structures for liquid crystal molecules are provided on a color filter substrate.

As shown in FIG. 9, in addition to an arrangement of Embodiment 1, each of a first drain extraction line 7*a* and a second drain extraction line 7*b* is provided in a liquid crystal display device 40 of the present embodiment so as to overlap with, for example, a rib LB as an alignment control structure. The arrangement of the present embodiment is not limited to this. Each of the first drain extraction line 7*a* and the second drain extraction line 7*b* may be provided so as to overlap with a slit SL.

As shown in FIG. 9, a first drain electrode 6*a* of a first TFT 4*a* provided in a first sub-pixel P1 is connected to the first drain extraction line 7*a*, and a second drain electrode 6*b* of a second TFT 4*b* provided in a second sub-pixel P2 is connected to the second drain extraction line 7*b*. Each of the first drain extraction line 7*a* and the second drain extraction line 7*b* is made of a conductive layer constituting a wiring section. The first drain extraction line 7*a* is connected to a first sub-pixel electrode 1*a* via a first contact hole 8*a* and the second drain extraction line 7*b* is connected to a second sub-pixel electrode 1*b* via a second contact hole 8*b*. Each of the first contact hole 8*a* and the second contact hole 8*b* penetrates an interlayer insulation film.

In the present embodiment, each of the first drain extraction line 7*a* and the second drain extraction line 7*b* of at least one pixel P1 explained above, that is, a pixel P connected to a gate line Gj that is a scanning signal line 2 in FIG. 9 is provided so as to overlap with, for example, a rib LB as an alignment control structure. The arrangement of the present embodiment is not necessarily limited to this arrangement. Each of the first drain extraction line 7*a* and the second drain extraction line 7*b* may overlap with a slit SL as an alignment control structure.

In general, each of the first drain electrode 6*a*, the second drain electrode 6*b*, the first drain extraction line 7*a*, and the second drain extraction line 7*b* is made of a metal wiring that is not transparent. Accordingly, when the first drain extraction line 7*a* overlaps with the first sub-pixel electrode 1*a* and the second drain extraction line 7*b* overlaps with the second sub-pixel electrode 1*b*, a so-called aperture area that is a display area is decreased.

In order to solve this problem, in the present embodiment, each of the first drain extraction line 7*a* and the second drain extraction line 7*b* of at least one pixel P is provided so as to overlap with an alignment control structure such as a rib LB. Accordingly, the first drain extraction line 7*a* and the second drain extraction line 7*b* are provided in the area that does not serve as an aperture area. Accordingly, deterioration in an aperture ratio can be prevented.

Meanwhile, in FIG. 9, the first storage capacitor line 11 and the second storage capacitor line 12 includes storage-capacitor-line extended section 11*a* and 12*a* that extend in the pixel P, respectively. Simultaneously, each of the storage-capacitor-line extended sections 11*a* and 12*b* can be provided so as to overlap with the rib LB as an alignment control structure.

In other words, by including the storage-capacitor-line extended sections 11*a* and 12*a* that extend in the pixel P, the first storage capacitor line 11 serves as a part of a first storage capacitor Ccs1 and the second storage capacitor line 12 serves as a part of a second storage capacitor Ccs2.

In this case, each of the first storage capacitor line 11, the second storage capacitor line 12, and the storage-capacitor-line extended sections 11*a* and 11*b* is generally made of a metal wiring that is not transparent. Accordingly, when the storage-capacitor-line extended section 11a overlaps with the first sub-pixel electrode 1a or the storage-capacitor-line extended section 12a overlaps with the second sub-pixel electrode 11b, a so-called aperture area that is a display area is decreased.

In order to solve this problem, in the present embodiment, each of the storage-capacitor-line extended sections 11a and 12a is provided so as to overlap with an alignment control structure, for example, a slit SL and a rib LB. Accordingly, the storage-capacitor-line extended sections 11a and 12a can be provided in the area that does not serve as an aperture area. Accordingly, deterioration in an aperture ratio can be prevented.

The storage-capacitor-line extended sections 11a and 12a may be further provided with an additional function.

That is, in the present embodiment, as shown in FIG. 9, each of the storage-capacitor-line extended sections 11a and 12a is extended below and along the rib LB to the first drain extraction line 7a or the second drain extraction line 7b. Each of the storage-capacitor-line extended sections 11a and 12a includes an overlap section 13 in which each of the storage-capacitor-line extended sections 11a and 12a overlaps with the first drain extraction line 7a or the second drain extraction line 7b via an insulation film that is not shown. In the overlap section, the first drain extraction line 7a can be connected to the storage-capacitor-line extended section 11a by penetration through the insulation film, and the second drain extraction line 7b can be connected to the storage-capacitor-line extended section 12a by penetration through the insulation film.

As a result, for example, in a case where the first TFT 4a and the second TFT 4b that are switching elements malfunction, each of the storage-capacitor-line extended sections 11a and 12a is connected to the first drain extraction line 7a or the second drain extraction line 7b by penetration through the insulation film. In addition, the first drain extraction line 7a is disconnected between, for example, the first contact hole 8a and the first drain electrode 6a, or the second drain extraction line 7b is disconnected between the second contact hole 8b and the second drain electrode 6b. The first contact hole 8a or the second contact hole 8b is a connection section with the first sub-pixel electrode 1a or the second sub-pixel electrode 1b. This makes it possible to connect the first sub-pixel electrode 1a and the first storage capacitor line 11 via the storage-capacitor-line extended section 11a or the second sub-pixel electrode 1b and the second storage capacitor line 12 via the storage-capacitor-line extended section 12a. As a result, a potential of the first sub-pixel electrode 1a or the second sub-pixel electrode 1b of a defective pixel can be decreased to a potential of the first storage capacitor line 11 or the second storage capacitor line 12.

Accordingly, in a case where the present invention is used in, for example, a normally black liquid crystal display device 40, a defective pixel that malfunctions is changed to a black dot and the defective pixel is prevented from being noticeable.

In such a case, the following arrangement is preferable. That is, (i) the first drain extraction line 7a is provided so as to be connected to the first sub-pixel electrode 1a via the first contact hole 8a that is formed between the first drain electrode 6a and the overlap section 13, and the first drain extraction line 7a up to the first contact hole 8a overlaps with, for example, the slit SL or the rib LB as an alignment control structure, or (ii) the second drain extraction line 7b is provided so as to be connected to the second sub-pixel electrode 1b via the second contact hole 8b that is formed between the second drain electrode 6b and the overlap section 13, and the second drain extraction line 7b up to the second contact hole 8b overlaps with, for example, the slit SL or the rib LB as an alignment control structure.

As a result, for example, in a case where the first TFT 4a and the second TFT 4b that are switching elements malfunction, the first drain extraction line 7a or the second drain extraction section 7b can be disconnected, for example, in a section where the first drain extraction line 7a or the second drain extraction line 7b overlaps with an alignment control structure such as a slit SL that is a section where no pixel electrode is present. Accordingly, disconnection becomes easy.

Figure 10:
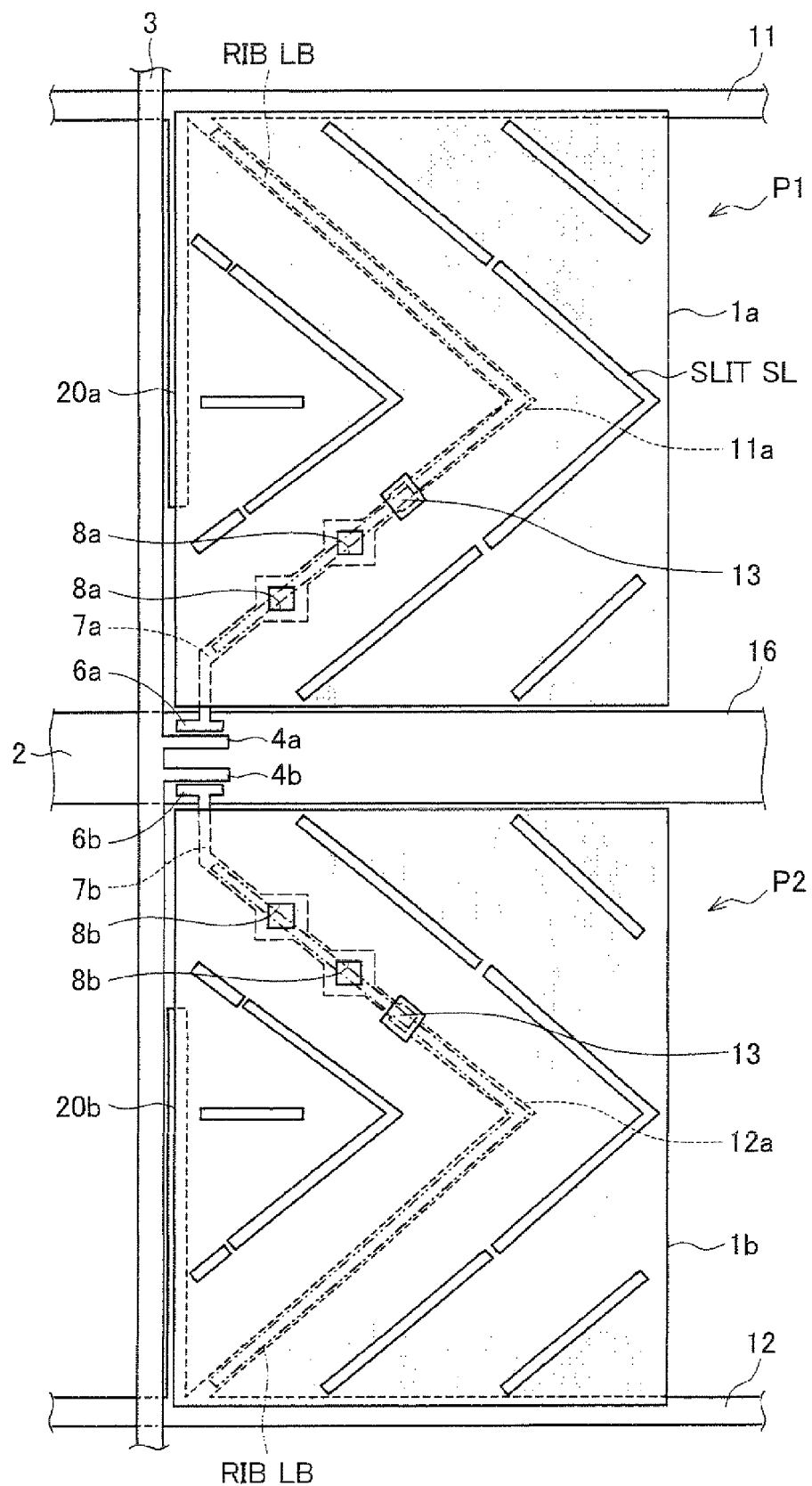
FIG. 10 is a plan view illustrating a pixel in which two contact holes are formed in the liquid crystal display device.

In the present embodiment, as shown in FIG. 10, the first contact hole 8a (or the second contact hole 8b) can be provided in a plurality of sections, for example, two sections, in the first drain extraction line 7a (or the second drain extraction line 7b) between the first drain electrode 6a (or the second drain electrode 6b) and the overlap section 13.

This maintains redundancy in electrical connection between the first drain electrode 6a (or the second drain electrode 6b) and the first sub-pixel electrode 1a (or the second sub-pixel electrode 1b). As a result, bad connection can be prevented.

Figure 11:
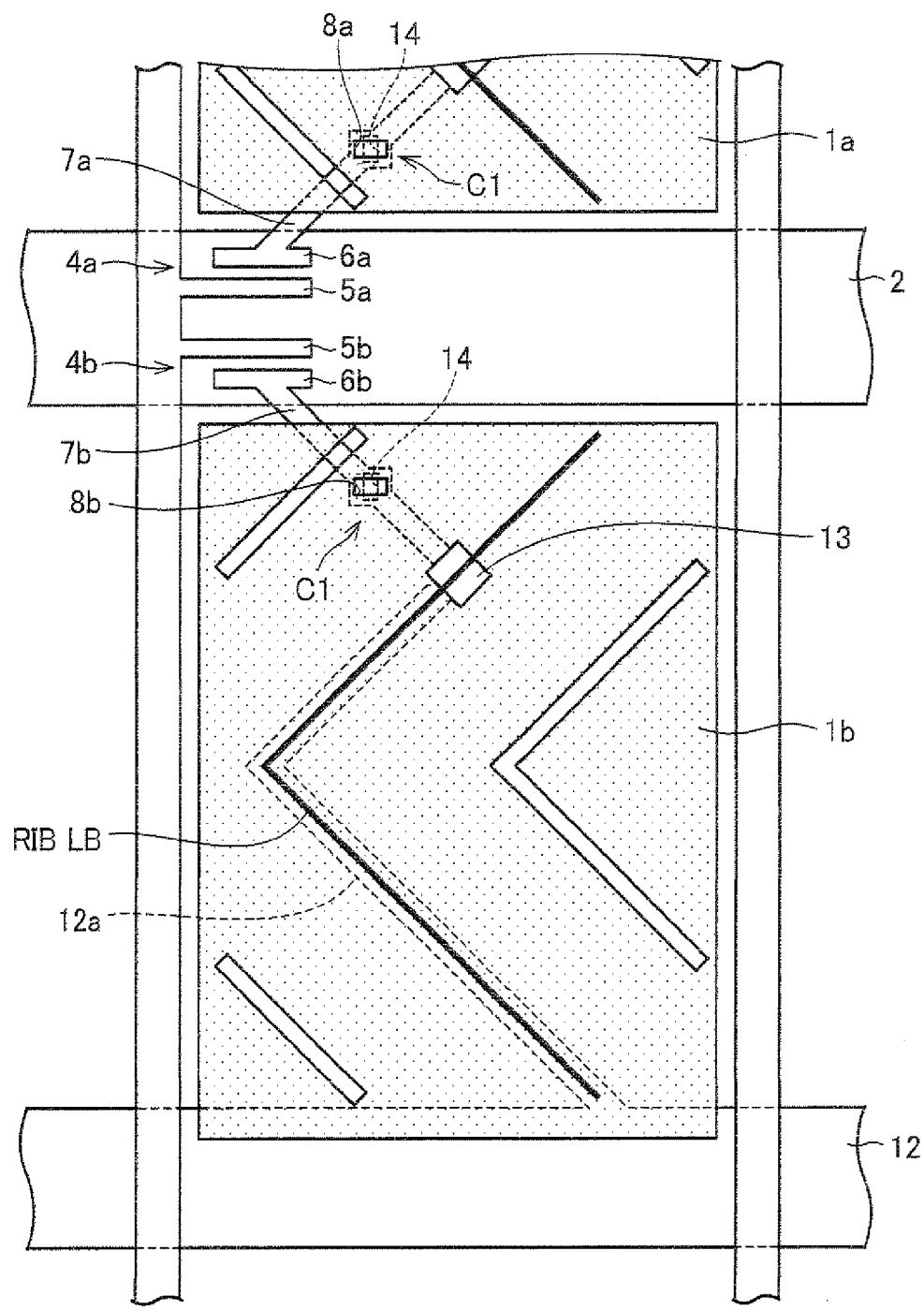
FIG. 11 is a plan view illustrating a pixel in which an aperture section crossing a contact hole is formed in a drain extraction line in the liquid crystal display device.

In the present embodiment, as shown in FIG. 11, it is preferable that, in the second drain extraction line 7b (also, the first drain extraction line 7a), one contact area C1 is provided and an aperture section 14 intersecting with the second contact hole 8b (also, the first contact hole 8a) is formed.

The second drain extraction line 7b (also, the first drain extraction line 7a) is generally formed by a metal wiring that is not transparent. Accordingly, a so-called aperture area that is a display area is decreased when the second drain extraction line 7b (also, the first drain extraction line 7a) overlaps with the second contact hole 8b (also, the first contact hole 8a) of the second sub-pixel electrode 1b (also, the first sub-pixel electrode 1a).

In order to solve this problem, in the present embodiment, an aperture section 14 intersecting with the second contact hole 8b (also, the first contact hole 8a) is formed in the second drain extraction line 7b (also, the first drain extraction line 7a). Accordingly, at the second contact hole 8b (also, the first contact hole 8a), deterioration in the aperture ratio can be prevented.

The aperture section 14 is formed so as to intersect with the second contact hole 8b (also, the first contact hole 8a). Therefore, while the deterioration in the aperture ratio at the second contact hole 8b (also, the first contact hole 8a) is prevented, a sufficient contact area between the second drain extraction line 7b (also, the first drain extraction line 7a) and the second sub-pixel electrode 1b (also, the first sub-pixel electrode 1a) via the second contact hole 8b (also, the first contact hole 8a) can be reliably provided even in a case where misalignment occurs in a production process.

Figure 12:
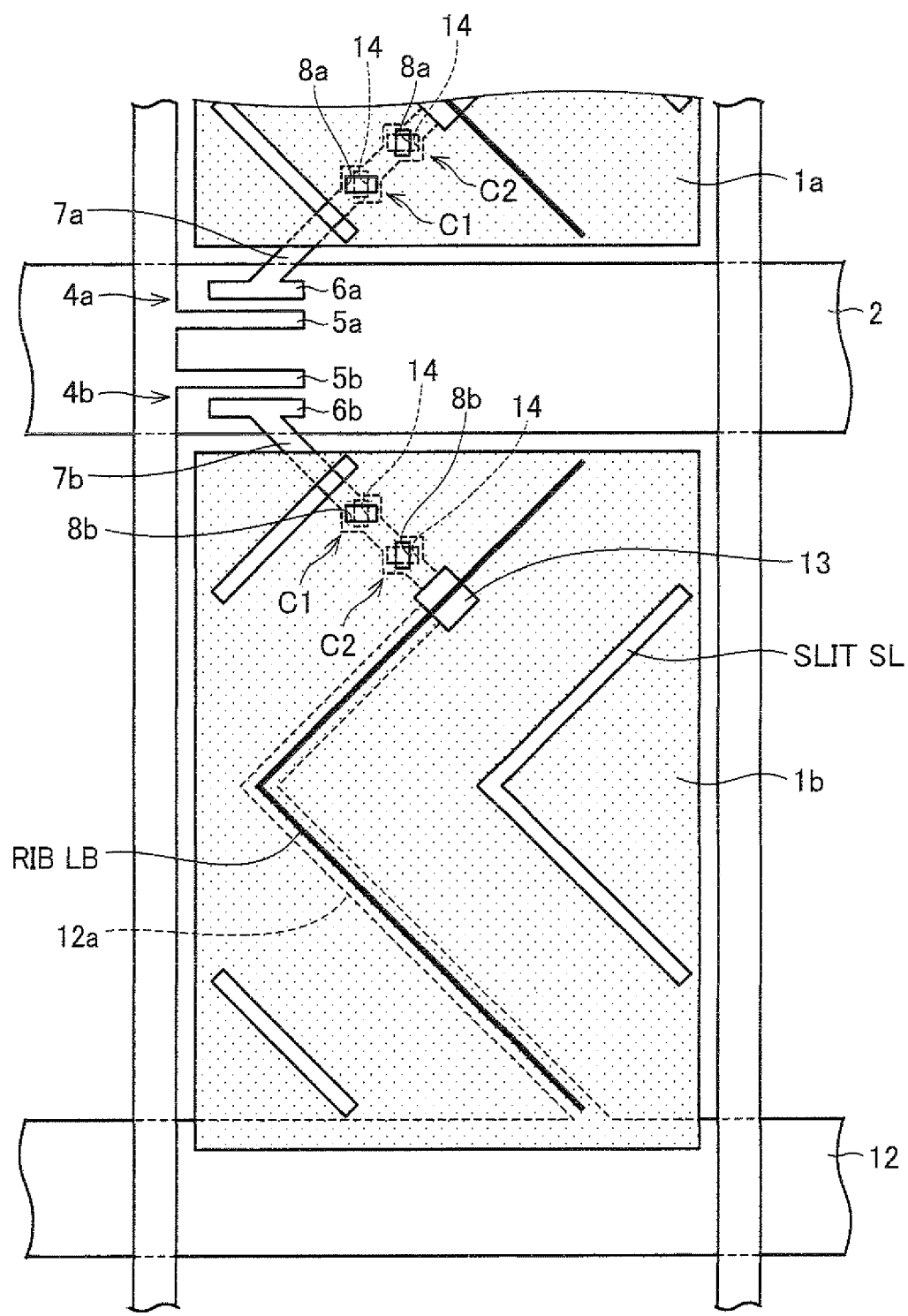
FIG. 12 is a plan view illustrating a pixel in which aperture sections respectively crossing the contact holes are formed in a drain extraction line that is connected with the two contact holes, in the liquid crystal display device.

Further, in the present embodiment, it is preferable to have an arrangement as shown in FIG. 12. In FIG. 12, a plurality of, for example, two contact areas C1 and C2 are provided. In addition, at least one contact area C1 is provided with a rectangular aperture section 14 whose longitudinal direction is the same as a vertical direction of FIG. 12 while the other contact area C2 is provided with a rectangular aperture section 14 whose longitudinal direction is the same as a horizontal direction of FIG. 12. This arrangement makes it possible to reliably provide a sufficient contact area via the second contact hole 8b (also, the first contact hole 8a) between the second drain extraction line 7b (also, the first drain extraction line 7a) and the second sub-pixel electrode 1b (also, the first sub-pixel electrode 1a) in at least one of the contact areas C1 and C2, even in a case where misalignment in either a vertical direction or a horizontal direction occurs in a production process.

The formation of such an aperture section 14 is particularly suitable in a case where the contact areas C1 and C2 of the second drain extraction line 7b (also, the first drain extraction line 7a) cannot be formed under the rib LB or the slit SL of the second sub-pixel electrode 1b (also, the first sub-pixel electrode 1a).

Embodiment 3

Figure 13:
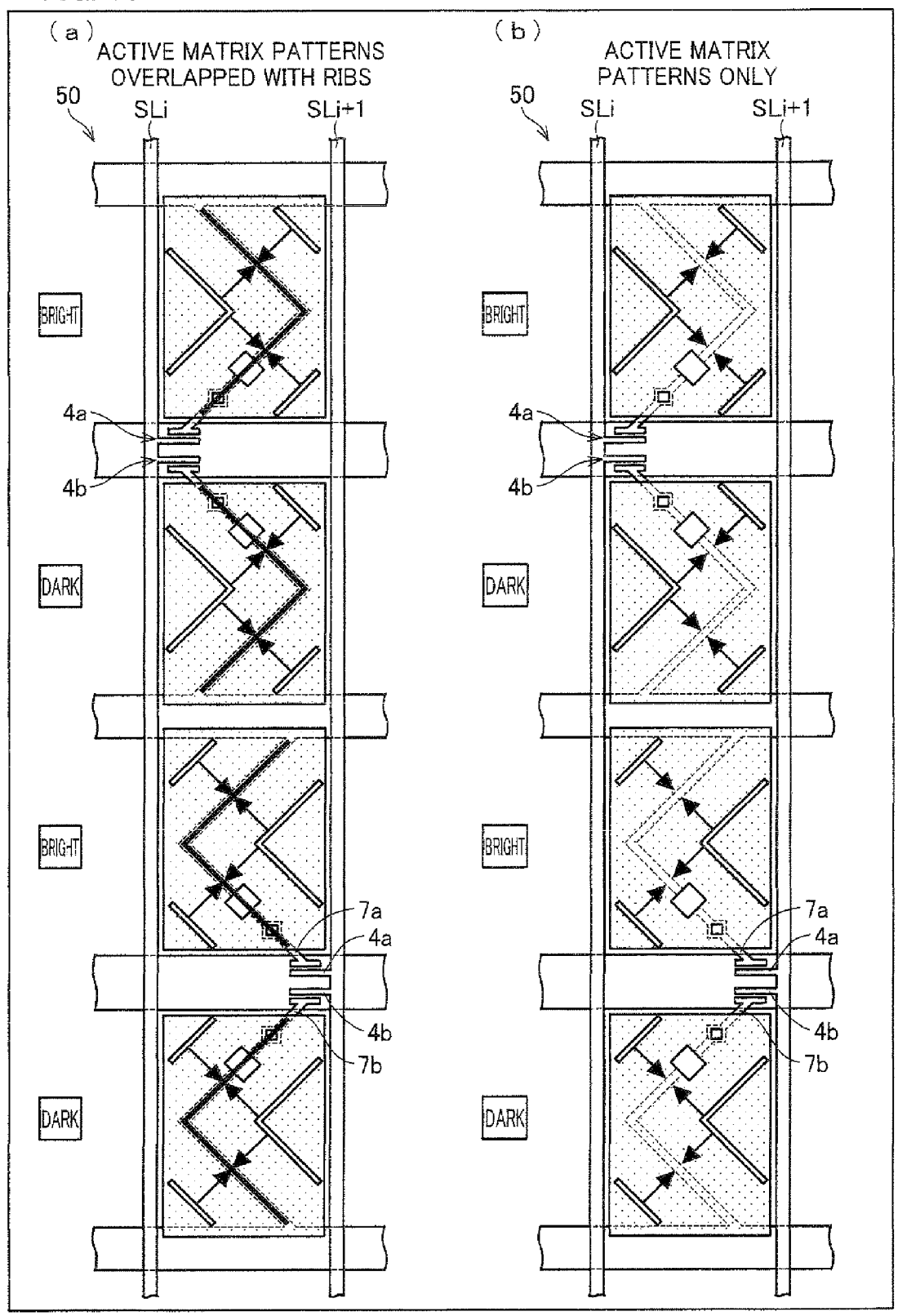
FIG. 13 illustrates still another embodiment of a liquid crystal display device of the present invention and is a plan view showing an active matrix substrate in which TFTs are provided to data signal lines in a staggered pattern.

The following explains a still another embodiment of the present invention, with reference to FIGS. 13 and 14. An arrangement other than an arrangement explained in the present embodiment is the same as arrangements in Embodiment 1 and embodiment 2. For convenience of an explanation, members given the same reference numerals as the members shown in drawings of Embodiment 1 and Embodiment 2 respectively have identical functions and the explanations thereof are omitted.

A liquid crystal display device 50 of the present embodiment is arranged as follows, as shown in (a) and (b) of FIG. 13. In addition to the arrangements of Embodiment 1 and Embodiment 2, in pixel P units adjacent to each other in a column direction, a first TFT 4a and a second TFT 4b of one pixel P unit are connected to a source line SLi and another first TFT 4a and another second TFT 4b of the other pixel P unit are connected to another source line SLi+1. The first TFTs 4a and the second TFTs 4b are switching elements, and the source lines SLi and SLi+1 are data signal lines 3.

As shown in (a) of FIG. 14, in general, a dot inversion drive is carried out in a liquid crystal display. In this dot inversion drive, a polarity of a voltage applied to each of the source lines SLi and SLi+1 needs to be inverted for every horizontal line. Accordingly, deterioration in image quality may occur due to delay in signals of the source lines SLi and SLi+1. In order to solve this problem, as shown in (b) of FIG. 14, a source line inversion drive may be carried out. In the source line inversion drive, polarities of respective voltages applied to the source lines SLi and SLi+1 are inverted for each one frame. Accordingly, compared with the dot inversion drive, a period of each polarity of a data signal can be shortened. This makes it possible to suppress a power consumption of the source driver 33 so that the power consumption is low and to prevent deterioration in image quality caused by delay in signals of the source lines SLi and SLi+1. However, when the source line inversion drive is carried out, polarities between the source lines SLi and SLi+1 that are the data signal lines 3 adjacent to each other become different from each other. As a result, as shown in (b) of FIG. 14, a polarity of a voltage applied becomes different for each line of pixels. As a result, a vertical streak (vertical flicker) may become visible.

In order to solve this problem, in the present embodiment, as shown in (a) and (b) of FIG. 13, in pixel P units adjacent to each other in a column direction, (i) a first TFT 4a and a second TFT 4b of one pixel P unit and (ii) another first TFT 4a and another second TFT 4b of the other pixel P unit are connected to different source lines SLi and SLi+1 that are data signal lines 3, respectively.

As shown in (c) of FIG. 14, even in the case of the source line inversion drive in which a polarity of a voltage applied to each data signal line 3 is inverted for each one frame, the polarity applied to each pixel P becomes the same polarity as in the case of the dot inversion drive. This makes it possible to prevent deterioration in image quality caused by delay in signals of the source lines SLi and SLi+1 and to prevent the occurrence of the vertical flicker.

As shown in FIG. 9 of Embodiment 2, a pixel P connected to a gate line Gj is provided with a set of slits SL and a set of ribs LB each set having a plane shape sequentially repeating a shape of a symbol ">" twice. In addition, another pixel P that is connected to another gate line Gj+1 and provided adjacent to the pixel P connected to the gate line Gj is provide with a set of slits SL and a set of ribs LB which sets are obtained by rotating by 180 degrees the set of slits SL and the set of ribs LB of the pixel P above and each of which sets has a plane shape sequentially repeating a shape of a symbol "<" twice. In this case, in the pixel P connected to the gate line Gj, a first drain extraction line 7a or a second drain extraction line 7b can be provided so as to overlap with, for example, the rib LB as an alignment control structure.

However, in the pixel P connected to the gate line Gj+1, it is difficult to provide the first drain extraction line 7a or the second drain extraction line 7b so that a whole section of the first drain extraction line 7a or the second drain extraction line 7b overlaps with, for example, the rib LB as an alignment control structure. For the purpose of suppressing deterioration in an aperture ratio, a whole section of the first drain extraction line 7a and the second drain extraction line 7b may be arranged to overlap with the ribs LB. For overlapping the whole section of the first drain extraction line 7a and the second drain extraction line 7b with the ribs LB, the first drain extraction line 7a and the second drain extraction line 7b need to be overstretched along the gate line Gj+1 in a manner such that the first drain extraction line 7a and the second drain extraction line overlap with, for example, the gate line Gj+1. However, as a result of the overstretching, the parasitic capacitance between the gate line Gj+1 and each of the first drain extraction line 7a and the second drain extraction line 7b increases. Therefore, it is not desirable to overstretch the first drain extraction line 7a and the second drain extraction line 7b.

On the contrary, in the present embodiment, as shown in (a) and (b) of FIG. 13, in pixel P units adjacent to each other in a column direction, (i) a first TFT 4a and a second TFT 4b of one pixel P unit and (ii) another first TFT 4a and another second TFT 4b of the other pixel P unit are connected to different source lines SLi and SLi+1 that are data signal lines 3, respectively. This makes it easy to provide the first drain extraction line 7a or the second drain extraction line 7b in a manner such that the first drain extraction line 7a or the second drain extraction line 7b overlaps with, for example, a rib LB as an alignment control structure. This makes it possible to provide an efficient pattern arrangement that further suppresses the aperture ratio compared with Embodiment 2.

The following explains in more detail the embodiment of the present invention with reference to FIGS. 18 through 41.

Figure 18:
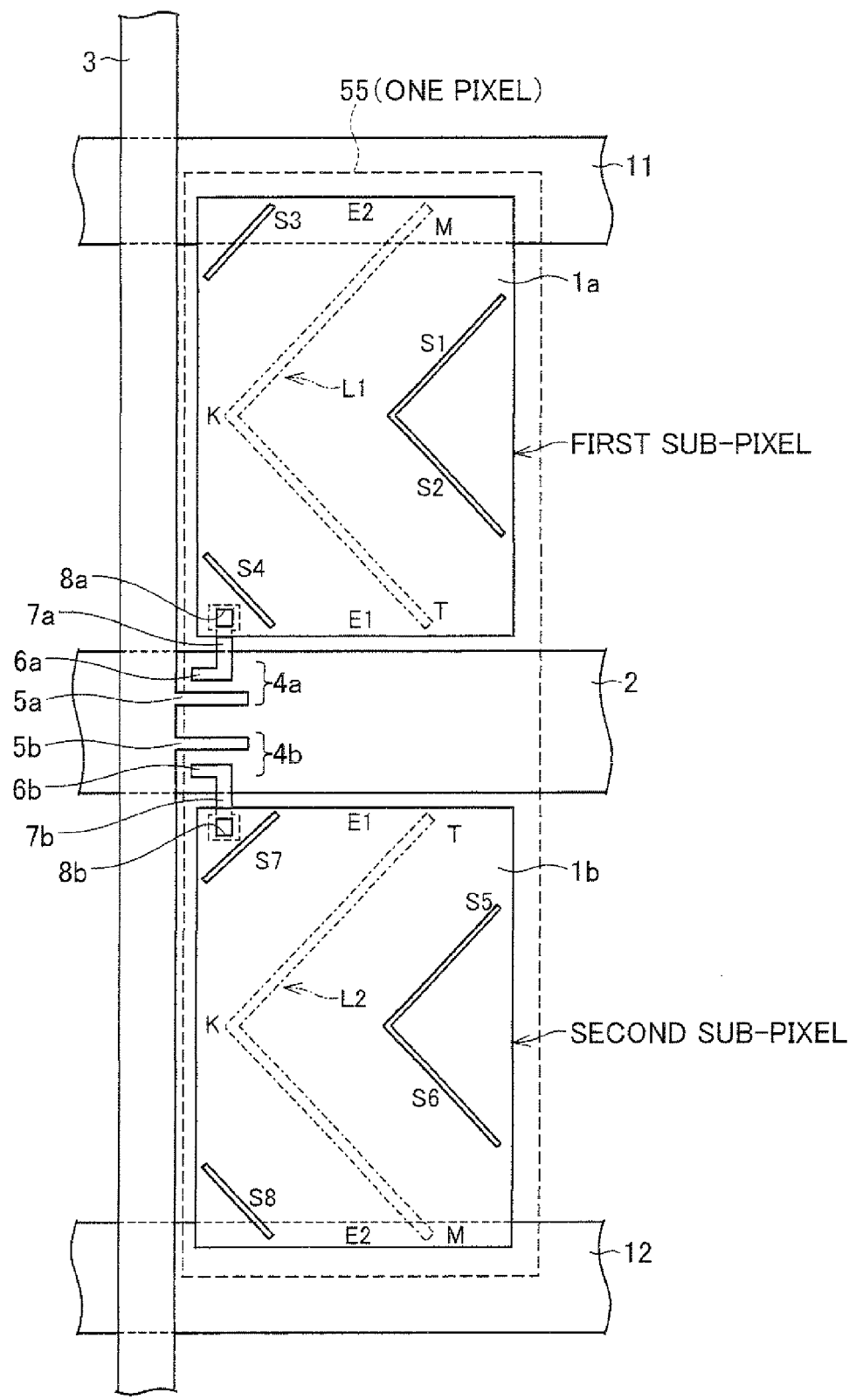
FIG. 18 is a plan view illustrating an arrangement (of one pixel) of the liquid crystal panel of the present invention.

FIG. 18 is a plan view of an MVA mode liquid crystal panel that is of a divided-pixel system and used in the liquid crystal display device as explained in Embodiment 1. This liquid crystal panel includes an active matrix substrate, a liquid crystal layer, and a color filter substrate. However, FIG. 18 does not show the liquid crystal layer. As to the color filter, FIG. 18 shows only ribs.

As shown in FIG. 18, in each pixel area (not shown) of the active matrix substrate, first and second sub-pixel areas (not shown) are provided so as to sandwich a scanning signal line 2. A first sub-pixel is formed so as to include this first sub-pixel area and a part of the color filter substrate corresponding to the first sub-pixel area, and a second sub-pixel is formed so as to include the second sub-pixel area and a part of the color filter substrate corresponding to the second sub-pixel area.

The first sub-pixel is provided with a first pixel electrode 1a that overlaps with substantially all of the first sub-pixel area. Further, the first sub-pixel is provided with a first alignment control structure made of a first rib L1 and slits (pixel electrode slits) S1 through S4. Meanwhile, the second sub-pixel is provided with a second pixel electrode 1b that overlaps with substantially all of the second sub-pixel area. Further, the second sub-pixel is provided with a second alignment control structure made of a second rib L2 and slits (pixel electrode slits) S5 through S8. One pixel 55 is made of the first and second sub-pixels.

As shown in FIGS. 18 and 5 (equivalent circuit), the pixel 55 includes two transistors 4a and 4b. The first transistor 4a has a source electrode 5a connected to the data signal line 3 (SLi) and a drain electrode 6a connected to the first pixel electrode 1a via the first drain extraction line 7a and a contact hole 8a. The second transistor 4b has a source electrode 5b connected to the data signal line 3 and a drain electrode 6b connected to the second pixel electrode 1b via the second drain extraction line 7b and a contact hole 8b. The scanning signal line 2 (Gj) serves also as gate electrodes of the first transistor 4a and the second transistor 4b. Further, a first storage capacitor (Ccs1) is formed in a section where the first pixel electrode 1a and the first storage capacitor line 11 overlap, and a second storage capacitor (Ccs2) is formed in a section where the second pixel electrode 1b and the second storage capacitor line 12 overlap. A first sub-pixel capacitor (Clc1) is formed between the pixel electrode 1a and a common electrode (common counter electrode) of the color filter substrate. A second sub-pixel capacitor (Clc2) is formed between the pixel electrode 1b and the common electrode (common counter electrode) of the color filter substrate. In a case where the liquid crystal panel of the present invention is used in a liquid crystal display device, the same potential is once written in the first and the second pixel electrodes 1a and 1b. However, potentials of the first and second storage capacitor lines 11 and 12 are controlled to have, for example, phases opposite to each other, so that effective potentials of pixel electrodes 1a and 1b become different. As a result, for example, the first sub-pixel can be a bright sub-pixel and the second sub-pixel can be a dark sub-pixel.

In the pixel 55, the first sub-pixel positioned on one side of the scanning signal line 2 has an edge section E1 along the scanning signal line 2 and another edge section E2 opposed to the end section E1. The second sub-pixel positioned on the other side of the scanning signal line 2 has another edge section E1 along the scanning signal line 2 and another edge section E2 opposed to the another edge section E1. Here, in a part of the color filter substrate corresponding to the first sub-pixel, a first rib L1 is provided in a letter V shape when viewed in a row direction (left to right direction in FIG. 18). The first rib L1 has a start end section T positioned at the edge section E1 and a terminal end section M positioned at the edge section E2. Further, in a part of the color filter substrate corresponding to the second sub-pixel, a second rib L2 is provided in a letter V shape when viewed in a row direction (left to right direction in FIG. 18). The second rib L2 has a start end section T positioned at the edge section E1 and a terminal end section M positioned at the edge section E2. In other words, a direction of the first rib L1 is the same as a direction of the second rib L2.

Further, the first pixel electrode 1a is provided with the plurality of slits S1 to S4 each corresponding to the first rib L1. The second pixel electrode 1b is provided with the plurality of slits S5 to S8 each corresponding to the second rib L2. The slits S2 and S4 are provided on respective sides of the first rib L1 so as to be substantially parallel to a section from the start end section T to a bent section K of the first rib L1. The slits S1 and S3 are provided on respective sides of the first rib L1 so as to be substantially parallel to a section from the bent section K to the terminal end section M of the first rib L1. The slits S5 and S7 are provided on respective sides of the second rib L2 so as to be substantially parallel to a section from the start end section T to a bent section K of the second rib L2. The slits S6 and S8 are provided on respective sides of the second rib L2 so as to be substantially parallel to a section from the bent section K to the terminal end section M of the second rib L2. Shapes of the slits S5 through S8 are the same as those of the slits S1 to S4, and positions respectively provided with the slits S5 through S8 with respect to the second rib L2 are the same as positions respectively provided with the slits S1 through S4 with respect to the first rib L1. Regarding each of the first and second ribs L1 and L2, an angle ($\angle$TKM) formed by the start end section T, the bent section K and the terminal end section M is approximately 90°.

In this way, the slit S1, one side section (K-M section) of the first rib L1, and the slit S3 stretch in parallel to one another and are inclined (at approximately 45°) with respect to the scanning signal line 2. The slit S2, the other side section (T-K section) of the first rib L1, and the slit S4 stretch in parallel to one another and are inclined (at approximately 135°) with respect to the scanning signal line 2. A part of the other side section (T-K section) of the first rib L1 and a part of the slit S4 are positioned in an edge section (a section along the scanning signal line 2) of the first sub-pixel. Meanwhile, the slit S6, one side section (K-M section) of the second rib L2, and the slit S8 stretch in parallel to one another and are inclined (at approximately 135°) with respect to the scanning signal line 2. The slit S5, the other side section (T-K section) of the second rib L2, and the slit S7 stretch in parallel to one another and are inclined (at approximately 45°) with respect to the scanning signal line 2. A part of the other side section (T-K section) of the second rib L2 and a part of the slit S7 are positioned in an edge section (a section along the scanning signal line 2) of the second sub-pixel.

Each of (a) and (b) of FIG. 40 is a schematic cross sectional view schematically illustrating a case where the liquid crystal panel of the present invention is used in a liquid crystal display device. In the liquid crystal panel of the present invention, a vertical alignment film is used as an alignment film, and a liquid crystal whose dielectric anisotropy is negative is used. As shown in FIG. 40, in the liquid crystal display device of the present invention, liquid crystal molecules are upright at the time when black display is carried out (in a case where a voltage V between the active matrix substrate and the color filter substrate is 0). On the other hand, the liquid molecules are inclined in directions that are different in respective domains formed by the first or second rib and slits, at the time when gray level display is carried out (a dotted line in (b) of FIG. 40 shows an electric flux line).

Figure 19:
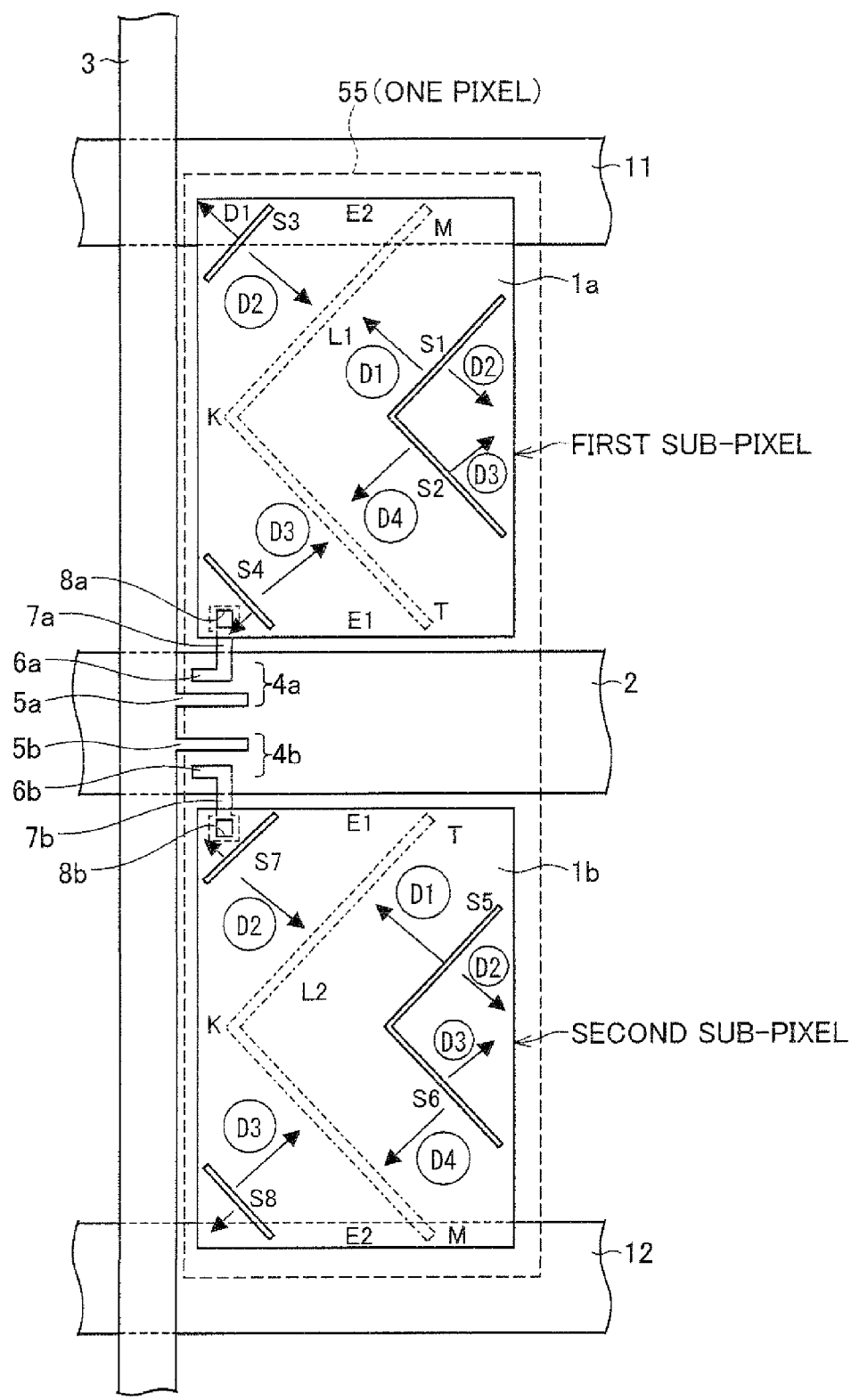
FIG. 19 is a plan view illustrating an alignment state of the liquid crystal display device of the present invention using the liquid crystal panel shown in FIG. 18.

In other words, the part of the color filter substrate corresponding to the first sub-pixel is provided with the first rib L1, and the first pixel electrode 1a is provided with the slits S1 through S4. As a result, as shown in FIG. 19, alignment domains D3 and D4 are formed on respective sides of the section of the first rib L1 from the start end section T to the bent section K and alignment domains D1 and D2 are formed on respective sides of the section of the first rib L1 from the bent section K to the terminal end section M. Further, another alignment domain D2 is formed on a side of the slit S1 which is not opposed to the first rib L1. Another alignment domain D3 is formed on a side of the slit S2 which is not opposed to the first rib L1. Another alignment domain D1 is formed on a side of the slit S3 which is not opposed to the first rib L1. Another alignment domain D4 is formed on a side of the slit S4 which is not opposed to the first rib L1. In a similar manner, the part of the color filter substrate corresponding to the second sub-pixel is provided with the second rib L2 and the second pixel electrode 1b is provided with the slits S5 through S8. As a result, as shown in FIG. 19, alignment domains D1 and D2 are formed on respective sides of the section of the second rib L2 from the start end section T to the bent section K and alignment domains D3 and D4 are formed on respective sides of the section of the second rib L2 from the bent section K to the terminal end section M. Further, another alignment domain D2 is formed on a side of the slit S5 which is not opposed to the second rib L2. Another alignment domain D3 is formed on a side of the slit S6 which is not opposed to the second rib L2. Another alignment domain D1 is formed on a side of the slit S7 which is not opposed to the second rib L2. Another alignment domain D4 is formed on a side of the slit S8 which is not opposed to the second rib L2. This makes it possible to achieve a wider viewing angle of the liquid crystal display device using the liquid crystal panel of the present invention.

Figure 20:
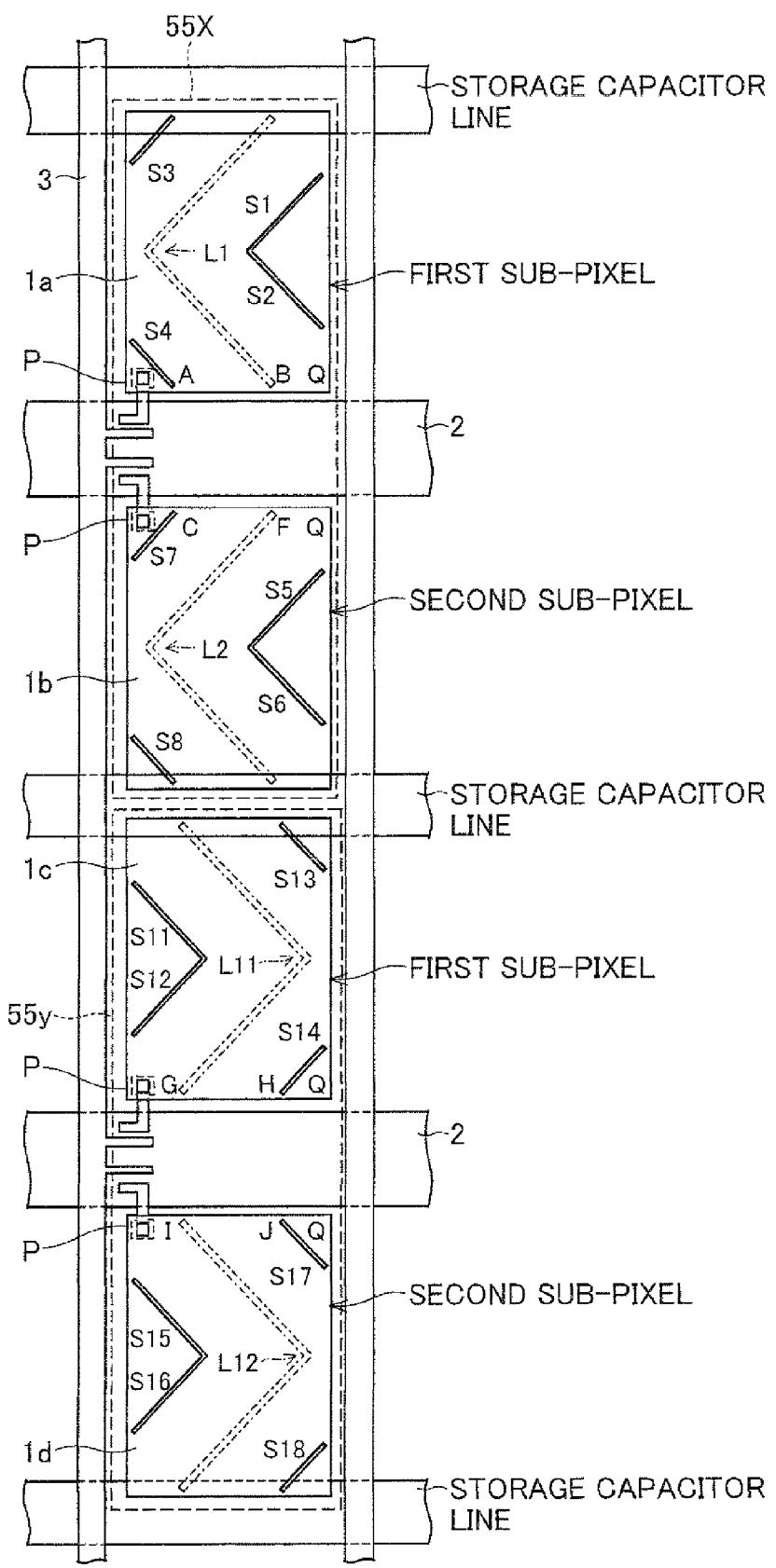
FIG. 20 is a plan view illustrating an arrangement (of two pixels) of the liquid crystal panel of the present invention.

In the liquid crystal panel of the present invention, as shown in FIG. 20, a first alignment control structure (rib and slits), which is provided in a pixel 55x that is one of pixels 55x and 55y adjacent to each other in a column direction, has a shape that is obtained by rotating by 180 degrees another first alignment control structure (rib and slits), which is provided in the pixel 55y that is the other one of the pixels 55x and 55y. The shapes of the first and second alignment control structures in each pixel are substantially identical. Therefore, the second alignment control structure (rib and slits) provided in the pixel 55x has a shape that is obtained by rotating by 180 degrees the other second alignment control structure (rib and slits) provided in the pixel 55y. In other words, ribs L11 and L12, first and second pixel electrodes 1c and 1d, and slits S11 through S18 of the first and second pixel electrodes 1c and 1d, which are provided in the pixel 55y, have shapes that are obtained by rotating by 180 degrees the ribs L1 and L2, the first and second pixel electrodes 1a and 1b, and the slits S1 through S8 of the first and second pixel electrodes 1a and 1b, which are provided in the pixel 55x. Specifically, the slit S11, one side section of the first rib L11, and the slit S13 stretch in parallel to one another and are inclined (at approximately 135°) with respect to the scanning signal line 2. The slit S12, the other side section of the first rib L11, and the slit S14 stretch in parallel to one another and are inclined (at approximately 45°) with respect to the scanning signal line 2. A part G of the other side section of the first rib L11 and a part H of the slit S14 are positioned in an edge section (a section along the scanning signal line 2) of the first sub-pixel. On the other hand, the slit S16, one side section of the second rib L12, and the slit S18 stretch in parallel to one another and are inclined (at approximately 45°) with respect to the scanning signal line 2. The slit S15, the other side section of the second rib L12, and the slit S17 stretch in parallel to one another and are inclined (at approximately 135°) with respect to the scanning signal line 2. A part I of the other side section (T-K section) of the second rib L12 and a part J of the slit S17 are positioned in an edge section (a section along the scanning signal line 2) of the second sub-pixel. Similarly, in the pixel 55x, as shown in FIG. 20, a part B of one side section of the first rib L1 and a part A of the slit S4 are positioned in an edge section (a section along the scanning signal line 2) of the first sub-pixel, and a part F of one side section of the second rib L2 and a part C of the slit S7 are positioned in an edge section (a section along the scanning signal line 2) of the second sub-pixel.

Figure 21:
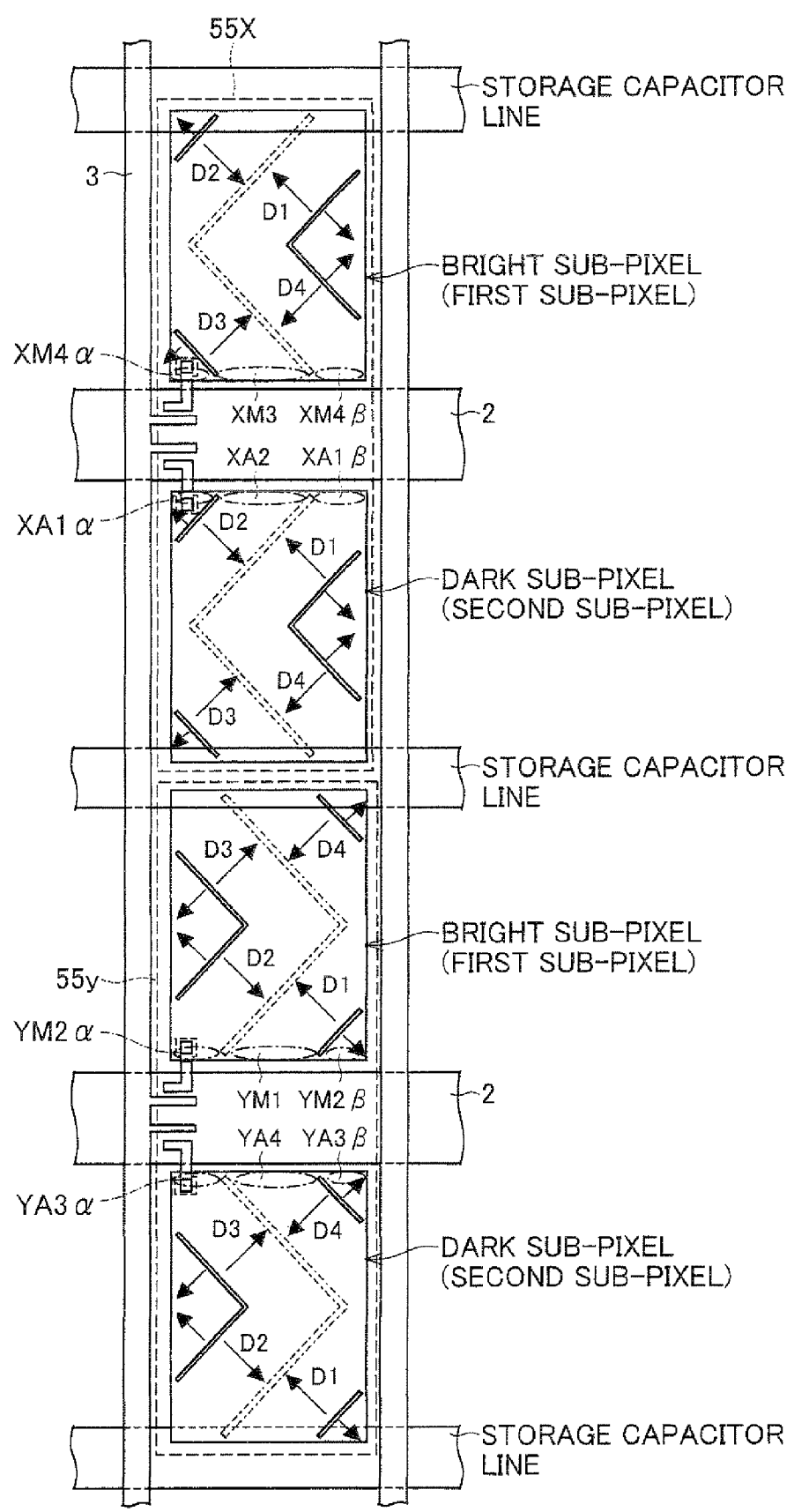
FIG. 21 is a plan view illustrating an alignment state of the liquid crystal display device of the present invention using the liquid crystal panel shown in FIG. 20.

FIG. 21 illustrates distribution of the alignment domains D1 to D4, which are formed within the pixels 55x and 55y of the liquid crystal display device using the liquid crystal panel. In each of the pixels 55x and 55y, the first sub-pixel corresponds to the bright sub-pixel and the second sub-pixel corresponds to the dark sub-pixel.

It is known that, in each pixel, liquid crystal alignment in the vicinity of the scanning signal line 2 (a section along the scanning signal line 2) is disordered. However, in the liquid crystal panel, in each of the two pixels 55x and 55y adjacent to each other, respective disordered alignment sections in the alignment domains D1 to D4 of the bright sub-pixel in the pixel 55x are: 0(none) in D1; 0(none) in D2; XM3 in D3; and XM4α+XM4β in D4. Respective disordered alignment sections in the alignment domains D1 to D4 of the dark sub-pixel in the pixel 55x are: XA1α+XA1β in D1; XA2 in D2; 0(none) in D3; and 0(none) in D4. Respective disordered alignment sections in the alignment domains D1 to D4 of the bright sub-pixel in the pixel 55y are: YM1 in D1; YM2α+YM2β in D2; 0(none) in D3; and 0(none) in D4. Respective disordered alignment sections in the alignment domains D1 to D4 of the dark sub-pixel in the pixel 55y are: 0(none) in D1; 0(none) in D2; YA3α+YA3β in D3; and YA4 in D4.

Therefore, when the two pixels (55x and 55y) are assumed to be one unit, the respective disordered alignment sections in the alignment domains D1 to D4 included in the two bright sub-pixels are: YM1 in D1; YM2α+YM2β in D2; XM3 in D3; and SM4α+XM4β in D4. The respective disordered alignment sections in the alignment domains D1 to D4 included in the two dark sub-pixels are: XA1α+XA1β in D1; XA2 in D2; YA3α+YA3β in D3; and YA4 in D4.

The above explains that, in the liquid crystal panel, the disordered alignment sections are produced in the two bright sub-pixels included in the pixels 55x and 55y adjacent to each other. These disordered alignment sections are distributed to the alignment domains D1 to D4. Further, in the liquid crystal panel, the first and second alignment control structures in each pixel (55x and 55y) are arranged so that YM1, YM2α+YM2β, XM3, and XM4α+XM4β become substantially equal in size. Accordingly, dimensions of the respective disordered alignment areas (an influence of the disordered alignment that each alignment domain receives) in the alignment domains D1 to D4 are substantially equalized. Similarly, the above explains that the disordered alignment sections are produced in the two dark sub-pixels included in the pixels 55x and 55y adjacent to each other. These disordered alignment sections are distributed to the alignment domains D1 to D4. Furthermore, in the liquid crystal panel, the first and second alignment control structures in each pixel (55x and 55y) are arranged so that XA1α+XA1β, XA2, YA3α+YA3β, and YA4 become substantially equal in size. Accordingly, dimensions of the respective disordered alignment areas (an influence of the disordered alignment that each alignment domain receives) in the alignment domains D1 to D4 are substantially equalized. The same applies to a case where positions of the bright sub-pixel and the dark sub-pixel are switched.

Note that: the size of YM1 can be approximated by a length between G and H in FIG. 20; the size of YM2α can be approximated by a length between P and G in FIG. 20; the size of YM2β can be approximated by a length between H and Q in FIG. 20; the size of XM3 can be approximated by a length between A and B in FIG. 20; the size of XM4α can be approximated by a length between P and A in FIG. 20; and the size of XM4β can be approximated by a length between B and Q in FIG. 20. Similarly, the size of XA1α can be approximated by a length between P and C in FIG. 20; the size of XA1β can be approximated by a length between F and Q in FIG. 20; the size of XA2 can be approximated by a length between C and F in FIG. 20; the size of YA3α can be approximated by a length between P and I in FIG. 20; the size of YA3β can be approximated by a length between J and Q in FIG. 20; and the size of YA4 can be approximated by a length between I and J in FIG. 20. P and Q indicate both ends, respectively, that are of the sub-pixel and along the scanning signal line.

As described above, the liquid crystal panel of the present invention can evenly distribute, to each of the alignment domains (D1 to D4), the influence of the disordered alignment caused by the scanning signal line 2. As a result, it becomes possible to maintain, as far as possible, a balance of viewing angle characteristics intended at the time when the liquid crystal display is designed. Consequently, a liquid crystal display device whose viewing angle characteristics are excellent can be obtained.

In the liquid crystal panel as shown in FIG. 18, the first and second ribs that are provided in one pixel are discontinuous (the ribs are provided with a space therebetween and independent from each other). This arrangement can prevent a vacuum bubble from occurring in the liquid crystal, for example, in a case where a one-drop filling method is used. This is because, in the arrangement, the liquid crystal easily spreads due to the space between the first and second ribs. Further, in a case where the alignment film is formed by an ink-jet method, the alignment film easily spreads due to the space between the first and second ribs. As a result, it is possible to prevent an alignment film from being unevenly formed.

Figure 38:
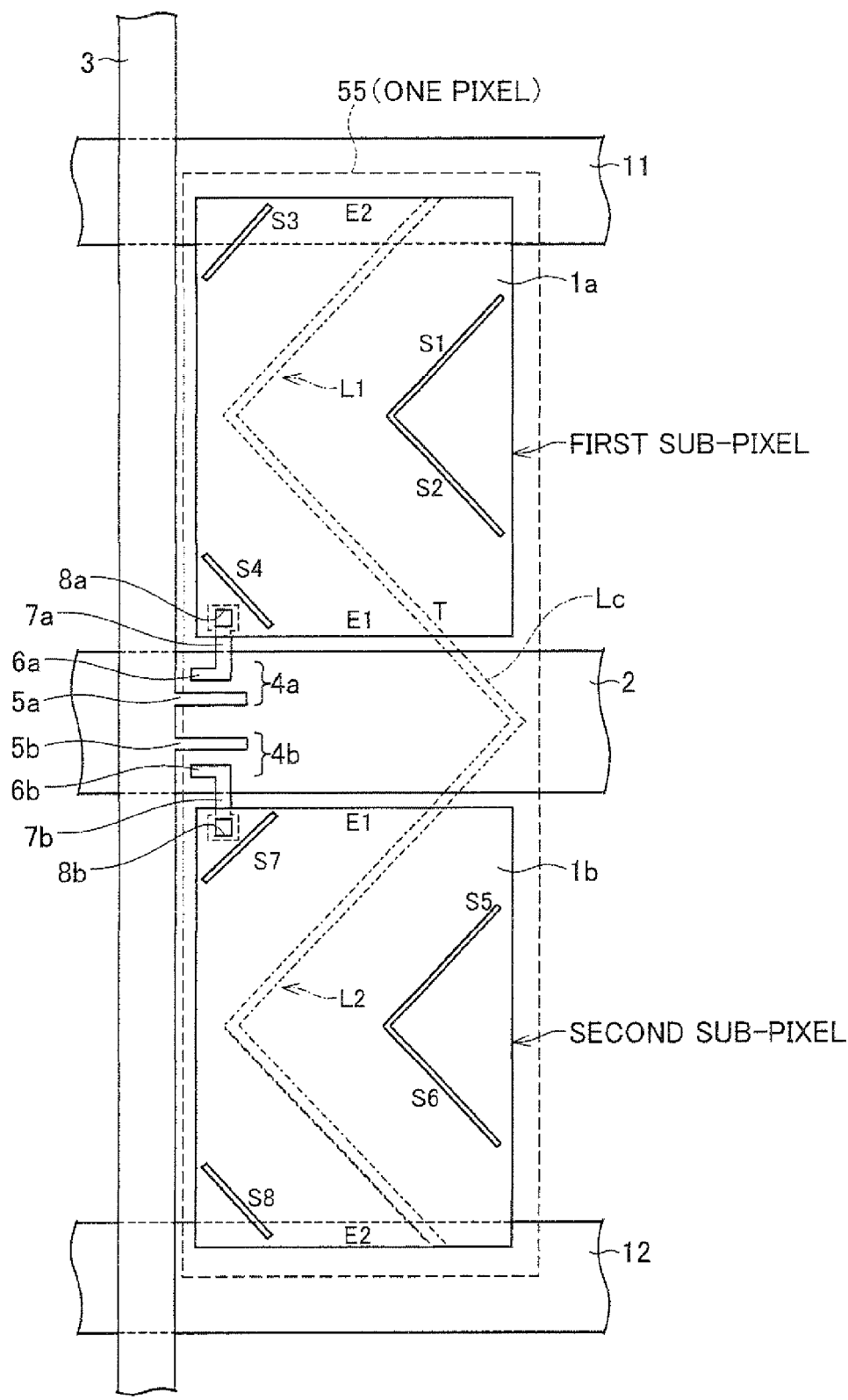
FIG. 38 is a plan view illustrating another arrangement (an arrangement including ribs in a zigzag pattern) of the liquid crystal panel of the present invention.

As shown in FIG. 38, the liquid crystal panel of FIG. 18 may also be configured such that a first rib L1 and a second rib L2 are connected by the rib Lc that is arranged to overlap with the scanning signal line 2. In this case, a zigzag rib is provided within one pixel.

Figure 39:
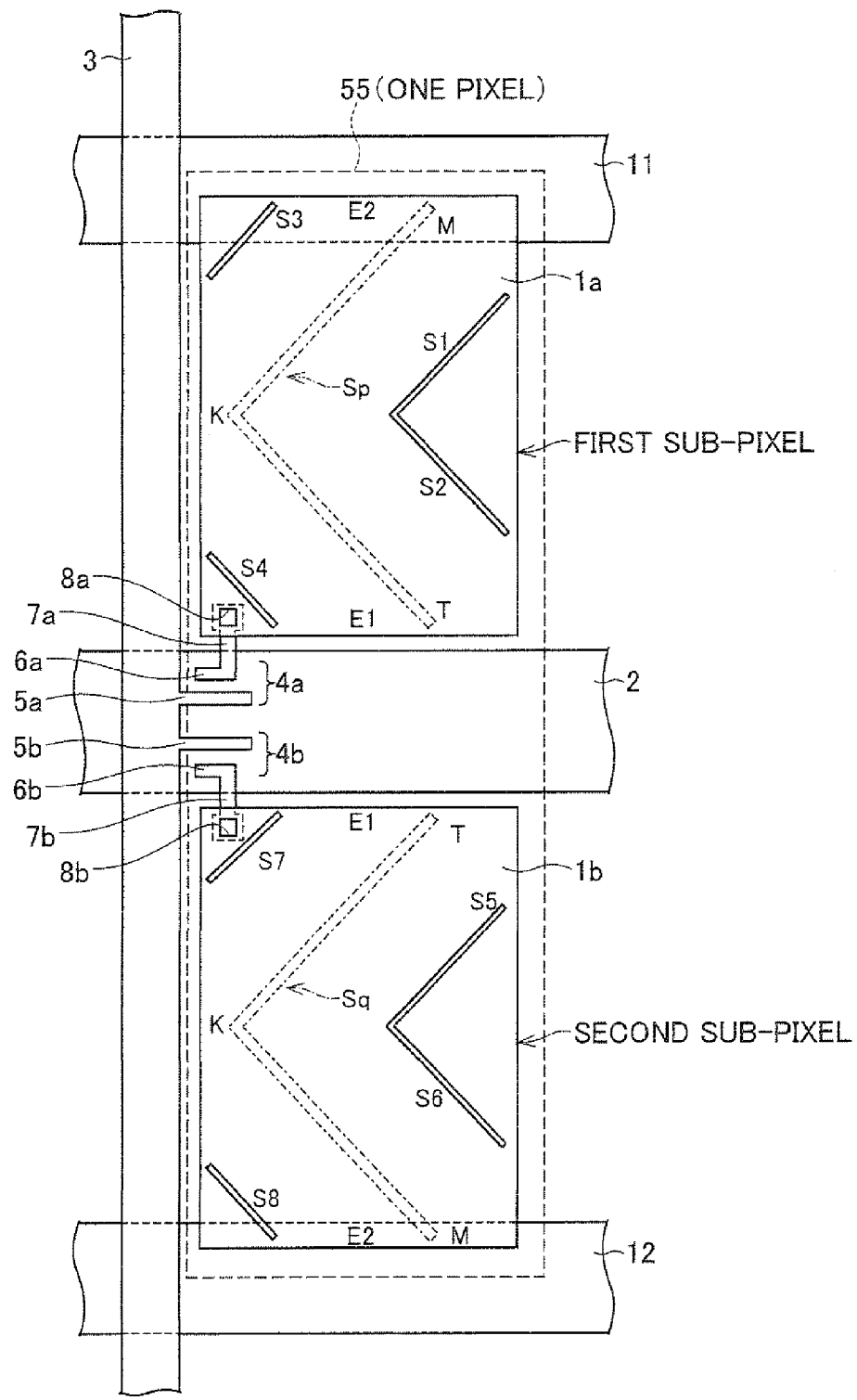
FIG. 39 is a plan view illustrating another arrangement (an arrangement including only slits as alignment control structures) of the liquid crystal panel of the present invention.
Figure 42:
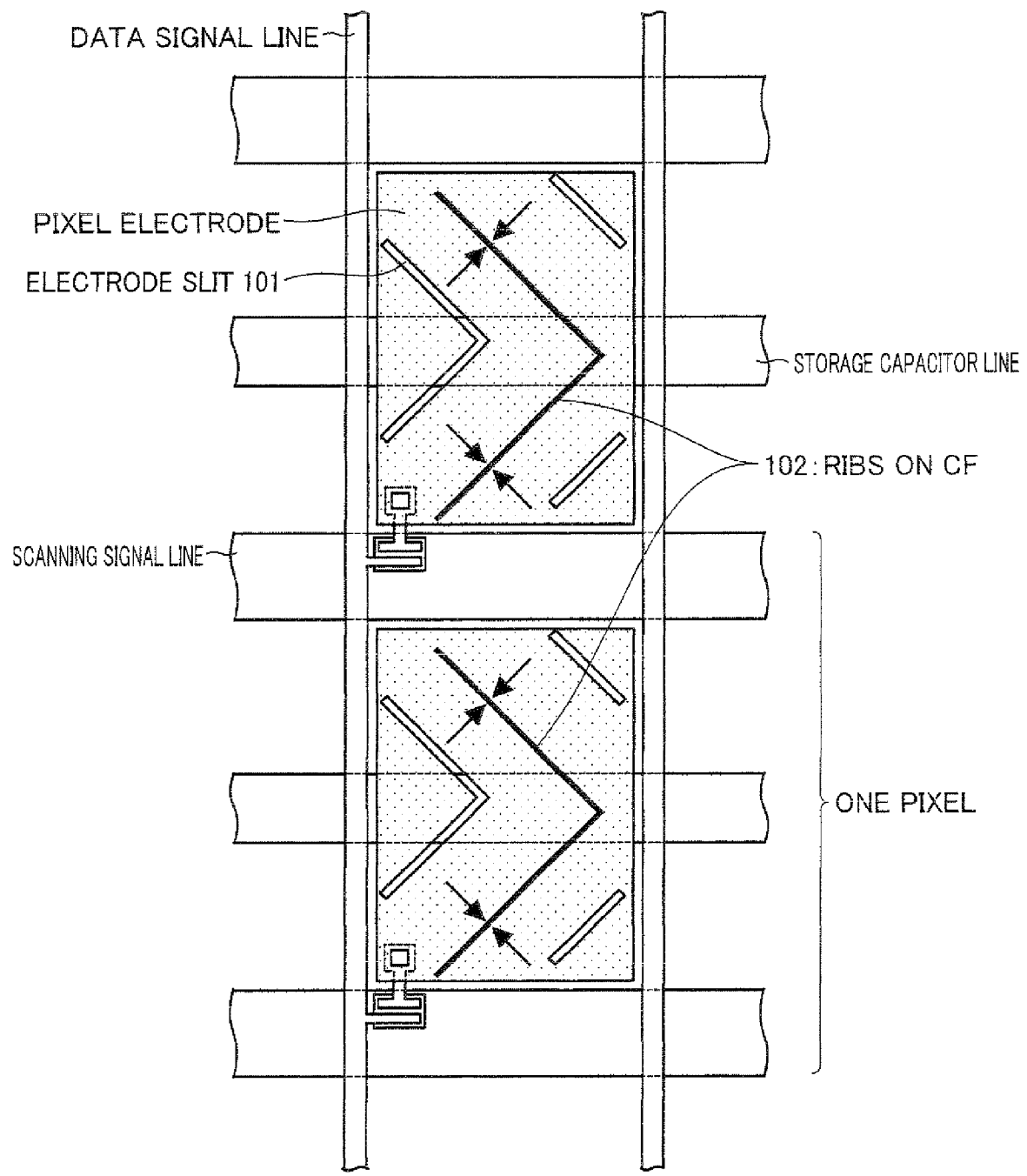
FIG. 42 illustrates a conventional liquid crystal display device and is a plan view showing an arrangement of an active matrix substrate.
Figure 43:
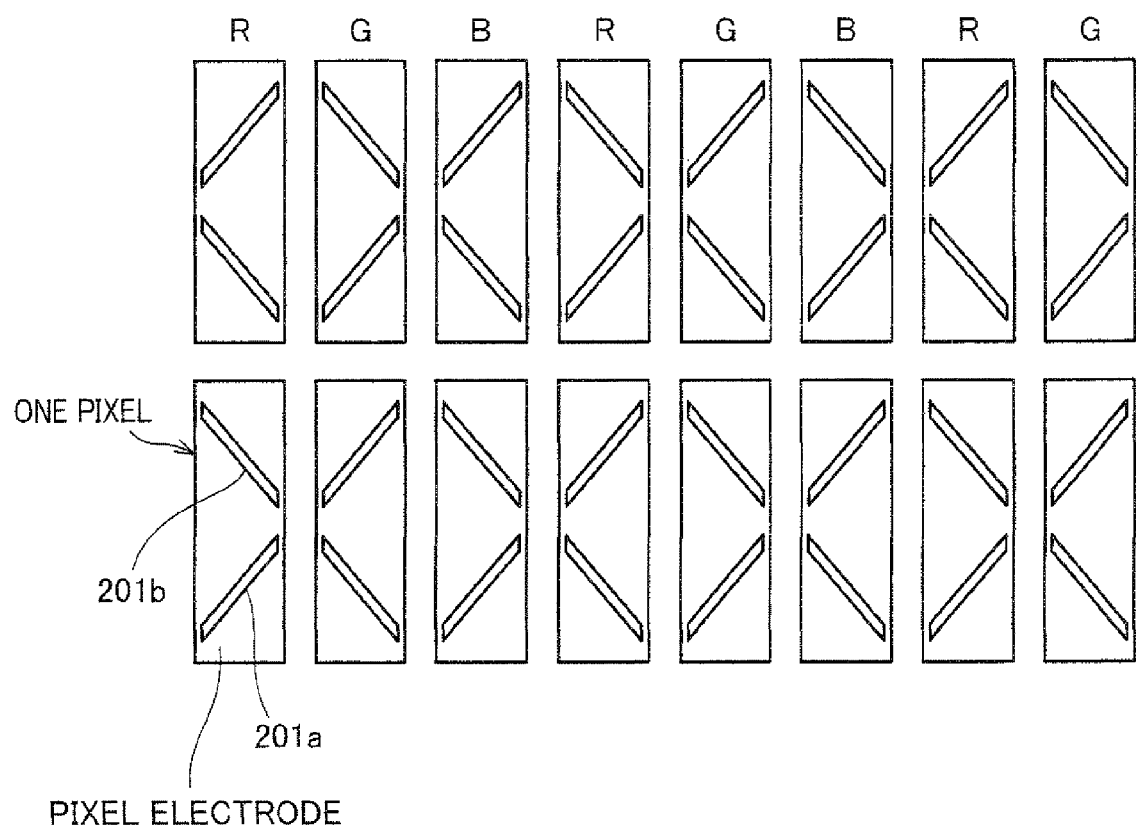
FIG. 43 illustrates another conventional liquid crystal display device and is a plan view showing an arrangement of an active matrix substrate.
Figure 44:
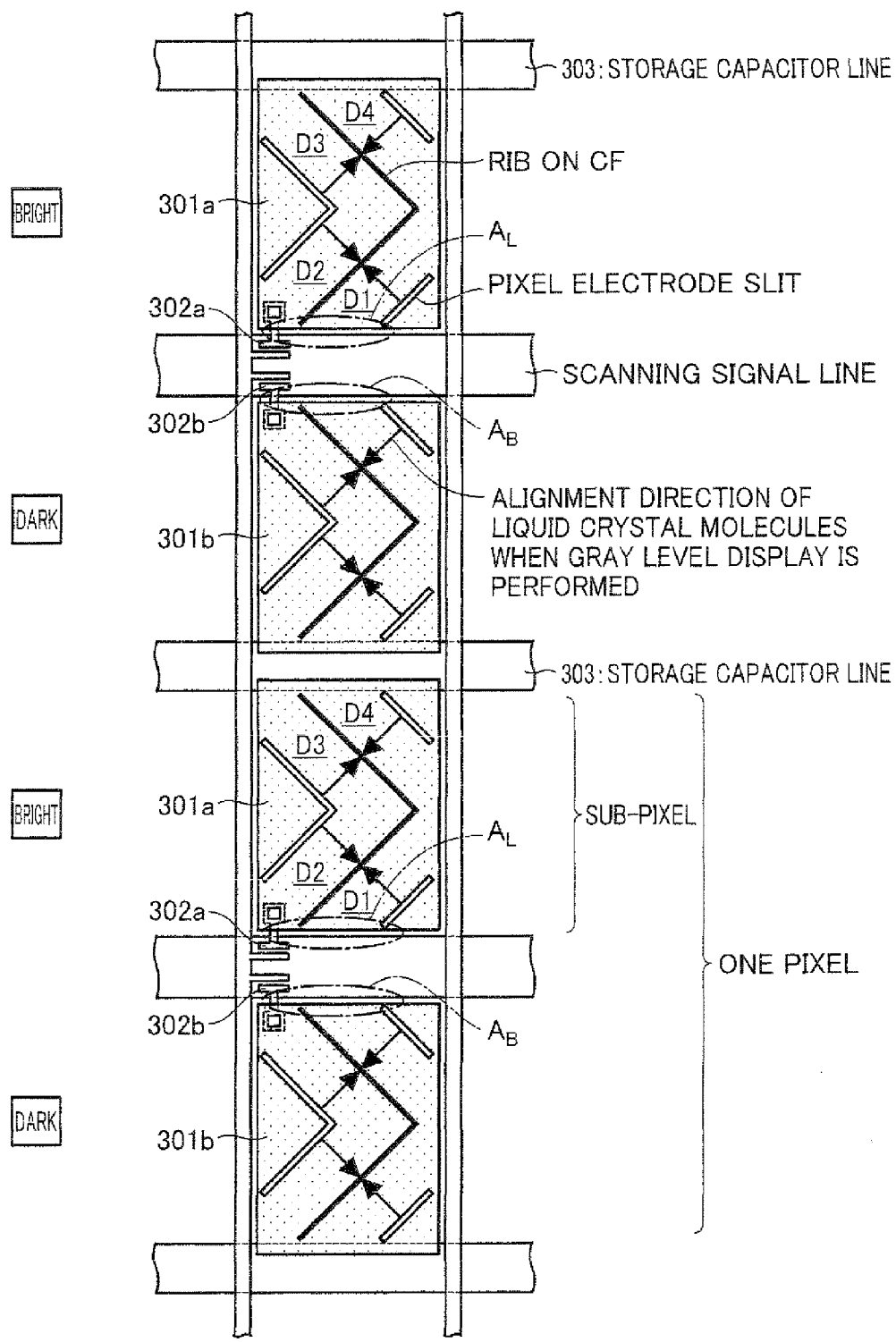
FIG. 44 illustrates still another conventional liquid crystal display device and is a plan view showing an arrangement of an active matrix substrate.

Alternatively, the liquid crystal panel may be configured as shown in FIG. 39. This configuration is the same as the configuration of FIG. 18, except that a first common electrode slit (a slit provided in the common electrode) Sp is provided in place of the first rib L1 in FIG. 18, and a second common electrode slit Sq is provided in place of the second rib L2 in FIG. 18. (a) and (b) of FIG. 41 are cross-sectional views each schematically showing a case where the liquid crystal panel configured as described above is provided in a liquid crystal display device. As shown in FIG. 41, liquid crystal molecules are upright at the time when black display is carried out (in a case where a voltage V between the active matrix substrate and the color filter substrate is 0), whereas, at the time when gray level display is carried out, the liquid crystal molecules are inclined in directions that are different in respective domains formed by (i) the first common electrode slit Sp and each slit S formed in the first pixel electrode 1a or (ii) the second common electrode slit Sq and each slit S formed in the second pixel electrode 1b (a dotted line in (b) of FIG. 41 shows an electric flux line). This forms four alignment domains in each of the first and second sub-pixels (as in FIG. 19).

Figure 22:
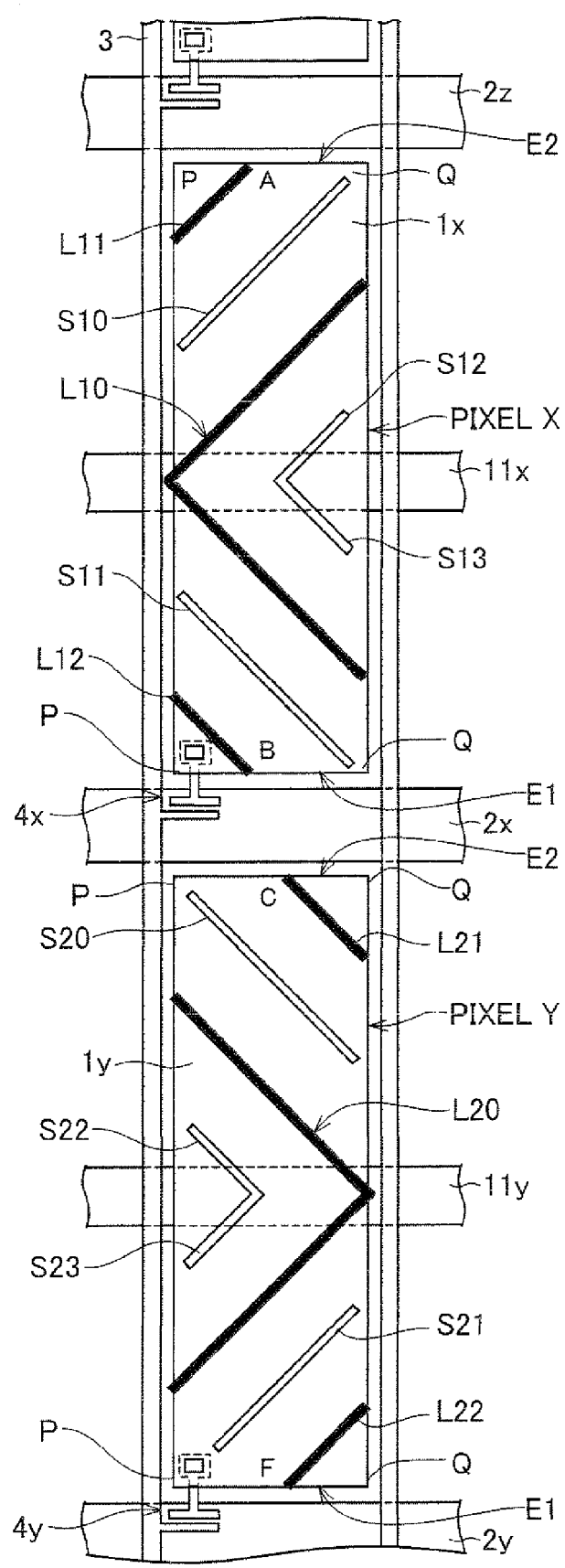
FIG. 22 is a plan view illustrating another arrangement (of two pixels) of the liquid crystal panel of the present invention.
Figure 23:
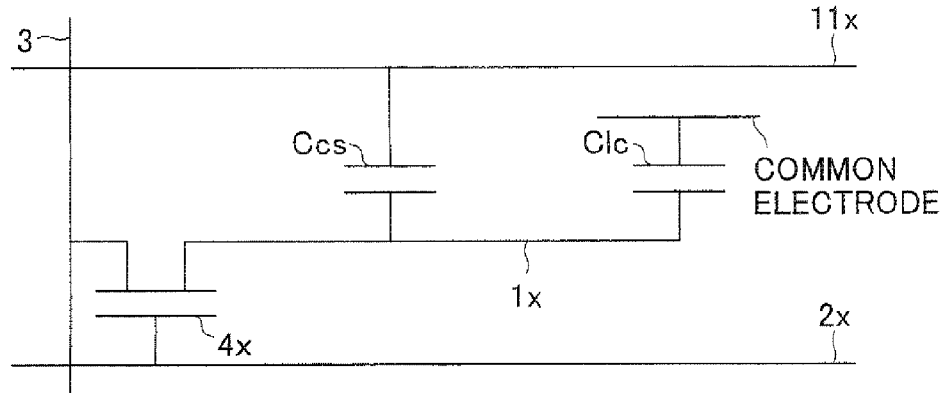
FIG. 23 is an equivalent circuit diagram of a part of the liquid crystal panel shown in FIG. 22.

The liquid crystal panel of the present embodiment may be configured as shown in FIG. 22. Note that the liquid crystal panel is of an MVA mode (not of a divided-pixel system) and includes an active matrix substrate, a liquid crystal layer, and a color filter substrate. However, FIG. 22 does not show the liquid crystal layer. As to the color filter substrate, FIG. 22 shows only the ribs. FIG. 23 shows an equivalent circuit of a part of FIG. 22.

In the liquid crystal panel, each pixel is configured so as to include each pixel area (not shown) of the active matrix substrate and a part of the color filter substrate corresponding to the pixel area. FIG. 22 shows two pixels X and Y adjacent to each other in a direction (a column direction) along the data signal line. The pixel X is provided with a pixel electrode 1x that overlaps with substantially a whole pixel area of the pixel X. The pixel X is further provided with an alignment control structure Fx that is formed from ribs L10 to L12 and slits (pixel slits) S10 to S13. Similarly, the pixel Y is provided with a pixel electrode 1y that overlaps with substantially a whole pixel area of the pixel Y. The pixel Y is further provided with an alignment control structure Fy that is formed from ribs L20 to 22 and slits (pixel slits) S20 to S23.

As shown in FIGS. 22 and 23, the pixel X is provided so as to be sandwiched between two scanning signal lines (2x and 2z), and includes an edge section E1 along the scanning signal line 2x and an edge section E2 along the scanning signal line 2z. The pixel electrode 1x is connected to a drain electrode of a transistor 4x which is provided in the vicinity of an intersection of the scanning signal line 2x and the data signal line 3. Note that a source electrode of the transistor 4x is connected to the data signal line 3 and the scanning signal line 2x also serves as a gate electrode of the transistor 4x. Further, a storage capacitor line 11x is provided so as to overlap with the pixel electrode 1x. A storage capacitor Ccs is formed in a section where the pixel electrode 1x and the storage capacitor line 11x overlaps. Furthermore, a pixel capacitor (Clc) is formed between the pixel electrode 1x and the common electrode (common counter electrode) of the color filter substrate.

In a part of the color filter substrate corresponding to the pixel X, a rib L10 is provided in a letter V shape when viewed in a row direction (left to right direction in FIG. 22) in the middle section of the pixel, and in addition, ribs L11 and L12 are provided. The rib L11 is parallel to one side section of the rib L10 having a letter V shape and overlaps with the edge section E2 of the pixel X. The rib L12 is parallel to the other side section of the rib L10 and overlaps with the edge section E1 of the pixel X. Note that an angle made of two side sections of the rib L10 is approximately 90 degrees. Further, the pixel electrode 1x is provided with a plurality of slits S10 to S13 which correspond to the ribs L10 to L12. In other words, the slit S10 is provided between the one side section of the rib L10 and the rib L11, and the one side section of the rib L10 is provided between the slit S10 and the slit S12. The slit S12, the one side section of the rib L10, the slit S10, and the rib L11 stretch in parallel to one another and are inclined (at approximately 45°) with respect to the scanning signal line 2z, and a part A of the rib L11 is positioned in an edge section (a section along the scanning signal line 2z) of the pixel X. Furthermore, the slit S11 is provided between the other side section of the rib L10 and the rib L12, and the other side section of the rib L10 is provided between the slit S11 and the slit S13. The slit S13, the other side section of the rib L10, the slit S11, and the rib L12 stretch in parallel to one another and are inclined (at approximately 135°) with respect to the scanning signal line 2x, and a part B of the rib L12 is positioned in an edge section (a section along the scanning signal line 2x) of the pixel X.

As shown in FIG. 22, the pixel Y is provided so as to be sandwiched between the two scanning signal lines (2x and 2y), and the pixel electrode 1y is connected to a drain electrode of a transistor 4y which is provided in the vicinity of the intersection of the scanning signal line 2y and the data signal line 3. Note that a source electrode of the transistor 4y is connected to the data signal line 3, and the scanning signal line 2y also serves as a gate electrode of the transistor 4y. Further, a storage capacitor line 11y is provided so as to overlap with the pixel electrode 1y, and a storage capacitor is formed in a section where the storage capacitor line 11y and the pixel electrode 1y overlap. Here, the ribs L20 to L22, the pixel electrode 1y, and the slits S20 to S23 of the pixel electrode 1y in the pixel Y are obtained by rotating by 180 degrees the ribs L10 to L12, the pixel electrode 1x, and the slits S10 to S13 of the pixel electrode 1x in the pixel X. Therefore, the slit S22, one side section of the rib L20, the slit S20, and the rib L21 stretch in parallel to one another and are inclined (at approximately 135°) with respect to the scanning signal line 2x, and a part C of the rib L21 is positioned in an edge section (a section along the scanning signal line 2x) of the pixel Y. Similarly, the slit S23, the other side section of the rib L20, the slit S21, and the rib L22 stretch in parallel to one another and are inclined (at approximately 45°) with respect to the scanning signal line 2x, and a part F of the rib L22 is positioned in an edge section (a section along the scanning signal line 2y) of the pixel Y.

Figure 24:
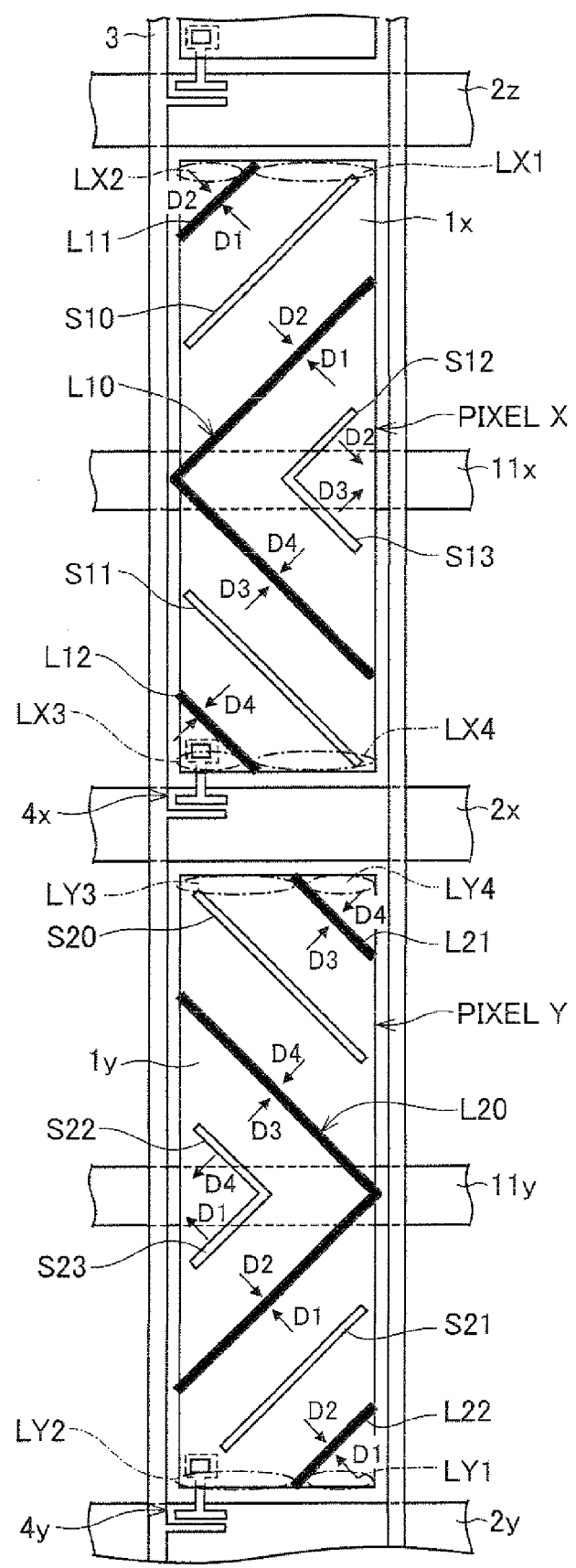
FIG. 24 is a plan view illustrating an alignment state of the liquid crystal display device of the present invention using the liquid crystal panel shown in FIG. 22.

As described above, by providing the pixel X with the alignment control structure Fx and providing the pixel Y with the alignment control structure Fy, the alignment domains D1 to D4 are formed, as shown in FIG. 24, in the liquid crystal display device using the liquid crystal panel. This makes it possible to achieve a wider viewing angle.

Here, it is known that the liquid crystal alignment is disordered in the vicinity of the scanning signal lines 2x to 2z (sections along the scanning signal lines) in the pixels. However, in the liquid crystal panel, respective disordered alignment sections of the alignment domains D1 to D4 in the pixel X are: LX1 in D1; LX2 in D2; LX3 in D3; and LX4 in D4, whereas respective disordered alignment sections of the alignment domains D1 to D4 in the pixel Y are: LY1 in D1; LY2 in D2; LY3 in D3; and LY4 in D4. This explains that the disordered alignment sections in each pixel are distributed to the alignment domains D1 to D4.

Further, in the liquid crystal panel, a shape of the alignment control structure Fy provided in the pixel Y that is one of pixels adjacent to each other in a column direction is a shape obtained by rotating by 180 degrees the alignment control structure Fx provided in the pixel X that is the other one of the pixels adjacent to each other. Therefore, when the two pixels (X and Y) adjacent to each other in a column direction are considered as one unit, respective disordered alignment sections in the alignment domains D1 to D4 included in the two pixels are: LX1+LY1 in D1; LX2+LY2 in D2; LX3+LY3 in D3; and LX4+LY4 in D4. The size of LX1≈the size of LX4≈the size of LY2≈the size of LY3, and the size of LX2≈the size of LX3≈the size of LY1≈the size of LY4. Therefore, LX1+LY1, LX2+LY2, LX3+LY3, and LX4+LY4 are substantially equal in size. This explains that dimensions of the respective disordered alignment areas (an influence of the disordered alignment that each alignment domain receives) of the alignment domains D1 to D4 are substantially equalized.

Note that: the size of LX1 can be approximated by a length between A and Q in FIG. 22; the size of LX2 can be approximated by a length between P and A in FIG. 22; the size of LX3 can be approximated by a length between P and B in FIG. 22; the size of LX 4 can be approximated by a length between B and Q in FIG. 22; the size of LY1 can be approximated by a length between F and Q in FIG. 22; the size of the LY2 can be approximated by a length between P and F in FIG. 22; the size of LY3 can be approximated by a length between P and C in FIG. 22; and the size of LY4 can be approximated by a length between C and Q in FIG. 22. The P and Q indicate both ends, respectively, that are of the pixel and along the scanning signal line. Each of sizes of LX1+LY1, LX2+LY2, LX3+LY3, and LX4+LY4 can be approximated by a length between P and Q.

As described above, the liquid crystal panel makes it possible to, in a one-pixel unit, distribute the influence of the disordered alignment caused by the scanning signal line to the alignment domains (D1 to D4). Moreover, it becomes possible to equalize, in a two-pixel unit in which two pixels are adjacent to each other in a column direction, the influence on the alignment domains (D1 to D4). This makes it possible to maintain, as far as possible, a balance of viewing angle characteristics intended at the time when the liquid crystal panel is designed. As a result, it becomes possible to obtain a liquid crystal display device whose viewing angle characteristics are excellent.

Figure 25:
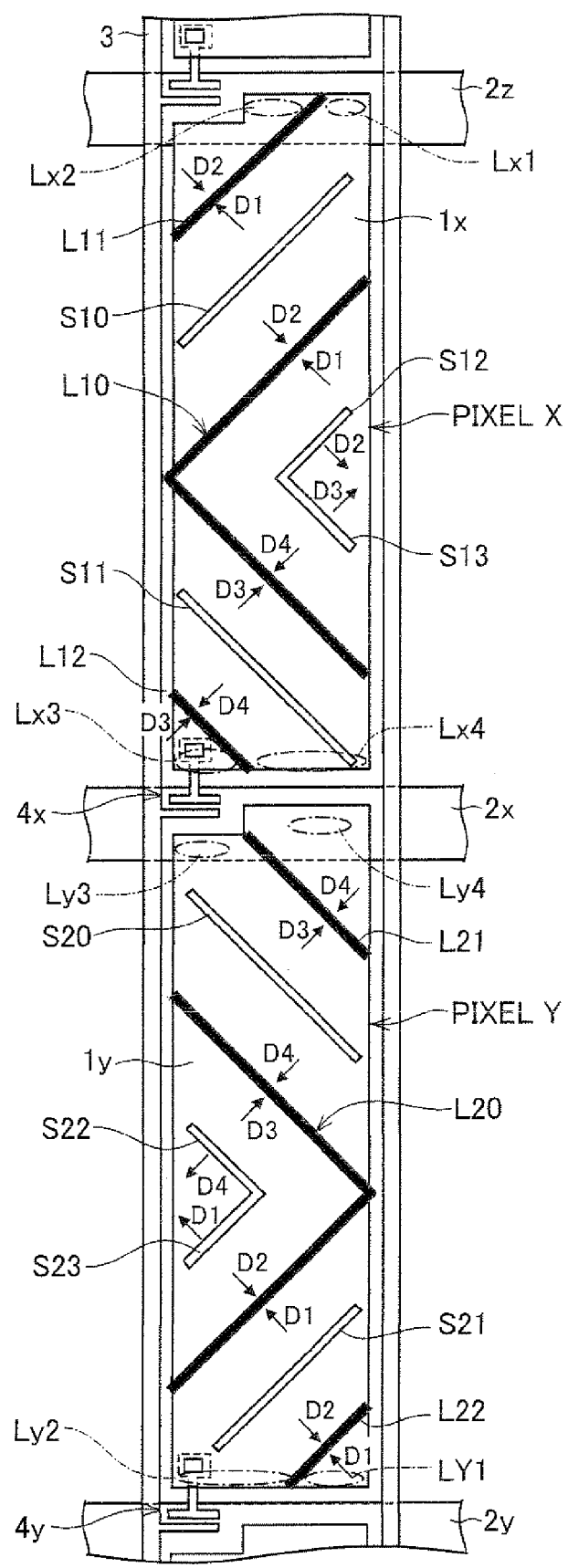
FIG. 25 is a plan view illustrating a modified example of the liquid crystal display device shown in FIG. 24.
Figure 26:
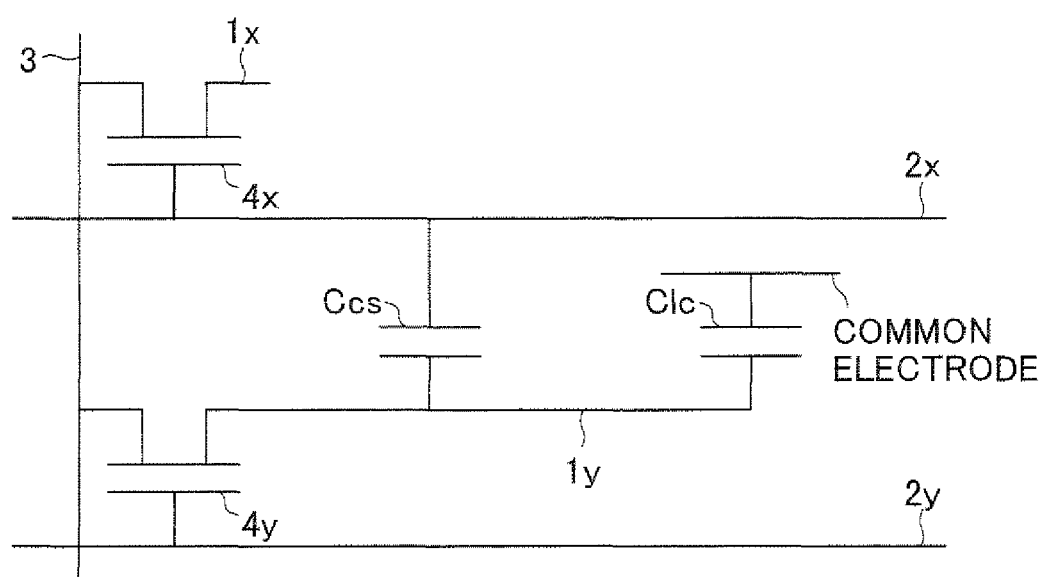
FIG. 26 is an equivalent circuit diagram of a part of the liquid crystal display device shown in FIG. 25.

The liquid crystal panel illustrated in FIG. 24 has a configuration in which each pixel is provided with a storage capacitor line (so-called Cs on Common). Alternatively, the liquid crystal panel may have a configuration of Cs on Gate as shown in FIG. 25. FIG. 26 shows an equivalent circuit of a part of FIG. 25. In other words, the pixel electrode 1y is connected to a drain electrode of a transistor 4y that is provided in the vicinity of an intersection of the scanning signal line 2 and the data signal 3. Here, an end section of the pixel electrode 1y is arranged to overlap with the scanning signal line 2x that drives the transistor 4x. As a result, the scanning signal line 2x functions as a storage capacitor line when a gate is turned off, and the storage capacitor Ccs is formed between the scanning signal line 2x and the pixel electrode 1y (see FIG. 26). In this Cs on Gate configuration, a storage capacitor line crossing the pixel becomes unnecessary. Therefore, an aperture ratio can be increased.

The liquid crystal panel shown in FIG. 25 also have a configuration in which respective disordered alignment sections in alignment domains D1 to D4 of a pixel X are: Lx1 in D1; Lx2 in D2; Lx3 in D3; and Lx4 in D4, whereas respective disordered alignment sections in alignment domains D1 to D4 in the pixel Y are: Ly1 in D1; Ly2 in D2; Ly3 in D3; and Ly4 in D4. This explains that the disordered alignment sections in each pixel are distributed to the alignment domains D1 to D4. Note that, because the edge sections of the pixels X and Y overlap with the scanning signal line, it becomes difficult that the alignments in the edge sections of the pixels X and Y are disordered by the scanning signal line. Therefore, Lx1, Lx2, Ly3, and Ly4 become small.

Furthermore, when two pixels (X and Y) adjacent to each other in a column direction are considered as one unit, respective disordered alignment sections in alignment domains D1 to D4 included in the two pixels are: Lx1+Ly1 in D1; Lx2+Ly2 in D2; Lx3+Ly3 in D3; and Lx4+Ly4 in D4. The size of Lx1≈the size of Lx4≈the size of Ly2≈the size of Ly3, and the size of Lx2≈the size of Lx3≈the size of Ly1≈the size of Ly4. Therefore, Lx1+Ly1, Lx2+Ly2, Lx3+Ly3, and Lx4+Ly4 are substantially equal in size. This explains that the respective disordered alignment areas of the alignment domains D1 to D4 (an influence of the disordered alignment that each alignment domain receives) are substantially equalized.

As described above, the liquid crystal panel makes it possible to, in a one-pixel unit, distribute, to the alignment domains (D1 to D4), the influence of the disordered alignment caused by the scanning signal line. Moreover, in a two-pixel unit in which two pixels are adjacent to each other in a column direction, the influence that the alignment domains (D1 to D4) receive is equalized. This makes it possible to maintain, as far as possible, a balance of viewing angle characteristics intended at the time when the liquid crystal display device is designed. As a result, it is possible to obtain a liquid crystal display device whose viewing angle characteristics are excellent.

Figure 27:
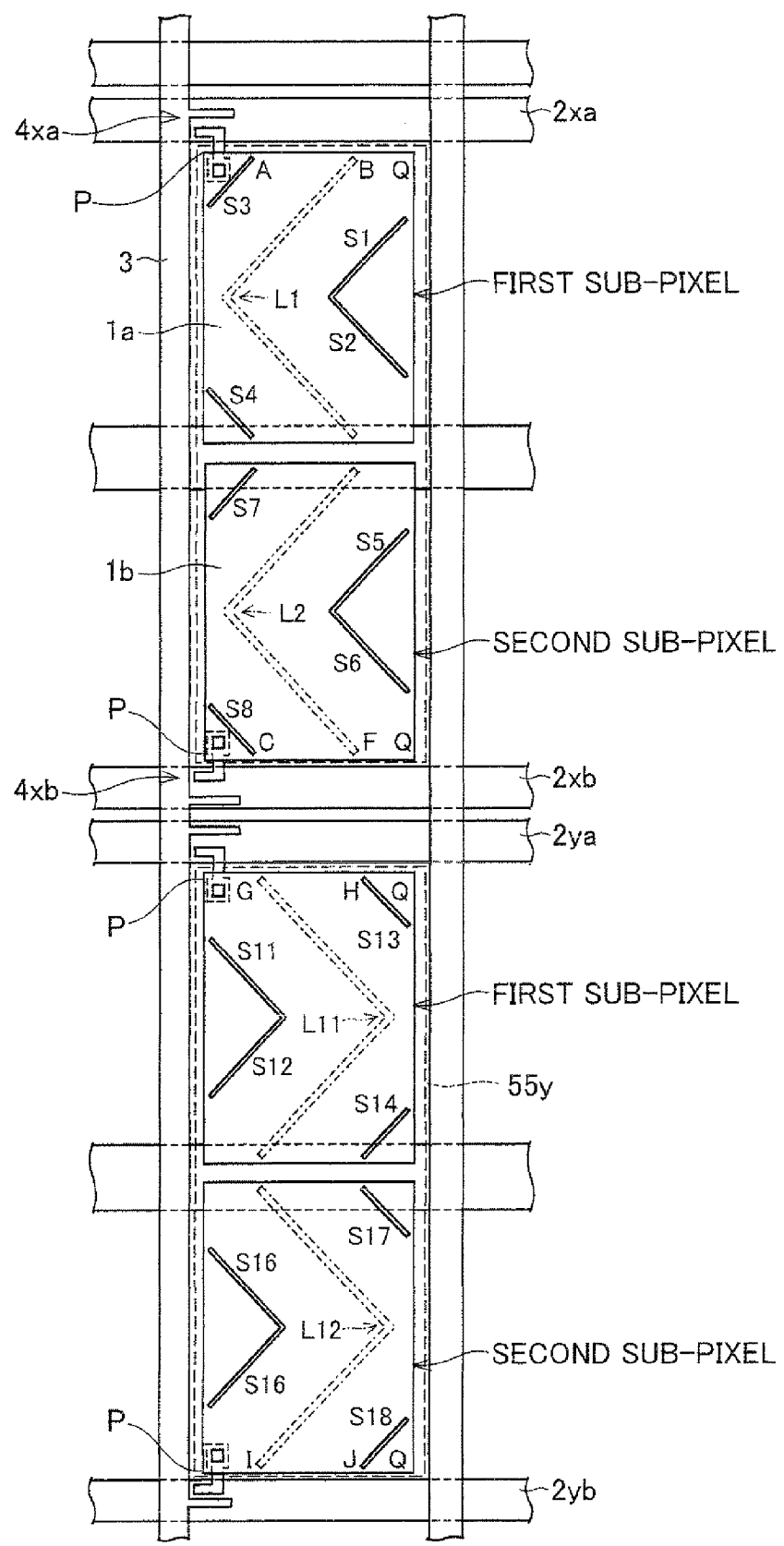
FIG. 27 is a plan view illustrating another arrangement (of two pixels) of the liquid crystal panel of the present invention.
Figure 28:
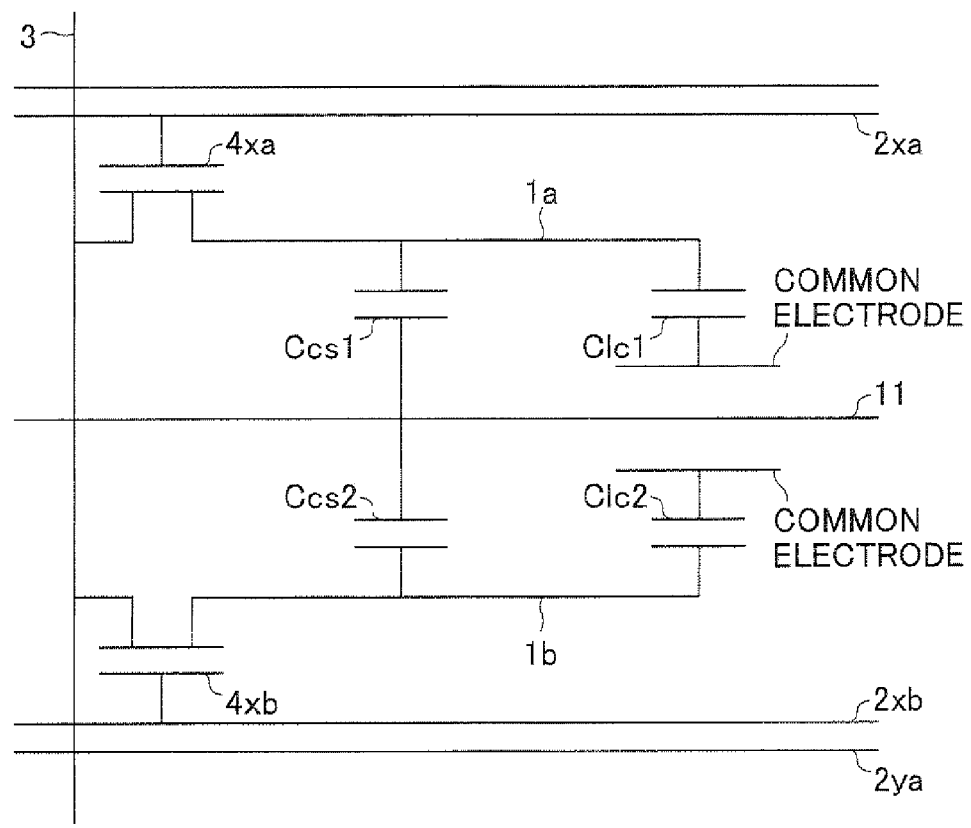
FIG. 28 is an equivalent circuit diagram of a part of the liquid crystal panel shown in FIG. 27.

The liquid crystal panel of the present embodiment may be configured as shown in FIG. 27. This liquid crystal panel employs an MVA mode of a divided-pixel system, and includes an active matrix substrate, a liquid crystal layer, and a color filter substrate. FIG. 27 does not show the liquid crystal layer. As to the color filter substrate, FIG. 27 shows only the ribs. FIG. 28 shows an equivalent circuit of a part of FIG. 27.

As shown in FIG. 27, each pixel area (not shown) of the active matrix substrate is provided with the first and second sub-pixel areas (not shown). The first sub-pixel is arranged to include the first sub-pixel area and a part of the color filter substrate corresponding to the first sub-pixel area, while the second sub-pixel is arranged to include the second sub-pixel area and a part of the counter substrate corresponding to the second sub-pixel area. The first sub-pixel is provided with the pixel electrode 1$a$ that overlaps with substantially a whole section of the first sub-pixel area, and is further provided with a first alignment control structure that is formed from a rib and slits (pixel electrode slits). Similarly, the second sub-pixel is provided with a second pixel electrode 1$b$ that overlaps with substantially a whole section of the second sub-pixel area, and is further provided with a second alignment control structure that is formed from a rib and slits (pixel electrode slits).

Figure 33:
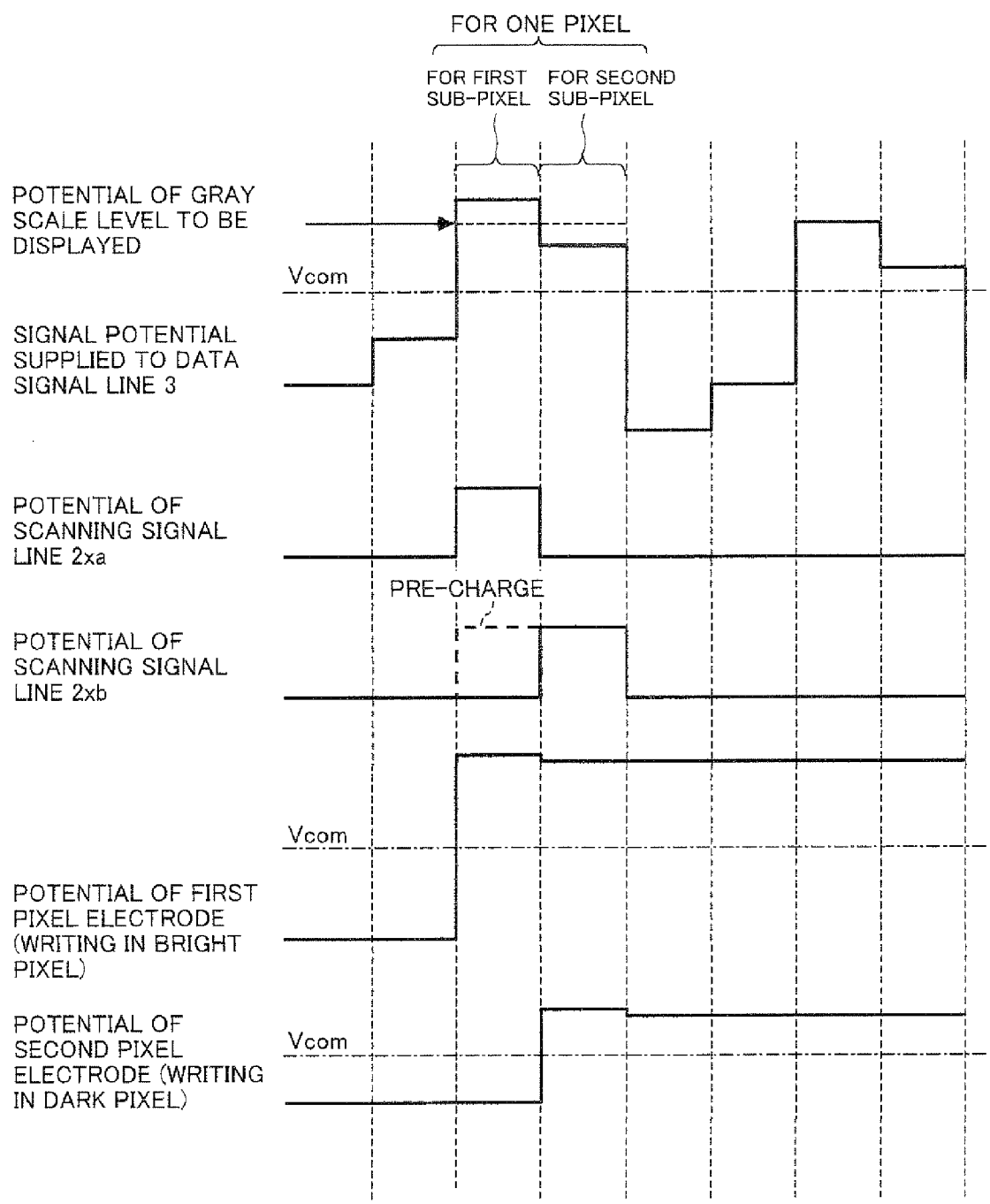
FIG. 33 is a timing chart illustrating a drive method of the liquid crystal display devices shown in FIGS. 29 and 32.

FIG. 27 shows the two pixels (pixels X and Y) that are adjacent to each other in a direction of the data signal line. For example, the pixel X is provided between scanning signal lines 2$xa$ and 2$xb$ that are provided so as to correspond to the pixel X. The first sub-pixel has an edge section along the scanning signal line 2$xa$ and another edge section opposed to the aforesaid edge section, while the second sub-pixel has an edge section along the scanning signal line 2$xb$ and another edge section opposed to the aforesaid edge section of the second sub-pixel. Here, as shown in FIGS. 27 and 28, the first pixel electrode 1$a$ is connected to a drain electrode of a transistor 4$xa$ which is provided in the vicinity of an intersection of the scanning signal line 2$xa$ and the data signal line 3, whereas the second pixel electrode 1$b$ is connected to a drain electrode of a transistor 4$xb$ which is provided in the vicinity of an intersection of the scanning signal line 2$xb$ and the data signal line 3. Note that a source electrode of the transistor 4$xa$ is connected to the data signal line 3, and the scanning signal line 2$xa$ also serves as a gate electrode of the transistor 4$xa$. Similarly, a source electrode of the transistor 4$xb$ is connected to the data signal line 3, and the scanning signal line 2$xb$ also serves as a gate electrode of the transistor 4$xb$. Further, a storage capacitor line 11 is provided so as to overlap with the first and second pixel electrodes 1$a$ and 1$b$, and each of first and second storage capacitors Ccs1 and Ccs2 are formed in a section where the storage capacitor line 11 and each of the first and second pixel electrodes 1$a$ and 1$b$ overlap. Note that a first sub-pixel capacitor (Clc1) is formed between the pixel electrode 1$a$ and a common electrode (common counter electrode) of the color filter substrate, and a second sub-pixel capacitor (Clc2) is formed between the pixel electrode 1$b$ and the common electrode (common counter electrode) of the color filter substrate. In a case where the liquid crystal panel is employed in a liquid crystal display device, the first and second pixel electrodes 1$a$ and 1$b$ are provided with different signal potentials at different timings (see FIG. 33). As a result, for example, the first sub-pixel can be a bright sub-pixel, and the second sub-pixel can be a dark sub-pixel. Note that in a drive of the scanning signal line 2$xb$ as shown in FIG. 33, a pre-charge period is provided. This pre-charge period overlaps with a timing of a write pulse of the scanning signal line 2$xa$. This pre-charge period is dispensable.

The ribs and the slits that are provided in the first and second sub-pixels of each of the pixels X and Y are the same as those shown in FIG. 20. In other words, a shape of the first alignment control structure, which is provided in the pixel 55$x$ that is one of the two pixels 55$x$ and 55$y$ adjacent to each other in a column direction, is a shape obtained by rotating by 180 degrees the first alignment control structure which is provided in the pixel 55$y$ that is the other one of the two pixels 55$x$ and 55$y$. Further, the shapes of the first and second alignment control structures in each pixel are substantially identical, and therefore the second alignment control structure provided in the pixel 55$x$ has a shape obtained by rotating by 180 degrees the second alignment control structure provided in the pixel 55$y$. Specifically, in the pixel 55$x$, one side section of the first rib L1 and the slit S3 stretch in parallel to each other and are inclined (at approximately 45°) with respect to the scanning signal line 2$xa$, and a part B of the one side section of the first rib L1 and a part A of the slit S3 are positioned in an edge section (a section along the scanning signal line 2$xa$) of the first sub-pixel. Moreover, one side section of the second rib L2 and the slit S8 stretch in parallel to each other and are inclined (at approximately 135°) with respect to the scanning signal line 2$xb$, and a part F of the one side section of the second rib L2 and a part C of the slit S8 are positioned in an edge section (a section along the scanning signal line 2$xb$) of the second sub-pixel. On the other hand, in the pixel 55$y$, one side section of the first rib L11 and the slit S13 stretch in parallel to each other and are inclined (at approximately 135°) with respect to the scanning signal line 2$ya$, and a part G of the one side section of the first rib L11 and a part H of the slit S13 are positioned in an edge section (a section along the scanning signal line 2$ya$) of the first sub-pixel. Moreover, one side section of the second rib L12 and the slit S18 stretch in parallel to each other and are inclined (at approximately 45°) with respect to the scanning signal line 2$xb$, and a part I of the one side section of the second rib L12 and a part J of the slit S18 are positioned in an edge section (a section along the scanning signal line 2$yb$) of the second sub-pixel.

Figure 29:
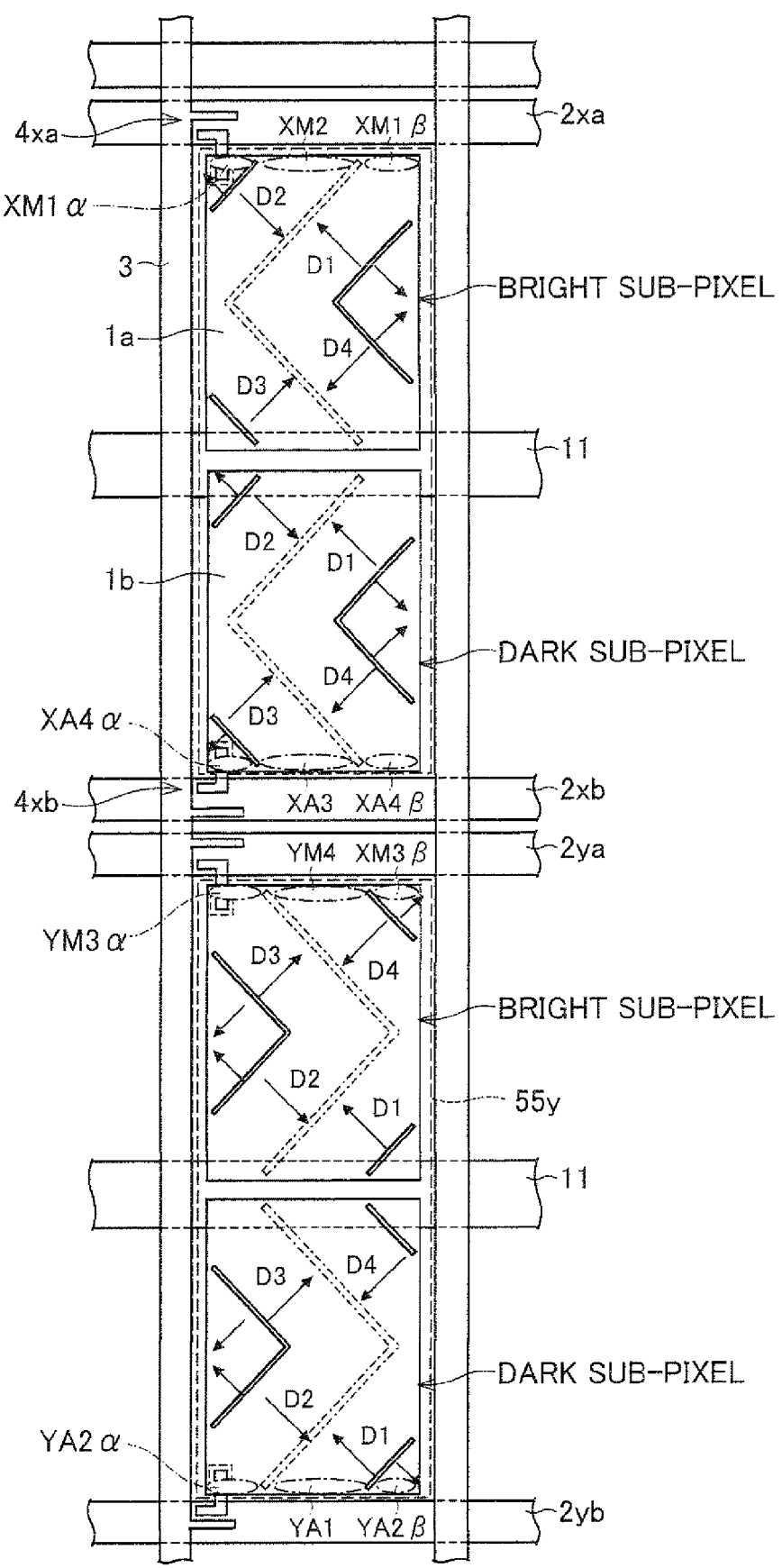
FIG. 29 is a plan view illustrating an alignment state of the liquid crystal display device of the present invention using the liquid crystal panel shown in FIG. 27.

FIG. 29 illustrates distribution of alignment domains D1 to D4 which are formed within the pixels 55$x$ and 55$y$ in a liquid crystal display device using the liquid crystal panel. Note that, in each of the pixels 55$x$ and 55$y$, a first sub-pixel corresponds to a bright sub-pixel and a second sub-pixel corresponds to a dark pixel.

Here, it is known that, in each pixel, liquid crystal alignment is disordered in the vicinity of scanning signal lines (2$xa$, 2$xb$, 2$ya$, and 2$yb$) (sections along the scanning signal lines). However, in the liquid crystal panel, in each of the pixels 55$x$ and 55$y$ adjacent to each other, respective disordered alignment sections in the alignment domains D1 to D4 of the bright sub-pixel in the pixel 55$x$ are: XM1α+XM1β in D1; XM2 in D2; 0(none) in D3; and 0(none) in D4. Respective disordered alignment sections in the alignment domains D1 to D4 of the dark sub-pixel in the pixel 55$x$ are: 0(none) in D1; 0(none) in D2; XA3 in D3; and XA4α+XA4β in D4. Respective disordered alignment sections in the alignment domains D1 to D4 of the bright sub-pixel in the pixel 55$y$ are: 0(none) D1; 0(none) in D2; YM3α+YM3β in D3; and YM4 in D4. Respective disordered alignment sections in the alignment domains D1 to D4 of the dark sub-pixel in the pixel 55$y$ are: YA1 in D1; YA2α+YA2β in D2; 0(none) in D3; and 0(none) in D4.

Therefore, when the two pixels (55$x$ and 55$y$) are assumed to be one unit, the respective disordered alignment sections in the alignment domains D1 to D4 included in the two bright sub-pixels are: XM1α+XM1β in D1; XM2 in D2; YM3α+YM3β in D3; and YM4 in D4. The respective disordered alignment sections in each of the alignment domains D1 to D4 included in the two dark sub-pixels are: YA1 in D1; YA2α+YA2β in D2; XA3 in D3; and XA4α+XA4β in D4.

As described above, it clear that, in the liquid crystal panel, the disordered alignment sections are produced in the two bright sub-pixels included in the pixels 55x and 55y adjacent to each other in the column direction. These disordered alignment sections are distributed to the alignment domains D1 to D4. Further, in the liquid crystal panel, the first and second alignment control structures in each pixel (55x and 55y) are arranged so that XM1α+XM1β, XM2, YM3α+YM3β, and XM4 are substantially equal in size. Accordingly, dimensions of respective disordered alignment areas (an influence of the disordered alignment that each alignment domain receives) in the alignment domains D1 to D4 become substantially equalized. Similarly, it is clear that the disordered alignment sections are produced in the two dark sub-pixels included in the pixels 55x and 55y adjacent to each other in the column direction. The respective disordered alignment sections are distributed to the alignment domains D1 to D4. Furthermore, in the liquid crystal panel, the first and second alignment control structures in each of the pixels (55x and 55y) are arranged so that YA1, YA2α+YA2β, XA3, and XA4α+XA4β, are substantially equal in size. Accordingly, dimensions of the respective disordered alignment areas (an influence of the disordered alignment that each alignment domain receives) in the alignment domains D1 to D4 are substantially equalized. The same applies to a case where positions of the bright sub-pixel and the dark sub-pixel are switched.

Note that: the size of XM1α can be approximated by a length between P and A in FIG. 27; the size of XM1β can be approximated by a length between B and Q in FIG. 27; the size of XM2 can be approximated by the length between A and B in FIG. 27; the size of YM3α can be approximated by the length between P and G in FIG. 27; the size of YM3β can be approximated by the length between H and Q in FIG. 27; and the size of YM4 can be approximated by the length between G and H in FIG. 27. Similarly, the size of YA1 can be approximated by the length between I and J in FIG. 27; the size of the YA2α can be approximated by the length between P and I in FIG. 27; the size of the YA2β can be approximated by the length between J and Q in FIG. 27; the size of the XA3 can be approximated by the length between C and F in FIG. 27; the size of the XA4α can be approximated by the length between P and C in FIG. 27; and the size of the XA4β can be approximated by the length between F and Q in FIG. 27. The P and Q indicate both ends, respectively, that are of the sub-pixel and along the scanning signal line.

As described above, the liquid crystal panel can evenly distribute, to the alignment domains (D1 to D4), the influence of the disordered alignment caused by the scanning signal lines (2xa, 2xb, 2ya, and 2yb). This makes it possible to maintain a balance of viewing angle characteristics intended at the time when the liquid crystal display device is designed. As a result, it becomes possible to obtain a liquid crystal display device whose viewing angle characteristics are excellent.

Figure 30:
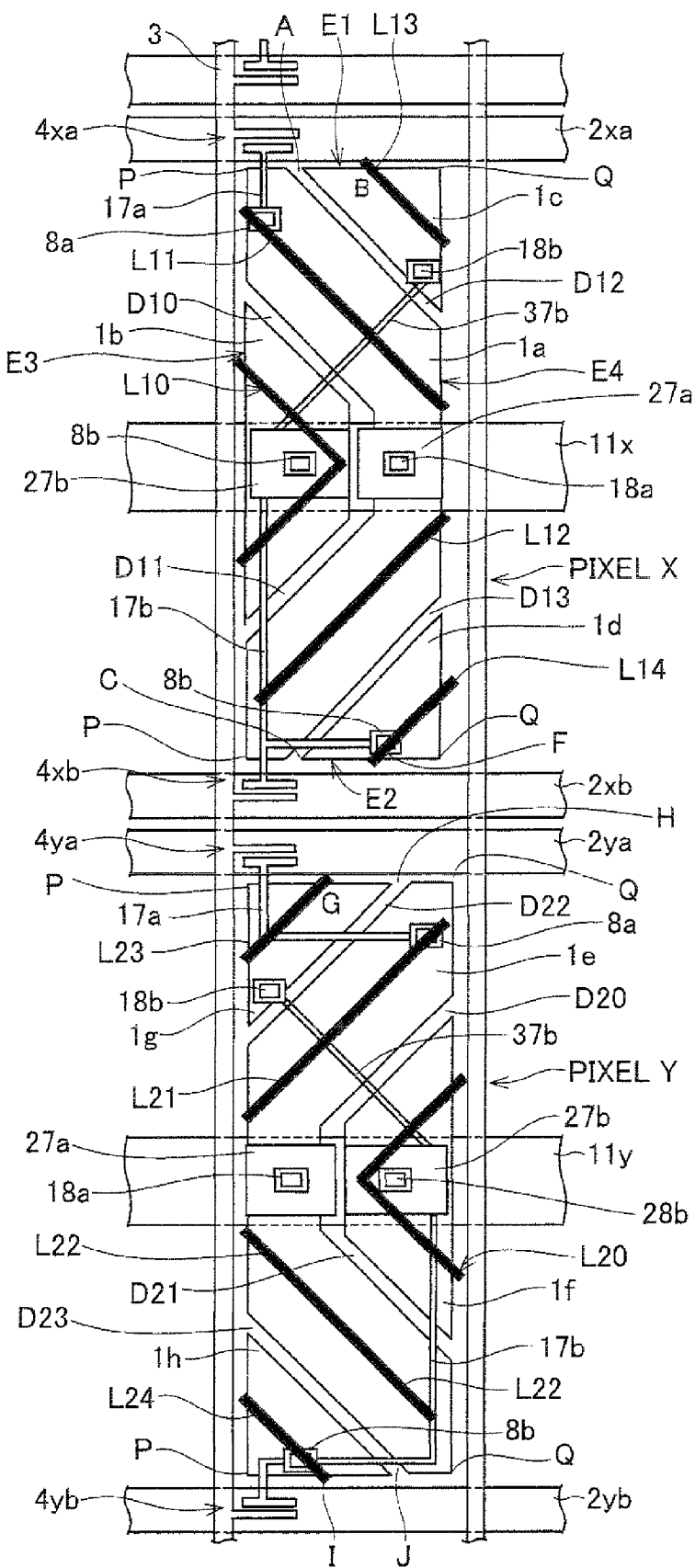
FIG. 30 is a plan view illustrating another arrangement (of two pixels) of the liquid crystal panel of the present invention.
Figure 31:
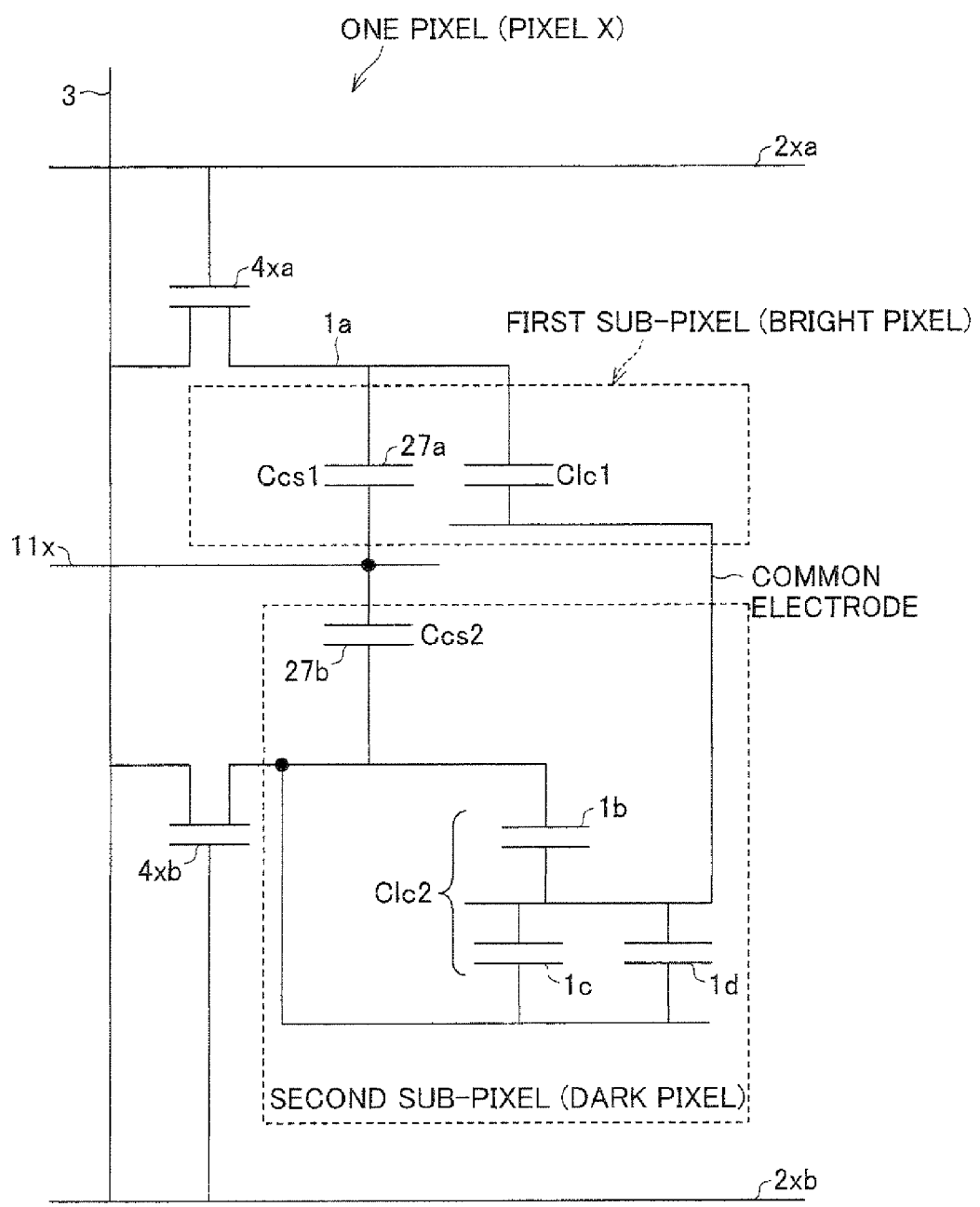
FIG. 31 is an equivalent circuit diagram of a part of the liquid crystal panel shown in FIG. 30.

The liquid crystal panel of the present embodiment may be arranged as shown in FIG. 30. Note that the liquid crystal panel employs an MVA mode of a divided-pixel system, and includes an active matrix substrate, a liquid crystal layer, and a color filter substrate. However, FIG. 30 does not show the liquid crystal layer. As to the color filter substrate, FIG. 30 shows only ribs. FIG. 31 shows an equivalent circuit of a part of FIG. 30.

In the liquid crystal panel, the pixel is configured so as to include each pixel area (not shown) of the active matrix substrate and a section of the color filter substrate corresponding to the pixel area. FIG. 30 shows two pixels (X and Y) adjacent to each other in a direction along a data signal line 3.

The pixel X is provided with first to fourth transparent electrodes (1a to 1d) that overlap with substantially a whole pixel area of the pixel X. The pixel X is further provided with an alignment control structure Fx that is formed from ribs L10 to L14 and gaps (slits) D10 to D13 between pixel electrodes. Similarly, the pixel Y is provided with first to fourth transparent electrodes (1e to 1h) that overlap with substantially a whole pixel area of the pixel Y. The pixel Y is further provided with an alignment control structure Fy that is formed from ribs L20 to L24 and gaps (slits) D20 to D23 between pixel electrodes.

As shown in FIGS. 30 and 31, the pixel X is provided between the two scanning signal lines 2xa and 2xb corresponding to the pixel X. The pixel X has edges E1 and E2 along the scanning signal lines and edges E3 and E4 along the data signal lines. The second transparent electrode 1b has a trapezoid shape that includes a part of the edge E3 (a section other than both ends) as a longitudinal side but does not include the other edges (E1, E2, and E4). The third transparent electrode 1c has a right triangle shape including an end section of the edge E1 and an end section of the edge E4. The fourth transparent electrode 1d has a right triangle shape including an end section of the edge E2 and an end section of the edge E4. The first transparent electrode 1a is provided in a section of the pixel area in which section the second to fourth transparent electrodes (1b to 1d) are not provided. The first transparent electrode 1a has a shape including a part of the edge E3 (both end sections), a part of the edge E4 (a section other than both ends), a part of E1 (an end section), and a part of E2 (an end section). Note that the first transparent electrode 1a is provided so that: the gaps D10 and D11 are formed between the first transparent electrode 1a and the second transparent electrode 1b; the gap D12 is formed between the first transparent electrode 1a and the third transparent electrode 1c; and the gap D13 is formed between the first transparent electrode 1a and the fourth transparent electrode 1d.

Here, as shown in FIGS. 30 and 31, the first transparent electrode 1a is connected to a drain electrode of a transistor 4xa which is provided in the vicinity of an intersection of the scanning signal line 2xa and the data signal line 3. The second to fourth transparent electrodes 1b to 1d are connected to a drain electrode of a transistor 4xb which is provided in the vicinity of an intersection of the scanning signal line 2xb and the data signal line 3. More specifically, the drain electrode of the transistor 4xa is connected to the first transparent electrode 1a via a drain extraction line 17a and a contact hole 8a. Moreover, the scanning signal line 2xa also serves as a gate electrode of the transistor 4xa. Further, the first transparent electrode 1a is connected to a drain extraction electrode 27a via a contact hole 18a. On the other hand, the drain electrode of the transistor 4xb is connected to the fourth transparent electrode 1d via a drain extraction line and a contact hole 8b. The drain electrode of the transistor 4xb is also connected to a drain extraction electrode 27b and the second transparent electrode 1b via a drain extraction line 17b and the contact hole 8b. Moreover, the scanning signal line 2xb also serves as a gate electrode of the transistor 4xb. Further, the drain extraction electrode 27b is connected to the third transparent electrode 1c via a drain extraction line 37b and a contact hole 18b. Note that a storage capacitor line 11x is provided so as to overlap with the drain extraction electrodes 27a and 27b. A first storage capacitor Ccs1 is formed between the drain extraction electrode 27a and the storage capacitor line 11x. A second storage capacitor Ccs2 is formed between the drain extraction electrode 27b and the storage capacitor line 11x. Moreover, a first sub-pixel capacitor (Clc1) is formed between the first transparent electrode 1*a* and a common electrode (common counter electrode) of the color filter substrate, while a second sub-pixel capacitor (Clc2) is formed between the second to fourth transparent electrodes (1*b* to 1*d*) and the common electrode (common counter electrode) of the color filter substrate. In a case where the liquid crystal panel is used for a liquid crystal display device, each of the first transparent electrode 1*a* and a set of the second to fourth transparent electrodes (1*b* and 1*d*) is supplied with a different signal potential at a different timing (see FIG. 33). This makes it possible to, for example, arrange such that the first sub-pixel including the first transparent electrode 1*a* becomes a bright sub-pixel and the second sub-pixel including the second to fourth transparent electrodes (1*b* to 1*d*) becomes a dark sub-pixel.

Moreover, in a section of the color filter substrate corresponding to the pixel X, the ribs L10, L13, and L11 are provided. The rib L10 that has a letter V shape when viewed in a row direction (right to left direction in FIG. 30) is provided in a middle section of the pixel so as to overlap with the second transparent electrode 1*b*. The rib L13 is parallel to one side section of the rib L10 having a letter V shape and overlaps with the third transparent electrode 1*c*. The rib L11 is sandwiched between the one side section of the rib L10 and the rib L13 and parallel to the rib L13. The rib L11 also overlaps with the first transparent electrode 1*a*. Note that an angle made of two side sections of the rib L10 is approximately 90°. Further, the pixel X is provided with the ribs L14 and L12. The rib L14 is parallel to the other side section of the rib L10 having a letter V shape and overlaps with the fourth transparent electrode 1*d*. The rib L12 is sandwiched between the other side section of the rib L10 and the rib L14 and parallel to the rib L14. The rib L12 also overlaps with the first transparent electrode 1*a*. In this arrangement, the one side section of the rib L10, the gap D10, the rib L11, the gap D12, and the rib L13 stretch in parallel to one another and are inclined (at 135°) with respect to the scanning signal line 2*xa*. A part A of the gap D12 and a part B of the rib L13 are positioned in an edge section (a section along the scanning signal line 2*xa*) of the pixel X. Furthermore, the other side section of the rib L10, the gap D11, the rib L12, the gap D13, and the rib L14 stretch in parallel to one another and are inclined (at 45°) with respect to the scanning signal line 2*xb*. A part C of the gap D13 and a part F of the rib L14 are positioned in an edge section (a section along the scanning signal line 2*xb*) of the pixel X.

The pixel Y is provided with first to fourth transparent electrodes 1*e* to 1*h* and ribs L20 to L24. The first transparent electrode 1*e* is connected to a drain electrode of a transistor 4*ya* which is provided in the vicinity of an intersection of a scanning signal line 2*ya* and the data signal line 3. The second to fourth transparent electrodes 1*f* to 1*h* are connected to a drain electrode of a transistor 4*yb* which is provided in the vicinity of an intersection of a scanning signal line 2*yb* and the data signal line 3. Here, the first to fourth transparent electrodes 1*e* to 1*h* and the ribs L20 to L24 of the pixel Y are obtained by rotating by 180° the first to fourth transparent electrodes (1*a* to 1*d*) and the ribs L10 to L14 of the pixel X. The first to fourth transparent electrodes 1*e* to 1*h* correspond to the first to fourth transparent electrodes 1*a* to 1*d*. The ribs L20 to L24 correspond to the ribs L10 to L14. The gaps D20 to D23 correspond the gaps D10 to D13. Therefore, in a part of the color filter substrate corresponding to the pixel Y, the rib L20 having a letter V shape when viewed in a row direction (left to right direction in the FIG. 30) is provided in the middle section of the pixel so as to overlap with the second transparent electrode 1*f*.

According to this arrangement, in the pixel Y, one side section of the rib L20, the gap D20, the rib L21, the gap D22, and the rib L23 stretch in parallel to one another and are inclined (at 45°) with respect to the scanning signal line 2*ya*. A part H of the gap D22 and a part G of the rib L23 are positioned in an edge section (a section along the scanning signal line 2*ya*) of the pixel Y. Furthermore, the other side of the rib L20, the gap D21, the rib L22, the gap D23, and the rib L24 stretch in parallel to one another and are inclined (at 135°) with respect to the scanning signal line 2*yb*. A part J of the gap D23 and a part I of the rib L24 are positioned in an edge section (a section along the scanning signal line 2*yb*) of the pixel Y.

Figure 32:
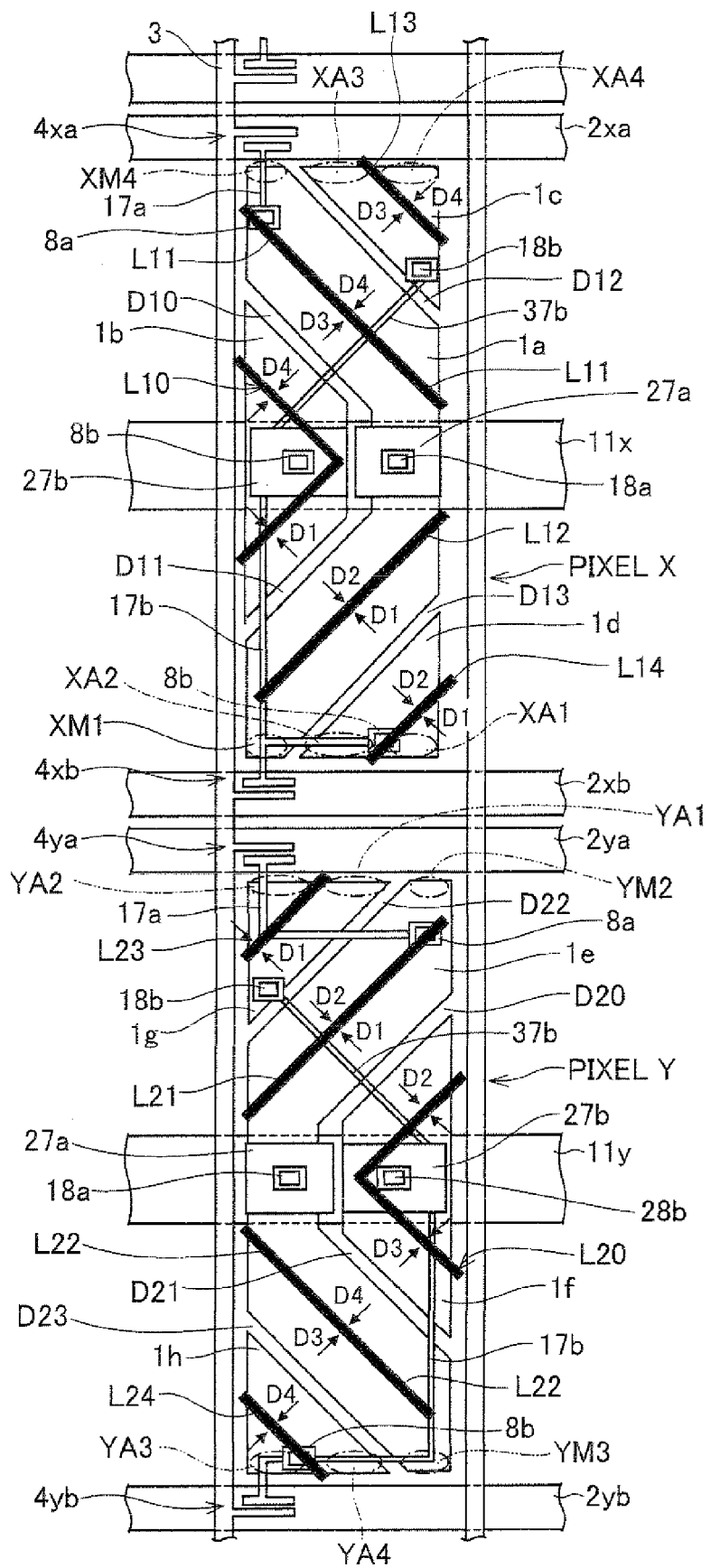
FIG. 32 is a plan view illustrating an alignment state of the liquid crystal display device of the present invention using the liquid crystal panel shown in FIG. 30.

As described above, the pixel X is provided with the alignment control structure Fx and the pixel Y is provided with the alignment control structure Fy. Consequently, as shown in FIG. 32, the alignment domains D1 to D4 are formed in a liquid crystal display device using the liquid crystal panel. This makes it possible to achieve a wider viewing angle of the liquid crystal display device. Note that, in each of the pixels X and Y, the first sub-pixel including the first transparent electrode 1*a* corresponds to a bright sub-pixel and the second sub-pixel including the second to fourth transparent electrodes (1*b* to 1*d*) corresponds to a dark sub-pixel.

Here, in each of the pixels, it is known that the liquid crystal alignment is disordered in sections along the scanning signal lines (2*xa*, 2*xb*, 2*ya*, and 2*yb*). In the liquid crystal panel, however, in the two pixels X and Y adjacent to each other, respective disordered alignment sections of the alignment domains D1 to D4 of the bright sub-pixel in the pixel X are: XM1 in D1; 0(none) in D2; 0(none) in D3; and XM4 in D4, whereas respective disordered alignment sections of the alignment domains D1 to D4 of the bright sub-pixel in the pixel Y are: 0(none) in D1; YM2 in D2; YM3 in D3; and 0(none) in D4. It is clear that, when the two pixels (X and Y) are assumed to be one unit, the respective disordered alignment sections of the alignment sections D1 to D4 included in two bright sub-pixels are: XM1 in D1; XM2 in D2; YM3 in D3; and YM4 in D4. Accordingly, disordered alignment sections that are formed in the two bright sub-pixels of the two pixels X and Y are distributed to the alignment domains D1 to D4. Further, in the liquid crystal panel, the first and second alignment control structures in each of the pixels are arranged so that XM1, XM2, YM3, and YM4 become substantially equal in size. Accordingly, dimensions of respective disordered alignment areas (an influence of the disordered alignment that each alignment domain receives) in the alignment domains D1 to D4 are substantially equalized.

Moreover, in the two pixels X and Y, respective disordered alignment sections in the alignment domains D1 to D4 of the dark sub-pixel in the pixel X are: XA1 in D1; XA2 in D2; XA3 in D3; and XA4 in D4. Respective disordered alignment areas in the alignment domains D1 to D4 of the dark sub-pixel in the pixel Y are: YA1 in D1; YA2 in D2; YA3 in D3; and YA4 in D4. It is clear that the disordered alignment sections in each of the pixels are distributed to the alignment domains D1 to D4. Furthermore, when the two pixels (X and Y) are assumed to be one unit, respective disordered alignment sections in the alignment domains D1 to D4 in the two pixels are: XA1+YA1 in D1; XA2+YA2 in D2; XA3+YA3 in D3; and XA4+YA4 in D4. Accordingly, XA1+YA1≈XA2+YA2≈XA3+YA3≈XA4+YA4. From this, it is clear that dimensions of respective disordered alignment areas (an influence of the disordered alignment that each alignment domain receives) in the alignment domains D1 to D4 are substantially equalized. That is, in the dark sub-pixel of a one-pixel unit, the influence of the disordered alignment caused by the scanning signal line is distributed to the alignment domains (D1 to D4). Moreover, in the dark sub-pixels of a two-pixel unit in which two pixels are adjacent to each other in a column direction, the influence that each alignment domain (D1 to D4) receives is equalized.

Note that: the size of XM4 can be approximated by a length between P and A in FIG. 30; the size of XA3 can be approximated by a length between A and B in FIG. 30; the size of XA4 can be approximated by the length between B and Q in FIG. 30; the size of XM1 can be approximated by the length between P and C in FIG. 30; the size of XA2 can be approximated by the length between C and F in FIG. 30; and the size of XA1 can be approximated by the length between F and Q in FIG. 30. Similarly, the size of YA2 can be approximated by the length between P and G in FIG. 30; the size of YA1 can be approximated by the length between G and H in FIG. 30; the size of YM2 can be approximated by the length between H and Q in FIG. 30; the size of YA3 can be approximated by the length between P and I in FIG. 30; the size of YA4 can be approximated by the length between I and J in FIG. 30; and the size of YM3 can be approximated by the length between J and Q in FIG. 30. The P and Q indicate both ends, respectively, which are of the sub-pixel and along the scanning signal line.

As described above, according to the liquid crystal panel, the influence of the disordered alignment caused by the scanning signal lines ($2xa$, $2xb$, $2ya$, and $2yb$) can be evenly distributed to the alignment domains (D1 to D4). This makes it possible to maintain a balance of viewing angle characteristics intended at the time when the liquid crystal display device is designed. As a result, it is possible to obtain a liquid crystal display device whose viewing angle characteristics are excellent.

Figure 34:
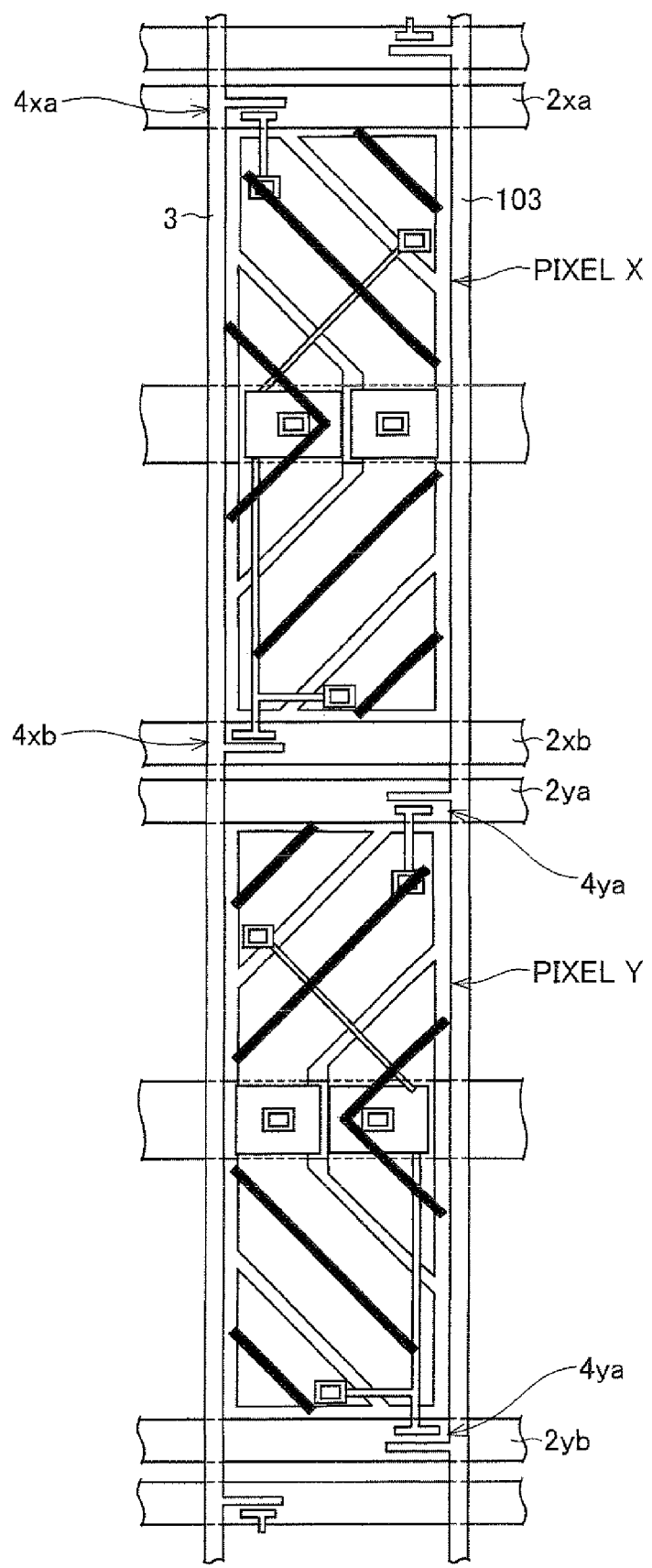
FIG. 34 is a plan view illustrating a modified example of the liquid crystal panel shown in FIG. 30.

Note that the liquid crystal panel shown in FIG. 29 may be arranged as in FIG. 34. That is, each of pixels aligned adjacent to each other in a column direction is sandwiched by two data signal lines, and each one of the pixels is connected to different data signal lines, respectively (staggered connection). For example, in two pixels (X and Y) adjacent to each other in a column direction, two transistors $4xa$ and $4xb$ for driving the pixel X are connected to a data signal line 3, and two transistors $4ya$ and $4yb$ for driving the pixel Y are connected to a data signal line 103 (adjacent to the data signal line 3). According to this arrangement, a dot-inversion drive of the pixels can be carried out, while a V (source) line inversion drive of the data signal lines are carried out. This makes it possible to reduce power consumption and heat generation in driving the data signal lines. Moreover, a drain extraction line of each of the transistors can be shortened, and also an aperture ratio can be improved.

Figure 35:
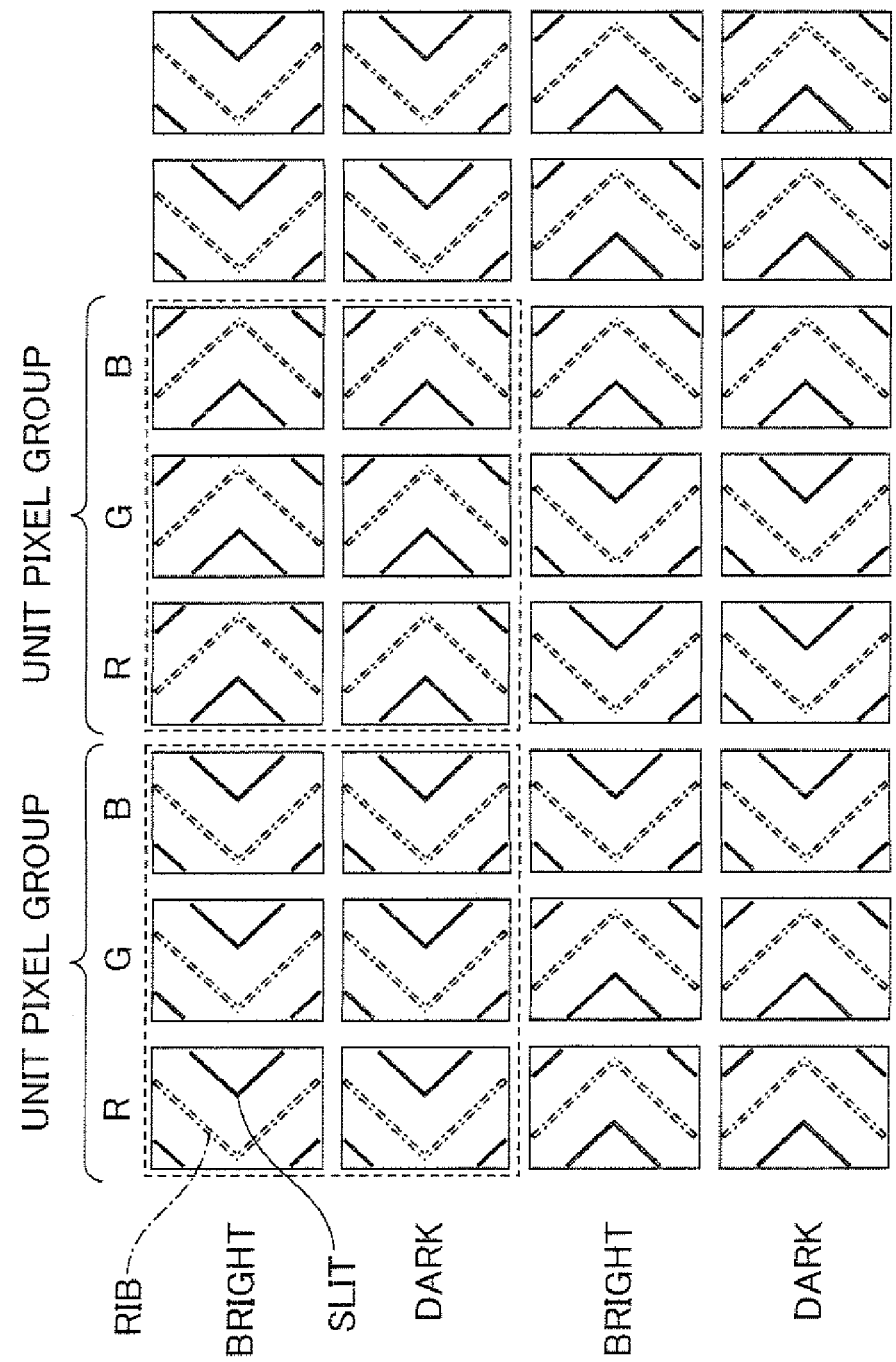
FIG. 35 is a plan view illustrating another arrangement of the liquid crystal panel of the present invention.

Moreover, the liquid crystal panel may be arranged as shown in FIG. 35. That is, when three pixels that correspond to red (R), green (G), and blue (B), respectively, and are aligned in a row direction are assumed to be one pixel group, ribs and slits in one of two pixels of the same color included in two pixel groups adjacent to each other in the row direction have shapes obtained by rotating by 180° ribs and slits provided in the other one of the two pixels. According to this configuration, in a liquid crystal display device using the liquid crystal panel, when a unit including the same color pixels (two pixels) is considered, influence of the disordered alignment areas along scanning signal lines is distributed to alignment domains. This prevents the occurrence of significant difference in viewing angle characteristics in each direction.

Figure 36:
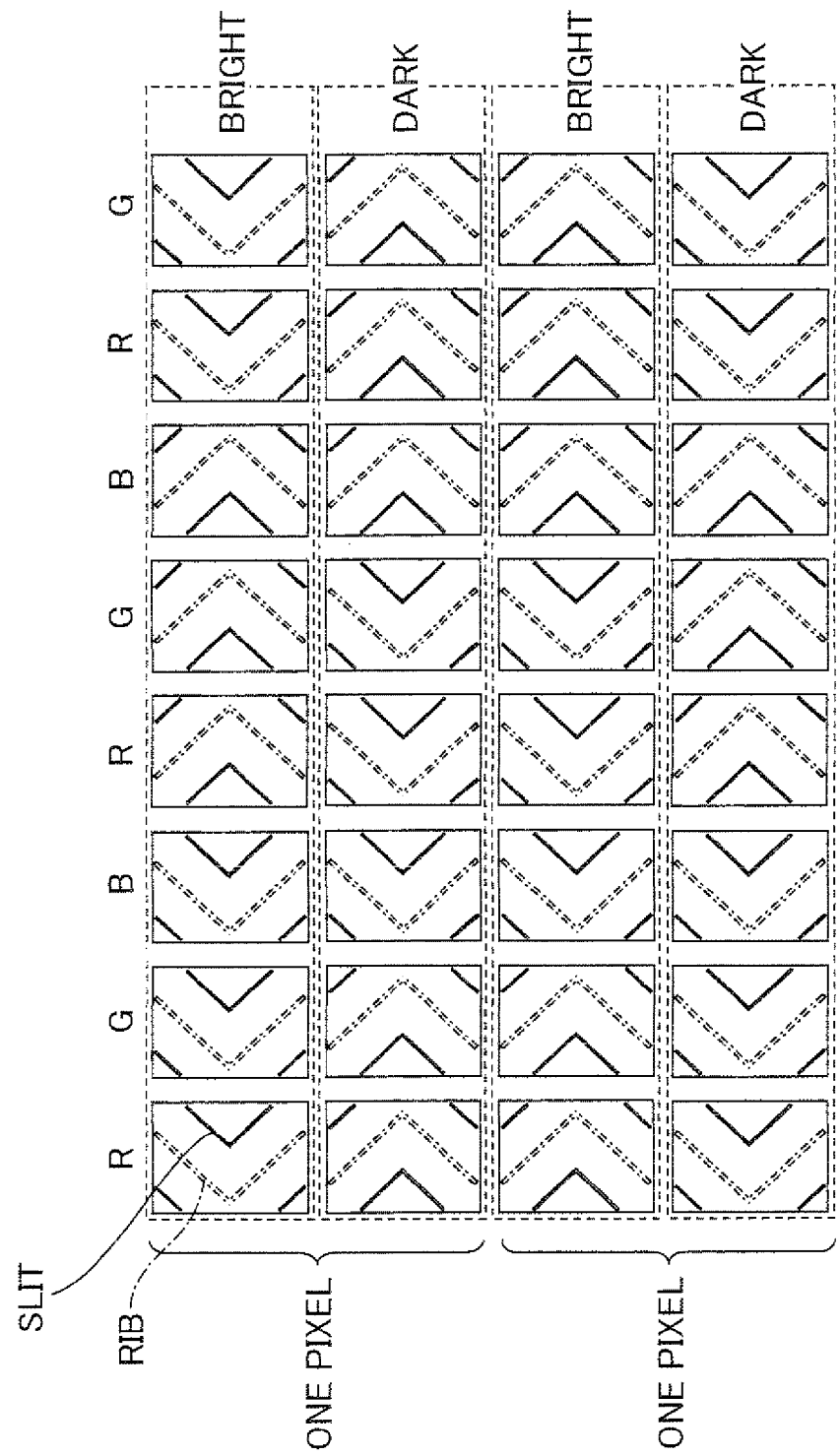
FIG. 36 is a plan view illustrating another arrangement of the liquid crystal panel of the present invention.

Alternatively, as shown in FIG. 36, two pixels adjacent to each other in a column direction may be arranged as follows in the liquid crystal panel. That is, a shape of an alignment control structure (a rib and a slit) provided in a bright sub-pixel of one of the two pixels is obtained by rotating by 180° an alignment control structure (a rib and a slit) provided in a bright sub-pixel of the other one of the two pixels. In each of the pixels, a shape of an alignment control structure (a rib and a slit) provided in a dark sub-pixel may be obtained by rotating by 180° the alignment control structure (the rib and the slit) provided in the bright sub-pixel.

Figure 37:
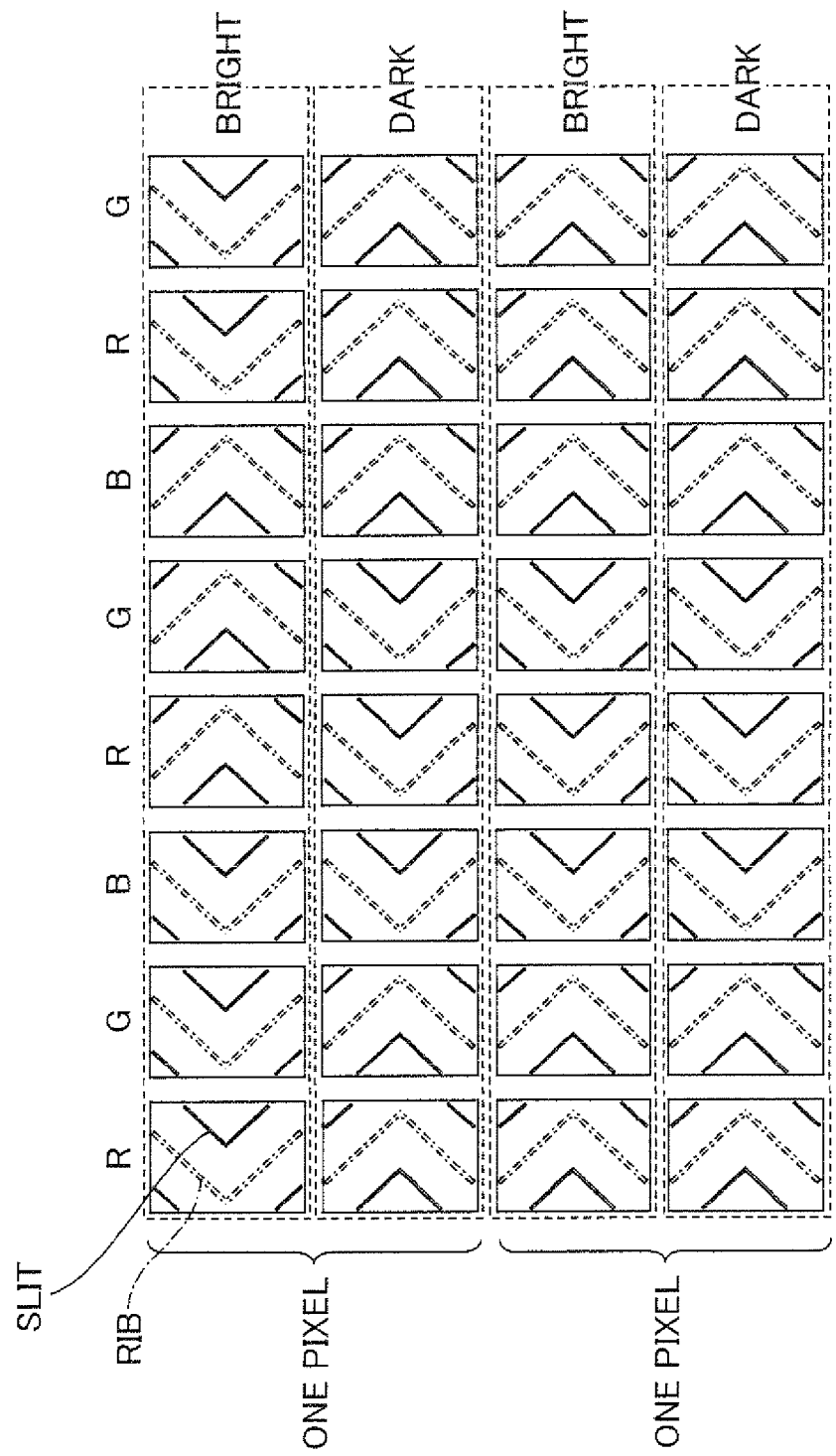
FIG. 37 is a plan view illustrating another arrangement of the liquid crystal panel of the present invention.

Alternatively, as shown in FIG. 37, two pixels adjacent to each other in a column direction may be arranged as follows in the liquid crystal panel. That is, a shape of an alignment control structure (a rib and a slit) provided in a bright sub-pixel of one of the pixels is obtained by rotating by 180° an alignment control structure (a rib and a slit) provided in a bright sub-pixel of the other one of the pixels. Meanwhile, a shape of an alignment control structure (a rib and a slit) provided in a dark sub-pixel of the one of the two pixels may be the same as a shape of an alignment control structure (a rib and a slit) provided in a dark sub-pixel of the other one of the two pixels.

Figure 15:
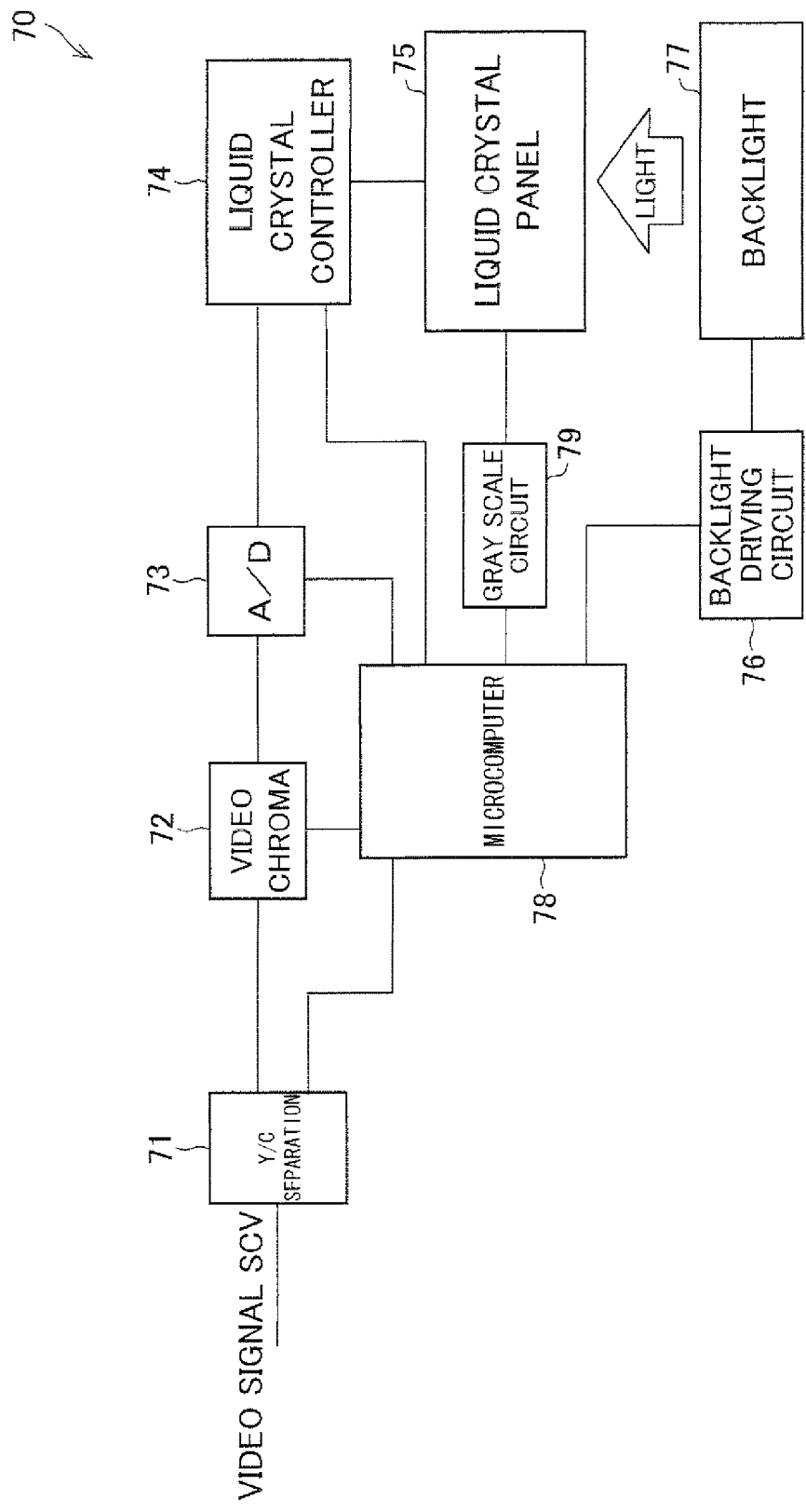
FIG. 15 illustrates yet another embodiment of a liquid crystal display device of the present invention and is a block diagram showing an arrangement of a liquid crystal display device provided in a television receiver.

The following explains a liquid crystal display device and a television receiver (television device) including the liquid crystal panel. FIG. 15 shows a circuit block of a liquid crystal display device 70 for receiving a picture of a television. The liquid crystal display device 70 includes, as shown in FIG. 15, an Y/C separation circuit 71, a video chroma circuit 72, an A/D converter 73, a liquid crystal controller 74, a liquid crystal panel 75, a backlight driving circuit 76, a backlight 77, a microcomputer 78, and a gray scale circuit 79.

The liquid crystal panel 75 includes a display section using the active matrix substrate 10 of the present embodiment, a source driver and a gate driver for driving the display section. A specific arrangement of the liquid crystal panel 75 may be any one of the arrangements explained in the embodiments and modifications of the present invention.

In the liquid crystal display device 70 of the above arrangement, first, a composite color video signal Scv as a television signal is externally inputted into the Y/C separation circuit 71. Thus inputted signal is separated into a luminance signal and a color signal in the Y/C separation circuit 71. The luminance signal and the color signal are converted, by the video chroma circuit 72, to analog RGB signals of light's three primary colors including red (R), green (G), and blue (B). Further, the analog RGB signals are converted to digital RGB signals by the A/D converter 73. The digital RGB signals are inputted in the liquid crystal controller 74. Moreover, in the Y/C separation circuit 71, a horizontal sync signal and a vertical sync signal are also extracted from the externally-inputted composite color video signal Scv. The sync signals are also inputted into the liquid crystal controller 74 via the microcomputer 78.

The digital RGB signals from the liquid crystal controller 74 are inputted into the liquid crystal panel 75 at a predetermined timing, together with a timing signal based on the sync signal. Moreover, in the gray scale circuit 79, respective gray scale voltages are generated. The gray scale voltages are of red (R), green (G), and blue (B) of three primary colors for color display. Thus generated gray scale voltages are also supplied to the liquid crystal panel 75. In the liquid crystal panel 75, drive signals (e.g., a data signal, a scanning signal) are generated based on the RGB signals, the timing signal, and the gray scale voltages, by the source driver, the gate driver, and the like inside the liquid crystal panel 75. A color image is displayed on the internal display section (using the active matrix substrate) based on the drive signals. Note that, for carrying out display of an image by the liquid crystal panel 75, the liquid crystal panel 75 needs to be illuminated from a rear side of the liquid crystal panel 75. In the liquid crystal display device 70, the backlight driving circuit 76 drives the backlight 77 under the control of the microcomputer 78 so that a backside of the liquid crystal panel 75 is illuminated.

The microcomputer 78 controls the whole system including the above-mentioned processes. Note that an externally-inputted video signal (composite color video signal) may include not only a video signal based on television broadcasting, but also a video signal of an image captured by a camera, and a video signal supplied via the internet. The liquid crystal display device 70 can display images based on various video signals.

Figure 16:
FIG. 16 is a block diagram illustrating an arrangement of the television receiver.

In a case where an image based on television broadcasting is displayed on the liquid crystal display device 70 of the above arrangement, as shown in FIG. 16, a tuner section 81 is connected to the liquid crystal display device 70. The tuner section 81 extracts a signal of a channel to be received out of received waves of high frequency signals that are received by an antenna (not illustrated). Then, the tuner section 81 converts thus extracted signal to an intermediate frequency signal. Further, the tuner section 81 extracts a composite color video signal Scv as a television signal by detecting the intermediate frequency signal. The composite color video signal Scv is inputted into the liquid crystal display device 70 as described above. Consequently, the liquid crystal display device 70 displays an image based on the composite color video signal Scv.

Figure 17:
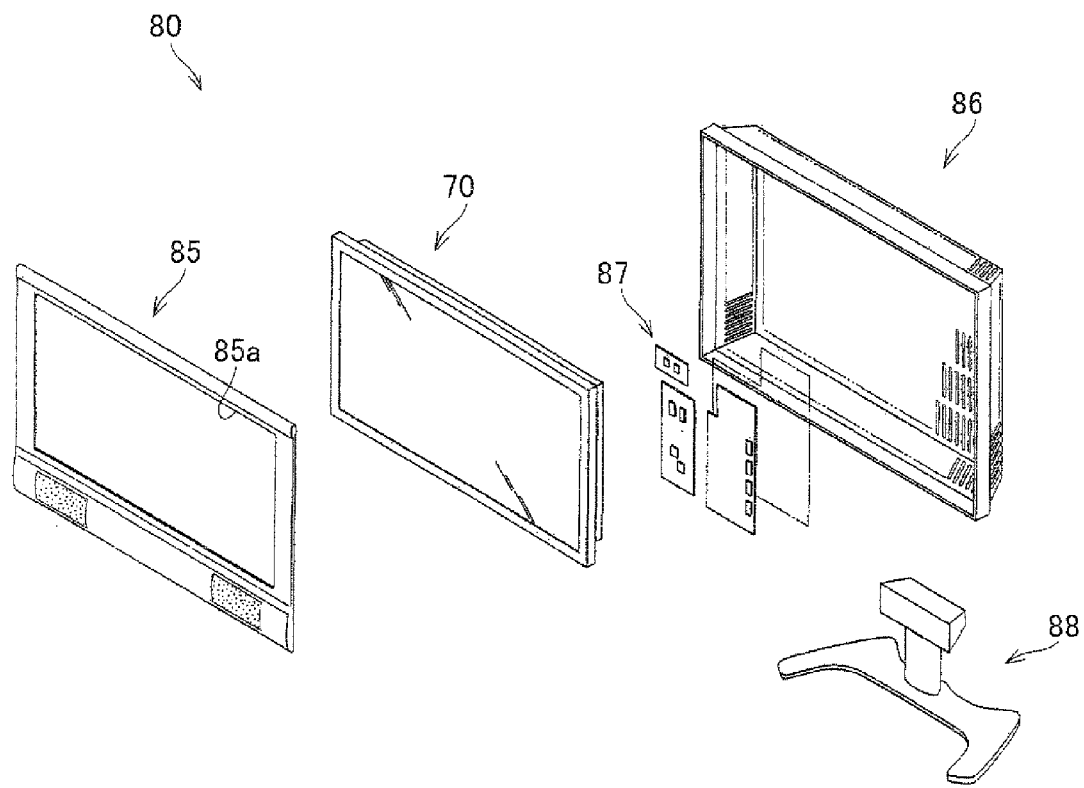
FIG. 17 is an exploded perspective view illustrating the arrangement of the television receiver.

FIG. 17 is an exploded perspective view illustrating an example of a mechanical arrangement in a case where the liquid crystal display device 70 serves as a television receiver. In the example shown in FIG. 17, the television receiver includes a first housing 85 and a second housing 86 in addition to the liquid crystal display device 70. The first housing 85 and the second housing 86 are arranged so as to cover and sandwich the liquid crystal display device 70. The first housing 85 has an opening 85a which an image to be displayed on the liquid crystal display device 70 is to pass through. The second housing 86 covers a backside of the liquid crystal display device 70. The second housing 86 is provided with (i) an operation circuit 87 for operating the liquid crystal display device 70 and (ii) a support 88 underneath.

As described above, the television receiver 80 of the present embodiment includes the liquid crystal display device 70, and the tuner section 81 for receiving television broadcasting.

Accordingly, it becomes possible to provide the television receiver 80 including the liquid crystal display device 70 (i) that has a combination of a multi-pixel structure and a vertical alignment mode in which liquid crystal molecules are divided into a plurality of alignment domains and (ii) that makes it possible to prevent deterioration in viewing angle characteristics caused by a disordered alignment area that occurs along a scanning signal line dividing a pixel.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The invention is applicable to a liquid crystal display device and a multi-pixel structure, and a television device each of which has a combination of a vertical alignment mode.

The invention claimed is:
1. A liquid crystal panel comprising:
an active matrix substrate including pixel areas, scanning signal lines each crossing pixel areas, and data signal lines; a counter substrate facing the active matrix substrate; and a liquid crystal layer provided between the active matrix substrate and the counter substrate, which liquid crystal panel is provided with pixels each formed to include one of the pixel areas and a section of the counter substrate which section corresponds to the one of the pixel areas, wherein:
a first sub-pixel area and a second sub-pixel area are provided in each of the pixel areas;
a first sub-pixel is formed to include the first sub-pixel area and a section of the counter substrate which section corresponds to the first sub-pixel area, and a second sub-pixel is formed to include the second sub-pixel area and a section of the counter substrate which section corresponds to the second sub-pixel area;
one of the scanning signal lines lies between the first and second sub-pixels included in one pixel;
a first alignment control structure is provided in the first sub-pixel and a second alignment control structure is provided in the second sub-pixel;
the first alignment control structure in one of any two adjacent pixels has a V-shape obtained by rotating by 180° the first alignment control structure in the other one of the two adjacent pixels, and wherein:
in each of the pixel area, a first pixel electrode is provided in the first sub-pixel area and a second pixel electrode is provided in the second sub-pixel area, and wherein a first storage capacitor line overlaps the first pixel electrode of a given pixel area and a second storage capacitor line overlaps both the second pixel electrode of said given pixel area and the first pixel electrode of an adjacent pixel area and wherein the second storage capacitor line is provided with different storage capacitor signal than is the first storage capacitor line;
in a case where the first alignment control structure is projected on a plane parallel to a panel surface which plane includes the scanning signal lines, a shape of the first alignment control structure on the plane is (i) asymmetric with respect to a straight line which passes through a center of the first sub-pixel area and is perpendicular to the scanning signal lines and (ii) symmetric with respect to a straight line that passes through the center of the first sub-pixel area and is parallel to the scanning signal lines; and
in a case where the second alignment control structure is projected on the plane parallel to the panel surface which plane includes the scanning signal lines, a shape of the second alignment control structure on the plane is (i) asymmetric with respect to a straight line which passes through a center of the second sub-pixel area and is perpendicular to the scanning signal lines and (ii) symmetric with respect to a straight line that passes through the center of the second sub-pixel area and is parallel to the scanning signal lines.
2. The liquid crystal panel as set forth in claim 1, wherein:
in each of the pixels, the first sub-pixel corresponds to a bright pixel at a time when display is carried out and the second sub-pixel corresponds to a dark pixel at the time when display is carried out.
3. The liquid crystal panel as set forth in claim 1, wherein:
the two adjacent pixels are of a same color.

4. The liquid crystal panel as set forth in claim 1 further comprising:
a first transistor and a second transistor that are connected to one of the data signal lines;
a first pixel electrode provided in the first sub-pixel area and a second pixel electrode provided in the second sub-pixel area,
wherein the first pixel electrode is connected to the first transistor and the second pixel electrode is connected to the second transistor.

5. The liquid crystal panel as set forth in claim 4, wherein:
the first alignment control structure includes at least one of a rib provided on the counter substrate, a slit formed in the first pixel electrode, and a slit formed in a common electrode of the counter substrate; and
the second alignment control structure includes at least one of another rib provided on the counter substrate, another slit formed in the second pixel electrode, and another slit formed in the common electrode of the counter substrate.

6. The liquid crystal panel as set forth in claim 1, wherein:
the second alignment control structure in one of the two adjacent pixels has a shape obtained by rotating by 180° the second alignment control structure provided in the other one of the two adjacent pixels.

7. The liquid crystal panel as set forth in claim 1, wherein:
in each of the pixels, the first alignment control structure and the second alignment control structure have an identical shape.

8. The liquid crystal panel as set forth in claim 1, wherein:
in the first sub-pixel in one of the two adjacent pixels, formation of a plurality of alignments is allowed in a section along one of the scanning signal lines by use of the first alignment control structure provided in the one of the two adjacent pixels; and
in the first sub-pixel in the other one of the two adjacent pixels, formation of a plurality of alignments is allowed in a section along one of the scanning signal lines by use of the first alignment control structure in the other one of the two adjacent pixels.

9. The liquid crystal panel as set forth in claim 1, wherein:
three pixels corresponding to red, green, and blue and aligned in a direction along one of the scanning signal lines form each one of pixel groups, the alignment control structure in one of two same color pixels included in any two pixel groups adjacent to each other in the direction has a shape obtained by rotating by 180° the first alignment control structure in the other one of the two same color pixels.

10. The liquid crystal panel as set forth in claim 5, wherein:
a direction along the scanning signal lines is a row direction, the first sub-pixel area has a shape having two edge sections along the row direction and the first alignment control structure includes at least one of (i) the rib that, when the rib is viewed in the row direction, has a letter V shape bent between the two edge sections and overlaps with each of the two edge sections of the first sub-pixel area, (ii) the slit that, when the slit is viewed in the row direction, has a letter V shape and is formed in the first pixel electrode, and (iii) the slit that, when the slit is viewed in the row direction, has a letter V shape and is formed in the common electrode.

11. The liquid crystal panel as set forth in claim 3, further comprising:
a first storage capacitor line forming a storage capacitor with use of the first pixel electrode or with use of a capacitor electrode that is connected to the first transistor, and a second storage capacitor line forming a storage capacitor with use of the second pixel electrode or with use of a capacitor electrode that is connected to the second transistor.

12. The liquid crystal panel as set forth in claim 3, wherein:
a drain electrode of the first transistor is connected to the first pixel electrode via a first drain extraction line and a first contact hole, and a drain electrode of the second transistor is connected to the second pixel electrode via a second drain extraction line and a second contact hole; and
at least a part of the first drain extraction line overlaps with the first alignment control structure, and at least a part of the second drain extraction line overlaps with the second alignment control structure.

13. The liquid crystal panel as set forth in claim 12, wherein:
at least a part of the first contact hole overlaps with the first alignment control structure, and at least a part of the second contact hole overlaps with the second alignment control structure.

14. The liquid crystal panel as set forth in claim 11, further comprising:
a first storage-capacitor-line extended section extending from the first storage capacitor line so as to overlap with the first pixel electrode; and
a second storage-capacitor-line extended section extending from the second storage capacitor line so as to overlap with the second pixel electrode,
wherein at least a part of the first storage-capacitor-line extended section overlaps with the first alignment control structure, and at least a part of the second storage-capacitor-line extended section overlaps with the second alignment control structure.

15. The liquid crystal panel as set forth in claim 14, wherein:
a drain electrode of the first transistor is connected to the first pixel electrode via a first drain extraction line and a first contact hole, and a drain electrode of the second transistor is connected to and the second pixel electrode via a second drain extraction line and a second contact hole; and
the first drain extraction line has a first overlap section where the first drain extraction line overlaps with the first storage-capacitor-line extended section, and the second drain extraction line has a second overlap section where the second drain extraction line overlaps with the second storage-capacitor-line extended section.

16. The liquid crystal panel as set forth in claim 15, wherein:
the first alignment control structure includes one or more slits formed in the first pixel electrode, and the second alignment control structure includes one or more slits formed in the second pixel electrode;
the first contact hole is formed between the first overlap section and the first drain electrode, and the second contact hole is formed between the second overlap section and the second drain electrode; and
the first drain extraction line includes a section where the first drain extraction line overlaps with a slit between the first drain electrode and the first contact hole, and the second drain extraction line includes a section where the second drain extraction line overlaps with a slit between the second drain electrode and the second contact hole.

17. The liquid crystal panel as set forth in claim 3, wherein:
a drain electrode of the first transistor is connected to the first pixel electrode via a first drain extraction line and one or more contact holes, and a drain electrode of the second transistor is connected to the second pixel electrode via a second drain extraction line and another one or more contact holes; and the first drain extraction line is provided with one or more aperture sections each formed to intersect with a corresponding one of the one or more contact holes, and the second drain extraction line is provided with another one or more aperture sections each formed to intersect with a corresponding one of the another one or more contact holes.

18. The liquid crystal panel as set forth in claim 17 wherein:

a direction along the data signal lines is a column direction and a direction along the scanning signal lines is a row direction, two aperture sections each having a stretching shape are formed in the first drain extraction line so that each of the two aperture sections corresponds to corresponding one of two contact holes, and an extending direction of one of the two aperture sections is in the column direction and an extending direction of the other one of the two aperture sections is in the row direction; and two aperture sections each having a stretching shape are formed in the second drain extraction line so that each of the two aperture sections corresponds to corresponding one of two contact holes, and an extending direction of one of the two aperture sections is in the column direction and an extending direction of the other one of the two aperture sections is in the row direction.

\* \* \* \* \*